United States Patent
Gotoh et al.

(10) Patent No.: US 9,045,684 B2
(45) Date of Patent: Jun. 2, 2015

(54) LIQUID CRYSTAL COMPOSITION, ANTIOXIDANT AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Gotoh, Tokyo (JP); Teizi Satou, Chiba (JP); Maiko Matsukuma, Chiba (JP); Chikahide Kanadani, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 7 days.

(21) Appl. No.: 13/945,935

(22) Filed: Jul. 19, 2013

(65) Prior Publication Data

US 2014/0027671 A1   Jan. 30, 2014

(30) Foreign Application Priority Data

Jul. 30, 2012   (JP) ................................ 2012-168460

(51) Int. Cl.

| C09K 19/34 | (2006.01) |
|---|---|
| C09K 19/30 | (2006.01) |
| C09K 19/06 | (2006.01) |
| C09K 19/32 | (2006.01) |
| C09K 19/52 | (2006.01) |
| C09K 19/54 | (2006.01) |

(52) U.S. Cl.
CPC ......... *C09K 19/3402* (2013.01); *C09K 19/3003* (2013.01); *C09K 19/32* (2013.01); *C09K 19/52* (2013.01); *C09K 19/54* (2013.01); *C09K 2019/3009* (2013.01); *C09K 2019/3422* (2013.01)

(58) Field of Classification Search
CPC ........ C09K 19/32; C09K 19/52; C09K 19/54; C09K 19/3003; C09K 19/3402; C09K 2019/3009; C09K 2019/3422; C09K 19/06; C09K 19/34

USPC .......... 252/299.61, 299.63; 428/1.1; 549/374, 549/427; 568/715, 743
See application file for complete search history.

(56) References Cited

U.S. PATENT DOCUMENTS

| 6,444,278 B1 * | 9/2002 | Reiffenrath et al. ........... 428/1.1 |
| 8,507,724 B2 * | 8/2013 | Leuwer et al. ................. 564/171 |

FOREIGN PATENT DOCUMENTS

| JP | 09-124529 | 5/1997 |
| JP | 2002-256267 | 9/2002 |
| JP | 2003-160525 | 6/2003 |
| JP | 2010-180266 | 8/2010 |

OTHER PUBLICATIONS

Yasukazu Ohkatsu et al., "Consideration on the effect of ortho-substituents of phenols by semiempirical molecular orbital method MOPAC," Polymer Degradation and Stability, Mar. 1, 2000, pp. 541-545, vol. 67, Issue 3, which the content relates to the non-patent literature in p. 6 of the specification of this application.

Yasukazu Ohkatsu et al., "Phenolic antioxidants-effect of ortho-substituents," Polymer Degradation and Stability, Feb. 1, 2000, pp. 313-318, vol. 67, Issue 2, which the content relates to the non-patent literature in p. 6 of the specification of this application.

\* cited by examiner

*Primary Examiner* — Geraldina Visconti
(74) *Attorney, Agent, or Firm* — Jianq Chyun IP Office

(57) ABSTRACT

To provide a liquid crystal composition satisfying at least one characteristic such as high maximum temperature of nematic phase, low minimum temperature thereof, small viscosity, suitable optical anisotropy, large negative dielectric anisotropy and specific resistance, high stability to ultraviolet light and heat; a liquid crystal composition having a suitable balance regarding at least two thereof; and an AM device including the composition. The liquid crystal composition has nematic phase, and contains as a first component a specific antioxidant having high compatibility with the composition and an excellent antioxidant function, and may contain a specific component having high maximum temperature or small viscosity as a second component, a specific component having high maximum temperature or large dielectric anisotropy as a third component, a specific component having large negative dielectric anisotropy as a fourth component, and a specific antioxidant as a fifth component, and a liquid crystal display device includes the composition.

20 Claims, No Drawings

LIQUID CRYSTAL COMPOSITION, ANTIOXIDANT AND LIQUID CRYSTAL DISPLAY DEVICE

CROSS-REFERENCE TO RELATED APPLICATIONS

This application claims the priority benefit of Japan Application serial No. 2012-168460, filed on Jul. 30, 2012. The entirety of the above-mentioned patent application is hereby incorporated by reference herein and made a part of this specification.

TECHNICAL FIELD

The invention relates to a liquid crystal composition mainly suitable for use in an active matrix (AM) device and so forth, and an AM device and so forth including the composition. In particular, the invention relates to a device that includes the composition and has a mode such as a twisted nematic (TN) mode, an electrically controlled birefringence (ECB) mode, an optically compensated bend (OCB) mode, a vertical alignment (VA) mode, an in-plane switching (IPS) mode, a fringe field switching (FFS) mode, a polymer sustained alignment (PSA) mode or a field induced photo-reactive alignment (FPA) mode.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode, a polymer sustained alignment (PSA) mode and a field induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. General characteristics of the composition should be improved to obtain an AM device having good general characteristics. Table 1 below summarizes a relationship of the general characteristics between two aspects. The general characteristics of the composition will be further explained based on a commercially available AM device. A temperature range of the nematic phase relates to a temperature range in which the device can be used. A preferred maximum temperature of the nematic phase is approximately 70° C. or higher and a preferred minimum temperature of the nematic phase is approximately −10° C. or lower. Viscosity of the composition relates to a response time in the device. A short response time is preferred for displaying moving images on the device. Accordingly, a small viscosity in the composition is preferred. A small viscosity at a low temperature is further preferred. An elastic constant in the composition relates to contrast of the device. A larger elastic constant in the composition is further preferred to increase the contrast in the device.

TABLE 1

General Characteristics of Composition and AM Device

| No. | General Characteristics of Composition | General Characteristics of AM Device |
|---|---|---|
| 1 | Wide temperature range of a nematic phase | Wide usable temperature range |
| 2 | Small viscosity[1)] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

[1)]A liquid crystal composition can be injected into a liquid crystal cell in a shorter period of time.

An optical anisotropy of the composition relates to a contrast ratio in the device. A product ($\Delta n \times d$) of the optical anisotropy ($\Delta n$) of the composition and a cell gap (d) in the device is designed so as to maximize the contrast ratio. A suitable value of the product depends on a type of the operating mode. The suitable value is in the range of approximately 0.45 micrometer in a device having the mode such as the TN mode. The suitable value is in the range of approximately 0.30 micrometer to approximately 0.40 micrometer in a device having the VA mode, and in the range of approximately 0.20 micrometer to approximately 0.30 micrometer in a device having the IPS mode or the FFS mode. In the above case, a composition having a large optical anisotropy is preferred for a device having a small cell gap. A large absolute value of dielectric anisotropy in the composition contributes to a low threshold voltage, a small electric power consumption and a large contrast ratio in the device. Accordingly, the large absolute value of dielectric anisotropy is preferred. A large specific resistance in the composition contributes to a large voltage holding ratio, and contributes to a large contrast ratio in the device. Accordingly, a composition having a large specific resistance at room temperature and also at a temperature close to the maximum temperature of the nematic phase in an initial stage is preferred. A composition having a large specific resistance at room temperature and also at a temperature close to the maximum temperature of the nematic phase even after the device has been used for a long period of time is preferred. Stability of the composition to ultraviolet light and heat relates to a service life of the liquid crystal display device. In the case where the stability is high, the device has a long service life. Such characteristics are preferred for an AM device used in a liquid crystal projector, a liquid crystal television and so forth. A large elastic constant in the composition contributes to a large contrast ratio and a short response time in the device. Accordingly, the large elastic constant is preferred.

As described above, the liquid crystal composition is required to have a large voltage holding ratio, and as a result, use of a liquid crystal compound having a large specific resistance is required. On the other hand, even with the thus carefully prepared liquid crystal composition, generation of a poor display by a change over time is known. The generation is considered to be caused by formation of a highly polar substance by a liquid crystal composition being gradually oxidized by action of heat, light or air under use conditions, and thus an instance of a decrease in a voltage holding ratio is considered to be one of the causes of the poor display.

Then, methods for adding a known antioxidant such as 2,6-di-tert-butyl-4-methylphenol (BHT) in order to prevent oxidization of the liquid crystal compound are disclosed in Patent literature Nos. 1 and 2. However, the antioxidants are known to cause, owing to a high vapor pressure, insufficient compatibility with the liquid crystal compound or the like, a problem of incapability of obtaining a desired effect by a decrease in an amount of the antioxidant in the liquid crystal composition, or a problem of causing precipitation of a crystal under low temperature conditions.

In order to solve the problems, an attempt for adding a new antioxidant has been made. For example, Patent literature No. 3 describes addition of a compound represented by formula (S-1) below to a liquid crystal composition, and Patent literature No. 4 describes addition of a compound represented by formula (S-2) below to a liquid crystal composition. However, the compound has a 2,6-di-tert-butylphenol moiety, and is required to be added in a high concentration in order to obtain an expected effect. Moreover, the compound has a poor compatibility with a liquid crystal composition to cause a poor display under low temperature conditions. Non-patent literature No. 1 describes antioxidant activity of phenol in which bulkiness on 2-position or 6-position is decreased. However, the relevant literature refers to nothing for stabilization of the liquid crystal composition.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode or the FFS mode. A composition having a positive or negative dielectric anisotropy is used for an AM device having the PSA mode or the FPA mode. Examples of liquid crystal compositions each using an antioxidant are disclosed in Patent literature Nos. 1 to 4.

CITATION LIST

Patent Literature

Patent literature No. 1: JP 2002-256267 A.
Patent literature No. 2: JP 2010-180266 A.
Patent literature No. 3: JP H9-124529 A.
Patent literature No. 4: JP 2003-160525 A.

Non-Patent Literature

Non-patent literature No. 1: Fine Chemicals, Vol. 41, No. 3, p. 61.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large positive or negative dielectric anisotropy, a large specific resistance, a high stability to ultraviolet light, a high stability to heat, and a large elastic constant.

SUMMARY OF INVENTION

Solution to Problem

The invention concerns a liquid crystal composition that has a nematic phase and contains at least one compound selected from the group of compounds represented by formula (1) as a first component, and concerns a liquid crystal display device including the composition:

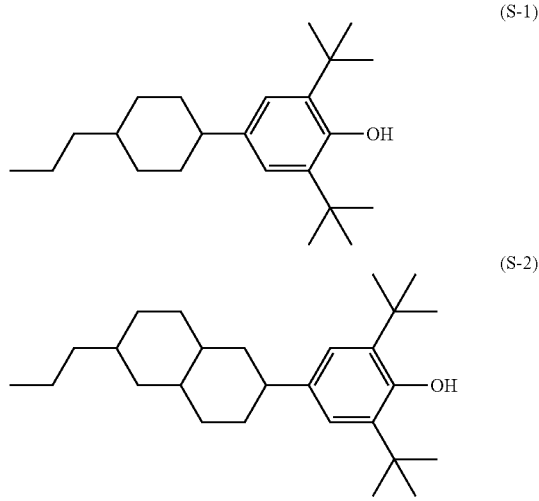

(S-1)

(S-2)

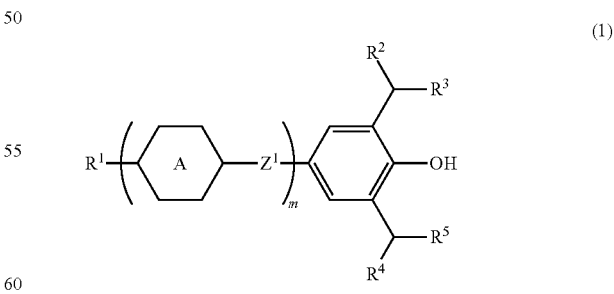

(1)

wherein, $R^1$ is alkyl having 2 to 20 carbons, and in the alkyl, at least one of $—CH_2—$ may be replaced by $—O—$ or $—S—$; $R^2$, $R^3$, $R^4$ and $R^5$ are independently hydrogen or methyl; ring A is 1,4-cyclohexylene, 1,3-dioxane-2,5-diyl, 1,3-dithiane-2,5-diyl, tetrahydropyran-2,5-diyl, or 1,4-phenylene in which at least one of hydrogen may be replaced by fluorine; $Z^1$ is a single bond, —CH₂CH₂—, —CH═CH—, —C≡C—, —COO—, —COO—, —CH₂O—, —OCH₂—, —CF═CF—, —CH₂S— or —SCH₂—; and m is 0 or 1.

The invention also concerns a compound represented by formula (1-a):

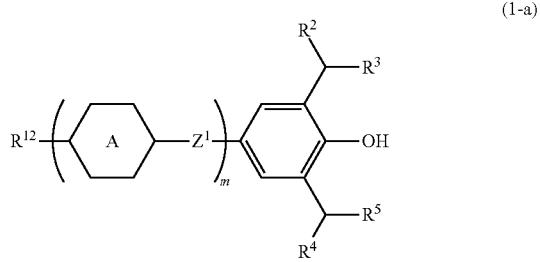

(1-a)

wherein, R¹² is alkyl having 2 to 20 carbons, and in the alkyl, at least one of —CH₂— may be replaced by —O— or —S—; R², R³, R⁴ and R⁵ are independently hydrogen or methyl; ring A is 1,4-cyclohexylene, 1,3-dioxane-2,5-diyl, 1,3-dithiane-2,5-diyl, tetrahydropyran-2,5-diyl, or 1,4-phenylene in which at least one of hydrogen may be replaced by fluorine; Z¹ is a single bond, —CH₂CH₂—, —CH═CH—, —C≡C—, —COO—, —COO—, —CH₂O—, —OCH₂—, —CF═CF—, —CH₂S— or —SCH₂—; m is 0 or 1; R¹² when m is 0 is alkyl having 5 to 20 carbons, and in the alkyl, at least one of —CH₂— may be replaced by —O— or —S—.

The invention further concerns a composition containing the compound described above.

The invention still further concerns use of the compound as an antioxidant.

The invention furthermore concerns a method for stabilizing a liquid crystal composition by adding the compound represented by formula (1-a) to the liquid crystal composition that does not contain a compound being a first component.

The invention still furthermore concerns a liquid crystal display device including the liquid crystal composition.

The invention additionally concerns use of the composition in a liquid crystal display device.

DESCRIPTION OF EMBODIMENTS

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large positive or negative dielectric anisotropy, a large specific resistance, a high stability to ultraviolet light, a high stability to heat, and a large elastic constant. Another aim is to provide a liquid crystal composition having a suitable balance regarding at least two of the characteristics. A further aim is to provide a liquid crystal display device including such a composition. An additional aim is to provide a composition having a suitable optical anisotropy, a large positive or negative dielectric anisotropy, a high stability to ultraviolet light, a large elastic constant and so forth, and to provide an AM device having characteristics such as a short response time, a large voltage holding ratio, a large contrast ratio and a long service life. A further additional aim is to provide an antioxidant having a high compatibility with a liquid crystal composition, a low volatility, easiness of measurement and analysis, a low change in a concentration over time, and allowing provision of desired stability by addition of a small amount thereof, and a liquid crystal composition containing the same.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large positive or negative dielectric anisotropy, a large specific resistance, a high stability to ultraviolet light and a high stability to heat. One aspect of the invention is a liquid crystal composition having a suitable balance regarding at least two of the characteristics. Another aspect is a liquid crystal display device including such a composition. Another aspect is a composition having characteristics such as a suitable optical anisotropy, a large positive or negative dielectric anisotropy and a high stability to ultraviolet light, and is an AM device having characteristics such as a short response time, a large voltage holding ratio, a large contrast ratio and a long service life. A further aspect is an antioxidant that can stabilize the liquid crystal composition. Stabilization represents enhancement of stability to ultraviolet light or heat. A still further aspect is an antioxidant having a low volatility, and a high compatibility with other liquid crystal compounds, and a lower molecular weight in comparison with an antioxidant according to a conventional art to allow addition in the identical mole number by addition in a smaller weight.

Usage of terms herein is as described below. A liquid crystal composition or a liquid crystal display device according to the invention may be occasionally abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound or a polymerizable compound may be occasionally added to the composition. Even in the case where the compounds are liquid crystalline, the compounds are classified as an additive herein. At least one compound selected from the group of compounds represented by formula (1) may be occasionally abbreviated as "compound (1)." "Compound (1)" means one compound or two or more compounds represented by formula (1). A same rule applies to any other compound represented by any other formula. "At least one" in the context of "replaced" means that not only positions but also numbers may be selected without limitation.

A higher limit of a temperature range of the nematic phase may be occasionally abbreviated as "maximum temperature." A lower limit of the temperature range of the nematic phase may be occasionally abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after a device has been used for a long period of time. An expression "having a large voltage holding ratio" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device has been used for a long period of time. When characteristics such as optical anisotropy are explained, values obtained according to the measuring methods described in Examples will be used. A first component includes one compound or two or more compounds. "Ratio of the first component" is expressed in terms of a weight ratio (part by weight) of the first component based on 100 parts by weight of the liquid crystal composition excluding the first component and a fifth component. "Ratio of a second component" is expressed in terms of weight percent (% by weight) of the second component based on the weight of the liquid crystal composition excluding the first component and the fifth component. "Ratio of a third component" and "ratio of a fourth component" are expressed in a manner similar to "ratio of the second component. "Ratio of the fifth component" is expressed in terms of a weight ratio (part by weight) of the fifth component based on 100 parts by weight of the liquid crystal composition excluding the first component and the fifth component. A ratio of the additive mixed with the composition is expressed in terms of weight percent (% by weight) or weight parts per million (ppm) based on the total weight of the liquid crystal composition.

A symbol $R^1$ is used for a plurality of compounds in chemical formulas of component compounds. In two of arbitrary compounds among the plurality of the compounds, groups selected by $R^1$ may be identical or different. In one case, for example, $R^1$ of compound (1) is ethyl and $R^1$ of compound (1-1) is ethyl. In another case, $R^1$ of compound (1) is ethyl and $R^1$ of compound (1-1) is propyl. A same rule applies to a symbol $R^6$, $X^1$ or the like.

The invention includes the items described below.

Item 1. A liquid crystal composition that has a nematic phase and contains at least one compound selected from the group of compounds represented by formula (1) as a first component:

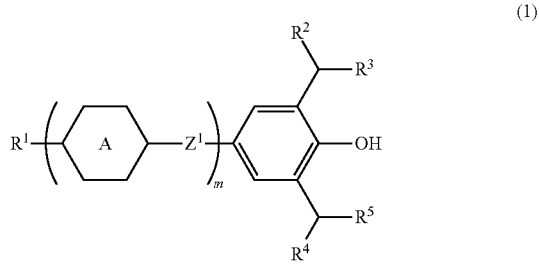

wherein, $R^1$ is alkyl having 2 to 20 carbons, and in the alkyl, at least one of —$CH_2$— may be replaced by —O— or —S—; $R^2$, $R^3$, $R^4$ and $R^5$ are independently hydrogen or methyl; ring A is 1,4-cyclohexylene, 1,3-dioxane-2,5-diyl, 1,3-dithiane-2, 5-diyl, tetrahydropyran-2,5-diyl, or 1,4-phenylene in which at least one of hydrogen may be replaced by fluorine; $Z^1$ is a single bond, —$CH_2CH_2$—, —CH=CH—, —C≡C—, —COO—, —OCO—, —$CH_2O$—, —$OCH_2$—, —CF=CF—, —$CH_2S$— or —$SCH_2$—; and m is 0 or 1.

Item 2. The liquid crystal composition according to item 1, containing at least one compound selected from the group of compounds represented by formula (1-1) to formula (1-3) as the first component:

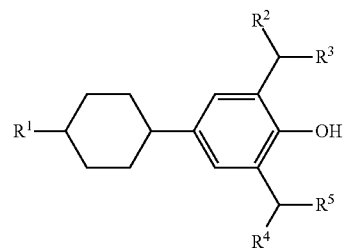

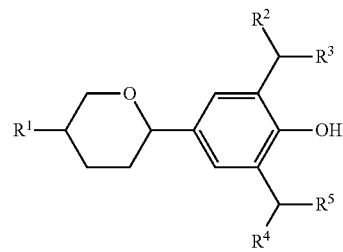

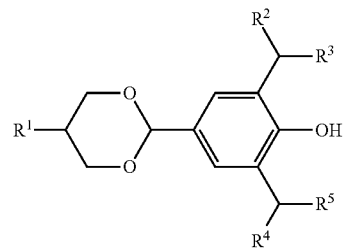

wherein, $R^1$ is alkyl having 2 to 20 carbons, and in the alkyl, at least one of —$CH_2$— may be replaced by —O— or —S—; and $R^2$, $R^3$, $R^4$ and $R^5$ are independently hydrogen or methyl.

Item 3. The liquid crystal composition according to item 1 or 2, containing at least one compound selected from the group of compounds represented by formula (1-1) according to item 2 as the first component.

Item 4. The liquid crystal composition according to any one of items 1 to 3, containing at least one compound selected from the group of compounds represented by formula (1-2) according to item 2 as the first component.

Item 5. The liquid crystal composition according to any one of items 1 to 4, further containing at least one compound selected from the group of compounds represented by formula (2) as a second component:

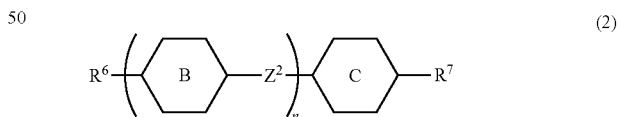

wherein, $R^6$ and $R^7$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring B and ring C are independently 1,4-cyclohexylene, 1,4-phenylene, 2-fluoro-1, 4-phenylene, 3-fluoro-1,4-phenylene or 2,5-difluoro-1,4-phenylene; $Z^2$ is independently a single bond, ethylene, methyleneoxy or carbonyloxy; and n is 1, 2 or 3.

Item 6. The liquid crystal composition according to any one of items 1 to 5, containing at least one compound selected from the group of compounds represented by formula (2-1) to formula (2-13) as the second component:

(2-1) 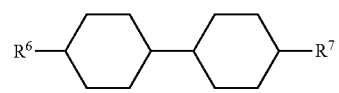

(2-2) 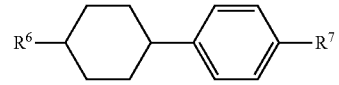

(2-3) 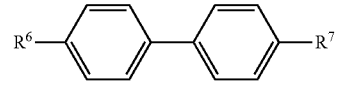

(2-4) 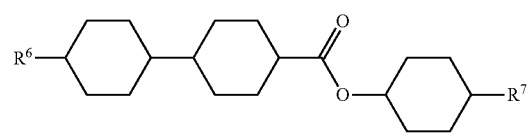

(2-5) 

(2-6) 

(2-7) 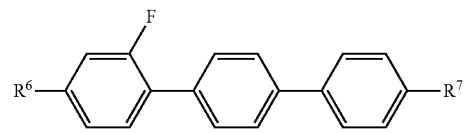

(2-8) 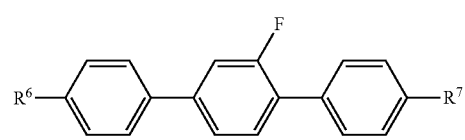

(2-9) 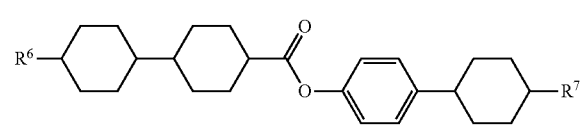

(2-10) 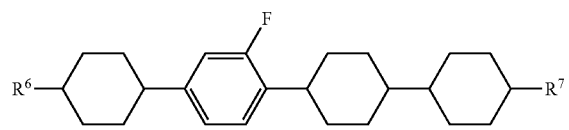

(2-11) 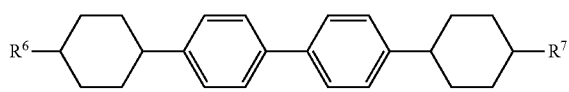

(2-12) 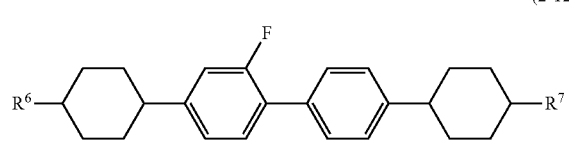

-continued (2-13) 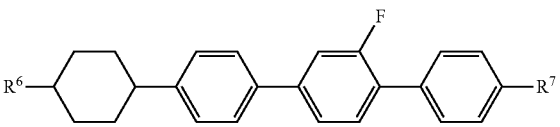

wherein, $R^6$ and $R^7$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

Item 7. The liquid crystal composition according to any one of items 1 to 6, containing at least one compound selected from the group of compounds represented by formula (2-1) according to item 6 as the second component.

Item 8. The liquid crystal composition according to any one of items 1 to 7, further containing at least one compound selected from the group of compounds represented by formula (3) as a third component:

(3) 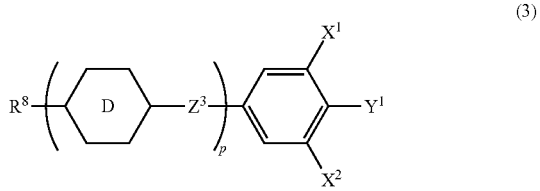

wherein, $R^8$ is alkyl having 1 to 12 carbons, alkoxy having 1 to 12 carbons or alkenyl having 2 to 12 carbons; ring D is independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 1,3-dioxane-2,5-diyl or tetrahydropyran-2,5-diyl; $X^1$ and $X^2$ are independently hydrogen or fluorine; $Y^1$ is fluorine, chlorine, trifluoromethyl or trifluoromethoxy; $Z^3$ is independently a single bond, ethylene, carbonyloxy or difluoromethyleneoxy; and p is 1, 2 or 3.

Item 9. The liquid crystal composition according to any one of items 1 to 8, containing at least one compound selected from the group of compounds represented by formula (3-1) to formula (3-18) as the third component:

(3-1) 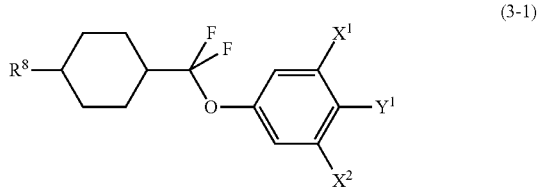

(3-2) 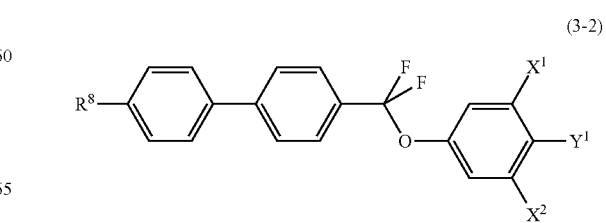

(3-3) 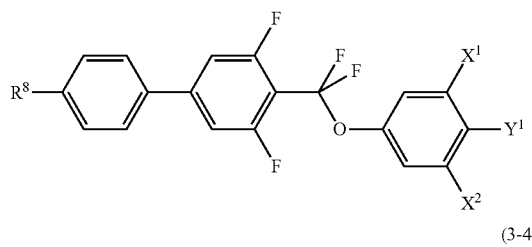
(3-4) 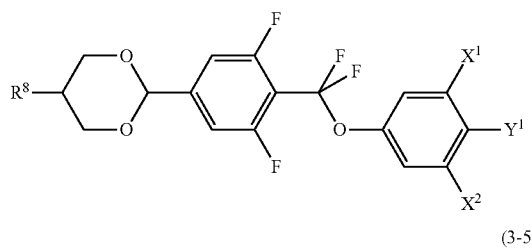
(3-5) 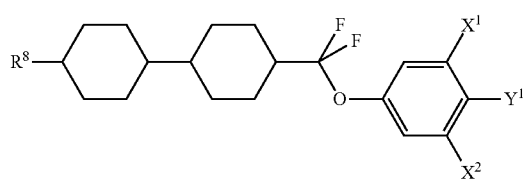
(3-6) 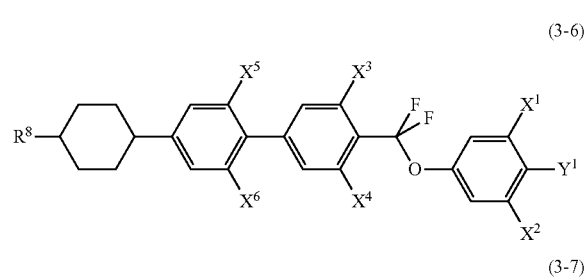
(3-7) 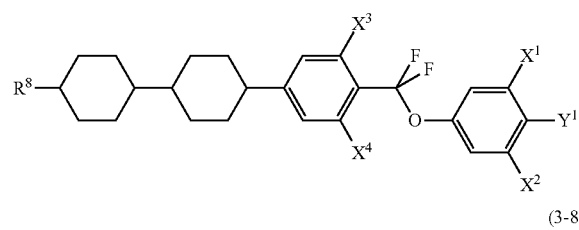
(3-8) 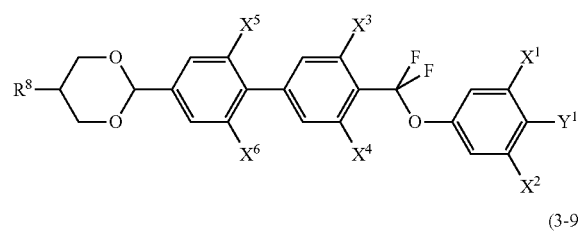
(3-9) 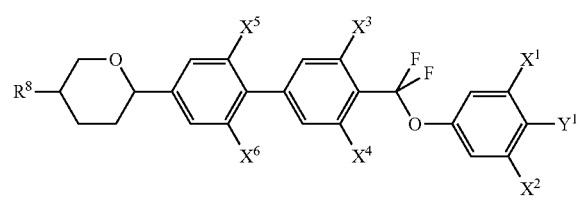
(3-10) 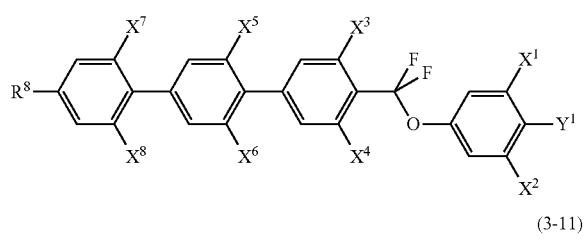
(3-11) 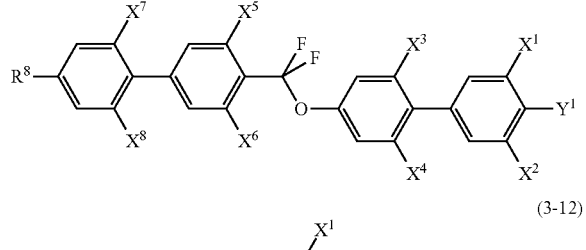
(3-12) 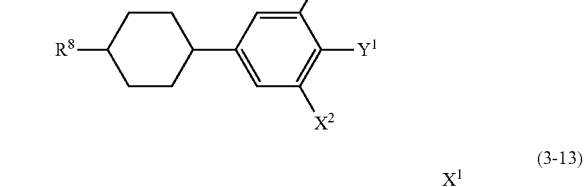
(3-13) 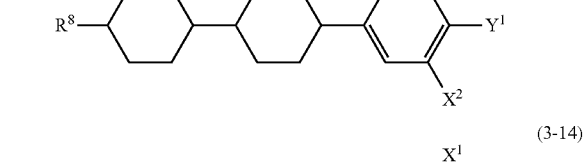
(3-14) 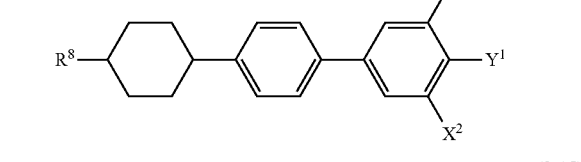
(3-15) 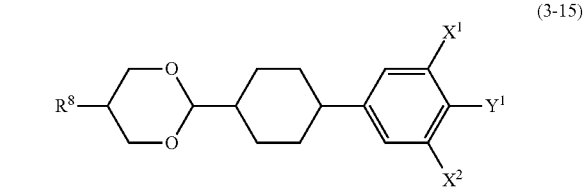
(3-16) 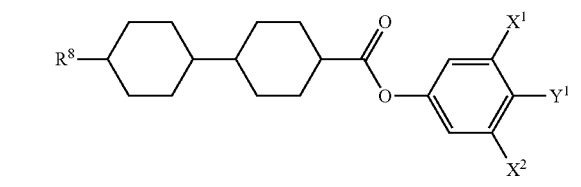
(3-17) 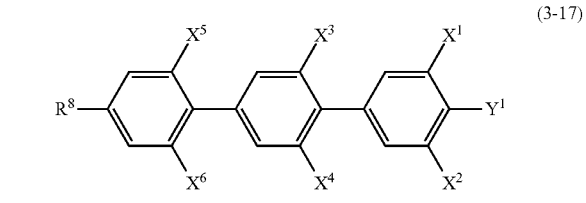

-continued

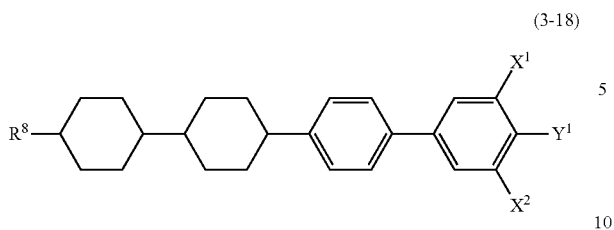
(3-18)

wherein, $R^8$ is alkyl having 1 to 12 carbons, alkoxy having 1 to 12 carbons or alkenyl having 2 to 12 carbons; $X^1$, $X^2$, $X^3$, $X^4$, $X^5$, $X^6$, $X^7$ and $X^8$ are independently hydrogen or fluorine; and $Y^1$ is fluorine, chlorine, trifluoromethyl or trifluoromethoxy.

Item 10. The liquid crystal composition according to any one of items 1 to 9, containing at least one compound selected from the group of compounds represented by formula (3-3) according to item 9 as the third component.

Item 11. The liquid crystal composition according to any one of items 1 to 10, containing at least one compound selected from the group of compounds represented by formula (3-10) according to item 9 as the third component.

Item 12. The liquid crystal composition according to any one of items 1 to 11, further containing at least one compound selected from the group of compounds represented by formula (4) as a fourth component:

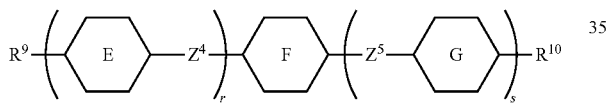
(4)

wherein, $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring E and ring G are independently 1,4-cyclohexylene, 1,4-phenylene, 1,4-phenylene in which at least one of hydrogen is replaced by fluorine or chlorine, or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, methyleneoxy or carbonyloxy; r is 1, 2 or 3; and s is 0 or 1, and a sum of r and s is 3 or less.

Item 13. The liquid crystal composition according to any one of items 1 to 12, containing at least one compound selected from the group of compounds represented by formula (4-1) from formula (4-19) as the fourth component:

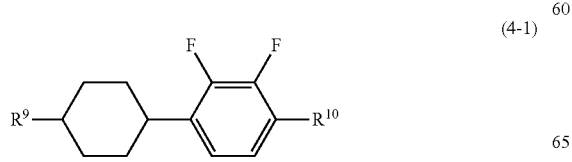
(4-1)

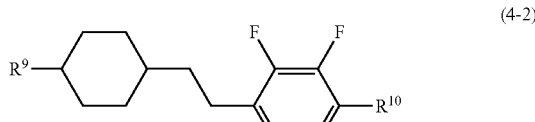
(4-2)

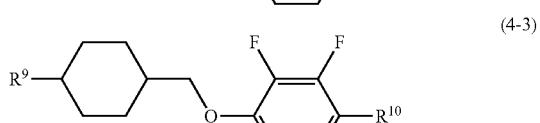
(4-3)

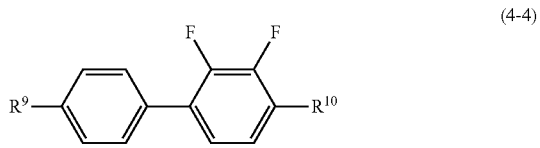
(4-4)

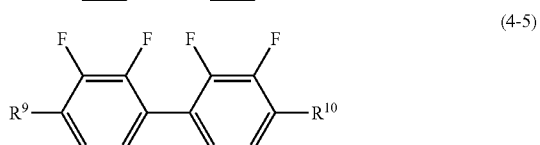
(4-5)

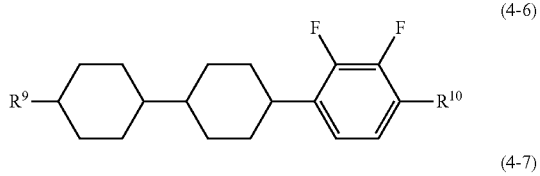
(4-6)

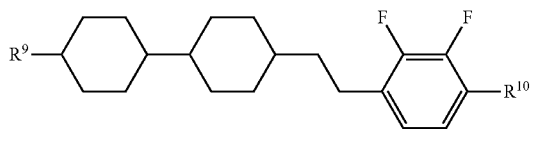
(4-7)

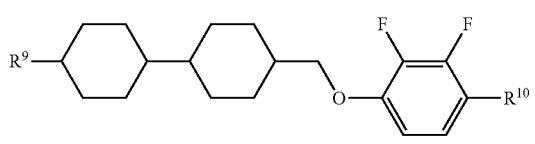
(4-8)

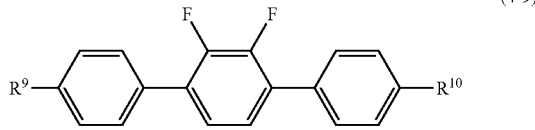
(4-9)

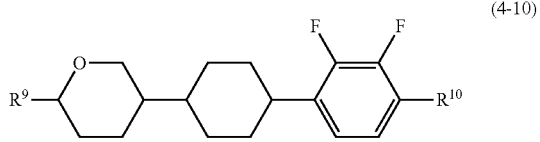
(4-10)

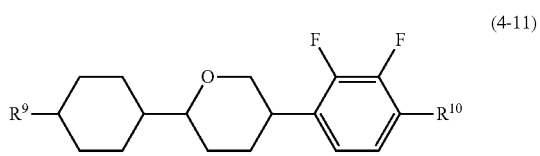
(4-11)

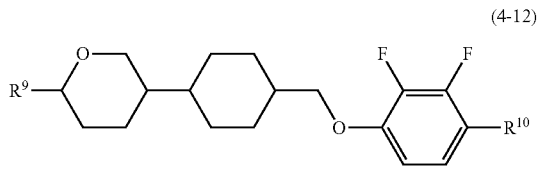
(4-12)

-continued

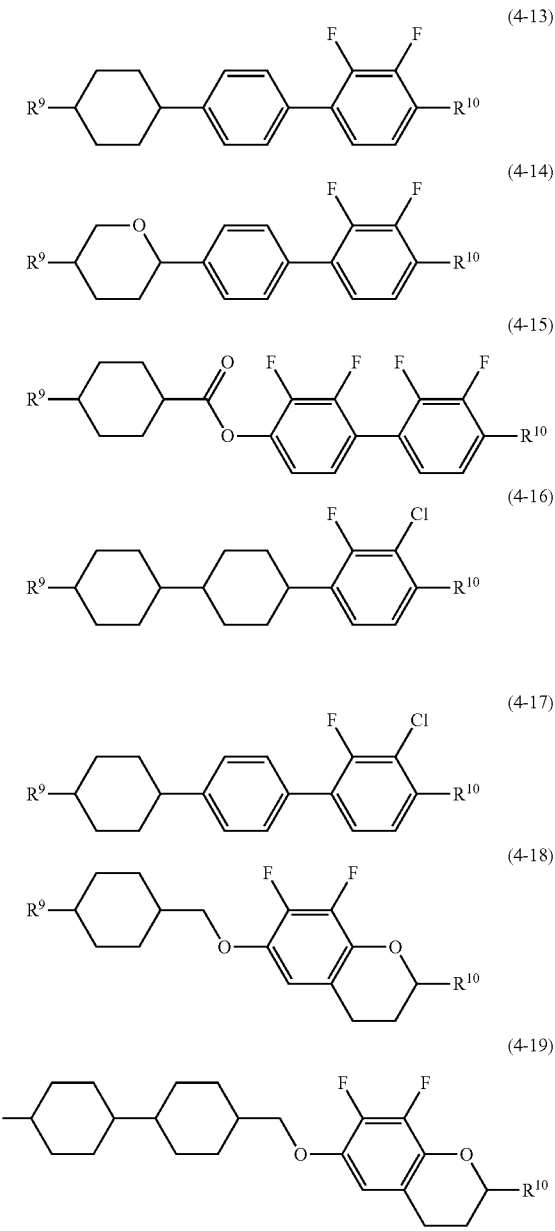

(4-13)
(4-14)
(4-15)
(4-16)
(4-17)
(4-18)
(4-19)

wherein, $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

Item 14. The liquid crystal composition according to any one of items 1 to 13, containing at least one compound selected from the group of compounds represented by formula (4-4) according to item 13 as the fourth component.

Item 15. The liquid crystal composition according to any one of items 1 to 14, containing at least one compound selected from the group of compounds represented by formula (4-6) according to item 13 as the fourth component.

Item 16. The liquid crystal composition according to any one of items 1 to 15, further containing at least one compound selected from the group of compounds represented by formula (5) as a fifth component:

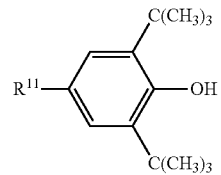

(5)

wherein, $R^{11}$ is alkyl having 1 to 9 carbons.

Item 17. The liquid crystal composition according to any one of items 1 to 16, wherein a ratio of the first component is in the range of 0.005 part by weight to 1 part by weight based on 100 parts by weight of the liquid crystal composition excluding the first component and the fifth component.

Item 18. The liquid crystal composition according to any one of items 5 to 17, wherein a ratio of the second component is in the range of 10% by weight to 90% by weight based on the weight of the liquid crystal composition excluding the first component and the fifth component.

Item 19. The liquid crystal composition according to any one of items 8 to 18, wherein a ratio of the third component is in the range of 10% by weight to 90% by weight based on the weight of the liquid crystal composition excluding the first component and the fifth component.

Item 20. The liquid crystal composition according to any one of items 12 to 19, wherein a ratio of the fourth component is in the range of 10% by weight to 90% by weight based on the weight of the liquid crystal composition excluding the first component and the fifth component.

Item 21. The liquid crystal composition according to any one of items 16 to 20, wherein a ratio of the fifth component is in the range of 0.005 part by weight to 1 part by weight based on 100 parts by weight of the liquid crystal composition excluding the first component and the fifth component.

Item 22. The liquid crystal composition according to any one of items 1 to 21, wherein a maximum temperature of a nematic phase is 70° C. or higher, and optical anisotropy (measured at 25° C.) in a wavelength of 589 nanometers is 0.07 or more.

Item 23. A compound represented by formula (1-a):

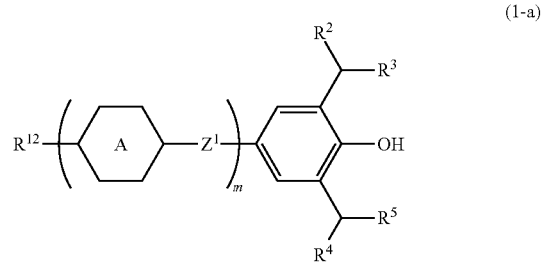

(1-a)

wherein, $R^{12}$ is alkyl having 2 to 20 carbons, and in the alkyl, at least one of —$CH_2$— may be replaced by —O— or —S—; $R^2$, $R^3$, $R^4$ and $R^5$ are independently hydrogen or methyl; ring A is 1,4-cyclohexylene, 1,3-dioxane-2,5-diyl, 1,3-dithiane-2,5-diyl, tetrahydropyran-2,5-diyl, or 1,4-phenylene in which at least one of hydrogen may be replaced by fluorine; $Z^1$ is a single bond, —$CH_2CH_2$—, —CH=CH—, —C≡C—, —COO—, —OCO, —$CH_2O$—, —$OCH_2$—, —CF=CF—, —$CH_2S$— or —$SCH_2$—; m is 0 or 1; $R^{12}$ when m is 0 is alkyl having 5 to 20 carbons, and in the alkyl, at least one of —$CH_2$— may be replaced by —O— or —S—.

Item 24. The compound according to item 23, wherein, in formula (1-a), $R^{12}$ is alkyl having 2 to 20 carbons; $R^2$, $R^3$, $R^4$ and $R^5$ are independently hydrogen or methyl; ring A is 1,4-cyclohexylene or tetrahydropyran-2,5-diyl; $Z^1$ is a single bond; and m is 1.

Item 25. The compound according to item 23 or 24, wherein, in formula (1-a), $R^{12}$ is alkyl having 2 to 20 carbons; $R^2$, $R^3$, $R^4$ and $R^5$ are hydrogen; ring A is tetrahydropyran-2,5-diyl; $Z^1$ is a single bond; and m is 1.

Item 26. A liquid crystal composition containing the compound according to any one of items 23 to 25.

Item 27. Use of the compound according to any one of items 23 to 25 as an antioxidant.

Item 28. A method for stabilizing a liquid crystal composition by adding the compound according to any one of items 23 to 25 to a liquid crystal composition that does not contain a compound being a first component.

Item 29. A liquid crystal display device including the liquid crystal composition according to any one of items 1 to 22 and 26.

Item 30. The liquid crystal display device according to item 29, wherein an operating mode in the liquid crystal display device is a TN mode, an ECB mode, an OCB mode, a VA mode, an IPS mode, a PSA mode, an FFS mode or an FPA mode, and a driving mode of the liquid crystal display is an active matrix mode.

Item 31. Use of the liquid crystal composition according to any one of items 1 to 22 and 26 in a liquid crystal display device.

The invention further includes the following items: (1) the composition, further containing the optically active compound; (2) the composition, further containing the additive such as an antioxidant, an ultraviolet light absorber, an antifoaming agent, a polymerizable compound and a polymerization initiator; (3) an AM device including the composition; (4) a device including the composition, and having a TN, ECB, OCB, VA, IPS, FFS, PSA or FPA mode; (5) a transmissive device including the composition; (6) use of the composition as the composition having the nematic phase; and (7) use as an optically active composition by adding the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, and a preferred ratio of the components and the basis thereof will be explained. Fourth, a preferred embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive, an impurity or the like in addition to the liquid crystal compound selected from compound (1), compound (2), compound (3), compound (4) and compound (5). "Any other liquid crystal compound" means a liquid crystal compound different from compound (1), compound (2), compound (3), compound (4) and compound (5). Such a compound is mixed with the composition for the purpose of further adjusting the characteristics. The additive includes the optically active compound, the antioxidant, the ultraviolet light absorber, a dye, the antifoaming agent, the polymerizable compound and the polymerization initiator. The impurity includes a compound mixed in a process such as preparation of the component compounds. Even in the case where the compound is liquid crystalline, the compound is classified as the impurity herein.

Composition B consists essentially of a compound selected from compound (1), compound (2), compound (3), compound (4) and compound (5). A term "essentially" means that the composition may contain the additive and the impurity but does not contain any liquid crystal compound different from the compounds. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent classification based on a qualitative comparison among the component compounds, and 0 (zero) means "a value is nearly zero."

TABLE 2

| Characteristics of Compounds | | | |
|---|---|---|---|
| | Compounds | | |
| | Compound (2) | Compound (3) | Compound (4) |
| Maximum temperature | S to L | S to M | S to L |
| Viscosity | S to M | M to L | M to L |
| Optical anisotropy | S to L | M to L | M to L |
| Dielectric anisotropy | 0 | S to L | M to L[1)] |
| Specific resistance | L | L | L |

[1)]A value of dielectric anisotropy is negative, and the symbol shows magnitude of an absolute value.

Upon mixing the component compounds with the composition, the main effects of the component compounds on the characteristics of the composition are as described below. Compound (1) and compound (5) increase the stability to ultraviolet light or heat. Compound (2) increases the maximum temperature or decreases the viscosity. Compound (3) increases the dielectric anisotropy and decreases the minimum temperature. Compound (4) increases the absolute value of dielectric anisotropy and decreases the minimum temperature.

Third, the combination of components in the composition, the preferred ratio of the components and the basis thereof will be explained. The combination of the components in the composition includes the first component only, a combination of the first component and the second component, a combination of the first component and the third component, a combination of the first component and the fourth component, a combination of the first component and the fifth component, a combination of the first component, the second component and the third component, a combination of the first component, the second component and the fourth component, a combination of the first component, the second component and the fifth component, a combination of the first component, the third component and the fourth component, a combination of the first component, the third component and the fifth component, a combination of the first component, the fourth component and the fifth component, a combination of the first component, the second component, the third component and the fourth component, a combination of the first component, the second component, the third component and the fifth component, a combination of the first component, the second component, the fourth component and the fifth component, a combination of the first component, the third component, the fourth component and the fifth component, and a combination of the first component, the second component, the third component, the fourth component and the fifth component. A preferred combination of components in the composition includes the combination of the first component, the second component, the third component and the fifth component, and the combination of the first component, the second component, the fourth component and the fifth component.

A preferred ratio of the first component is approximately 0.005 part by weight or more for increasing the stability to ultraviolet light or heat, and approximately 1 part by weight or less for decreasing the minimum temperature, based on 100 parts by weight of the liquid crystal composition excluding the first component and the fifth component. A further preferred ratio is in the range of approximately 0.01 part by weight to approximately 0.5 part by weight. A particularly preferred ratio is in the range of approximately 0.03 part by weight to approximately 0.3 part by weight.

A preferred ratio of the second component is approximately 10% by weight or more for increasing the maximum temperature or decreasing the viscosity, and approximately 90% or less for decreasing the dielectric anisotropy. A further preferred ratio is in the range of approximately 20% by weight to approximately 80% by weight. A particularly preferred ratio is in the range of approximately 25% by weight to approximately 75% by weight.

A preferred ratio of the third component is approximately 10% by weight or more for increasing the dielectric anisotropy, and approximately 90% by weight or less for decreasing the minimum temperature. A further preferred ratio is in the range of approximately 20% by weight to approximately 80% by weight. A particularly preferred ratio is in the range of approximately 25% by weight to approximately 35% by weight.

A preferred ratio of the fourth component is approximately 10% by weight or more for increasing the absolute value of dielectric anisotropy, and approximately 90% by weight or less for decreasing the viscosity. A further preferred ratio is in the range of approximately 20% by weight to approximately 80% by weight. A particularly preferred ratio is in the range of approximately 30% by weight to approximately 70% by weight.

A preferred ratio of the fifth component is approximately 0.005 part by weight or more for increasing the stability to ultraviolet light or heat, and approximately 1 part by weight or less for decreasing the minimum temperature, based on 100 parts by weight of the liquid crystal composition excluding the first component and the fifth component. A further preferred ratio is in the range of approximately 0.01 part by weight to approximately 0.5 part by weight. A particularly preferred ratio is in the range of approximately 0.03 part by weight to approximately 0.3 part by weight.

Fourth, the preferred embodiment of the component compounds will be explained. $R^1$ is alkyl having 2 to 20 carbons, and in the alkyl, at least one of —$CH_2$— may be replaced by —O— or —S—. $R^2$, $R^3$, $R^4$ and $R^5$ are hydrogen or methyl. $R^6$ and $R^7$ are alkyl having 1 to 12 carbons, alkoxy having 1 to 12 carbons, alkenyl having 2 to 12 carbons, or alkenyl having 2 to 12 carbons in which at least one of hydrogen is replaced by fluorine. Preferred $R^6$ or $R^7$ is alkyl having 1 to 12 carbons for increasing the stability to ultraviolet light or the stability to heat, and alkenyl having 2 to 12 carbons for decreasing the minimum temperature. $R^8$ is alkyl having 1 to 12 carbons, alkoxy having 1 to 12 carbons or alkenyl having 2 to 12 carbons. Preferred $R^8$ is alkyl having 1 to 12 carbons for increasing the stability to ultraviolet light or the stability to heat. $R^9$ and $R^{10}$ are alkyl having 1 to 12 carbons, alkoxy having 1 to 12 carbons, alkenyl having 2 to 12 carbons, or alkenyl having 2 to 12 carbons in which at least one of hydrogen is replaced by fluorine. Preferred $R^9$ or $R^{10}$ is alkyl having 1 to 12 carbons for increasing the stability to ultraviolet light, or the like, or increasing the stability to heat, and alkoxy having 1 to 12 carbons for increasing the absolute value of dielectric anisotropy. $R^{11}$ is alkyl having 1 to 9 carbons. Preferred $R^{11}$ is alkyl having 1, 3, 5, 7 or 9 carbons. Further preferred $R^{11}$ is alkyl having 1 carbon and having a large volatility for avoiding a decrease in the specific resistance caused by heating in air, and alkyl having 7 carbons and having a small volatility for maintaining a large voltage holding ratio not only at room temperature but also at a temperature close to the maximum temperature of the nematic phase even after the device has been used for a long period of time. $R^{12}$ is alkyl having 2 to 20 carbons, and in the alkyl, at least one of —$CH_2$— may be replaced by —O— or —S—, and $R^{12}$ when m is 0 is alkyl having 5 to 20 carbons, and in the alkyl, at least one of —$CH_2$— may be replaced by —O— or —S—.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity. C is preferred in the alkenyl such as 2-butenyl, 2-pentenyl and 2-hexenyl.

Preferred examples of alkenyl in which at least one of hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Alkyl does not include cyclic alkyl. Alkoxy does not include cyclic alkoxy. Alkenyl does not include cyclic alkenyl. With regard to a configuration of 1,4-cyclohexylene, trans is preferred to cis for increasing the maximum temperature.

Ring A is 1,4-cyclohexylene, 1,3-dioxane-2,5-diyl, 1,3-dithiane-2,5-diyl, tetrahydropyran-2,5-diyl, or 1,4-phenylene in which arbitrary hydrogen may be replaced by fluorine. Preferred ring A is 1,4-cyclohexylene or tetrahydropyran-2,5-diyl. Ring B and ring C are 1,4-cyclohexylene, 1,4-phenylene, 2-fluoro-1,4-phenylene, 3-fluoro-1,4-phenylene or 2,5-difluoro-1,4-phenylene, and two of arbitrary ring B when n is 2 or 3 may be identical or different. Preferred ring B or ring C is 1,4-cyclohexylene for decreasing the viscosity, and 1,4-phenylene for increasing the optical anisotropy. With regard to a configuration of 1,4-cyclohexylene, trans is preferred to cis for increasing the maximum temperature. Then, "2-fluoro-1,4-phenylene" or the like is represented by a ring in which a left-hand side is defined as 1-position to show presence of a difference in positions of fluorine between "2-fluoro-1,4-phenylene" and "3-fluoro-1,4-phenylene." Ring D is 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 1,3-dioxane-2,5-diyl or tetrahydropyran-2,5-diyl, and two of arbitrary ring D when p is 2 or 3 may be identical or different. Preferred ring D is 1,4-cyclohexylene for increasing the maximum temperature, 1,4-phenylene for increasing the optical anisotropy, and 3,5-difluoro-1,4-phenylene for increasing the dielectric anisotropy. Ring E and ring G are independently 1,4-cyclohexylene, 1,4-phenylene, 1,4-phenylene in which at least one of hydrogen is replaced by fluorine or chlorine, or tetrahydropyran-2,5-diyl, and two of arbitrary ring E when r is 2 or 3 may be identical or different. Preferred ring E or ring G is 1,4-cyclohexylene for decreasing the viscosity. Ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring F is 2,3-difluoro-1,4-phenylene for decreasing the viscosity and increasing the absolute value of dielectric anisotropy.

$Z^1$ is a single bond, $-CH_2CH_2-$, $-CH=CH-$, $-C\equiv C-$, $-COO-$, $-COO-$, $-CH_2O-$, $-OCH_2-$, $-CF=CF-$, $-CH_2S-$ or $-SCH_2-$. Preferred $Z^1$ is a single bond for decreasing the viscosity. $Z^2$, $Z^4$ and $Z^5$ are independently a single bond, ethylene, methyleneoxy or carbonyloxy, two of arbitrary $Z^2$ when n is 2 or 3 may be identical or different, and two of arbitrary $Z^4$ when r is 2 or 3 may be identical or different. Preferred $Z^2$ is a single bond for decreasing the viscosity. Preferred $Z^4$ or $Z^5$ is a single bond for decreasing the viscosity, and methyleneoxy for increasing the absolute value of dielectric anisotropy. $Z^3$ is a single bond, ethylene, carbonyloxy or difluoromethyleneoxy, and two of arbitrary $Z^3$ when p is 2 or 3 may be identical or different. Preferred $Z^3$ is a single bond for decreasing the viscosity, and difluoromethyleneoxy for increasing the dielectric anisotropy.

$X^1$, $X^2$, $X^3$, $X^4$, $X^5$, $X^6$, $X^7$ and $X^8$ are independently hydrogen or fluorine. Preferred $X^1$, $X^2$, $X^3$, $X^4$, $X^5$, $X^6$, $X^7$ or $X^8$ is fluorine for increasing the dielectric anisotropy, and hydrogen for decreasing the viscosity.

$Y^1$ is fluorine, chlorine, trifluoromethyl or trifluoromethoxy. Preferred $Y^1$ is fluorine for decreasing the viscosity.

Then, m is 0 or 1. Preferred m is 1 for decreasing the volatility. Then, n is 1, 2, or 3. Preferred n is 1 for decreasing the viscosity, and 3 for increasing the maximum temperature. Further, p is 1, 2 or 3. Preferred p is 2 for decreasing the minimum temperature, and 3 for increasing the maximum temperature. Furthermore, r is 1, 2 or 3, s is 0 or 1, and a sum of r and s is 3 or less. Preferred r is 1 for decreasing the minimum temperature. Preferred s is 0 for decreasing the viscosity.

Fifth, the specific examples of the component compounds will be shown. In the preferred compounds described below, $R^1$ is alkyl having 2 to 20 carbons, and in the alkyl, at least one of $-CH_2-$ may be replaced by $-O-$ or $-S-$. $R^{12}$ is alkyl having 2 to 20 carbons, and in the alkyl, at least one of $-CH_2-$ may be replaced by $-O-$ or $-S-$. $R^{13}$ is alkyl having 5 to 20 carbons, and in the alkyl, at least one of $-CH_2-$ may be replaced by $-O-$ or $-S-$. $R^{14}$ is straight-chain alkyl having 1 to 12 carbons or straight-chain alkenyl having 1 to 12 carbons. $R^{15}$ is straight-chain alkyl having 1 to 12 carbons, straight-chain alkoxy having 1 to 12 carbons, or straight-chain alkenyl having 2 to 12 carbons. $R^{16}$ is straight-chain alkyl having 1, 3, 5, 7 or 9 carbons.

Preferred compound (1) includes compound (1-1-1), compound (1-1-2), compound (1-2-1), compound (1-2-2), compound (1-3-1) and compound (1-3-2). Further preferred compound (1) includes compound (1-1-1), compound (1-1-2), compound (1-2-1) and compound (1-2-2). Particularly preferred compound (1) includes compound (1-1-2) and compound (1-2-1). Preferred compound (2) includes compound (2-1-1) to compound (2-13-1). Further preferred compound (2) includes compound (2-1-1), compound (2-3-1), compound (2-5-1), compound (2-7-1) and compound (2-9-1). Particularly preferred compound (2) includes compound (2-1-1). Preferred compound (3) includes compound (3-1-1), compound (3-2-1), compound (3-3-1), compound (3-3-2), compound (3-4-1), compound (3-5-1), compound (3-5-2), compound (3-6-1), compound (3-6-2), compound (3-7-1), compound (3-8-1), compound (3-9-1), compound (3-10-1), compound (3-10-2), compound (3-11-1), compound (3-12-1), compound (3-13-1), compound (3-13-2), compound (3-14-1), compound (3-15-1), compound (3-16-1), compound (3-17-1), compound (3-17-2) and compound (3-18-1). Further preferred compound (3) includes compound (3-2-1), compound (3-3-1), compound (3-4-1), compound (3-5-1), compound (3-6-1), compound (3-8-1), compound (3-10-1), compound (3-10-2), compound (3-17-1) and compound (3-17-2). Particularly preferred compound (3) includes compound (3-3-1) and compound (3-10-1). Preferred compound (4) includes compound (4-1-1) to compound (4-19-1). Further preferred compound (4) includes compound (4-1-1), compound (4-2-1), compound (4-4-1), compound (4-6-1), compound (4-8-1), compound (4-11-1) and compound (4-13-1). Particularly preferred compound (4) includes compound (4-4-1) and compound (4-6-1). Preferred compound (5) includes compound (5-1). Preferred compound (1-a) includes compound (1-a-1) to compound (1-a-110).

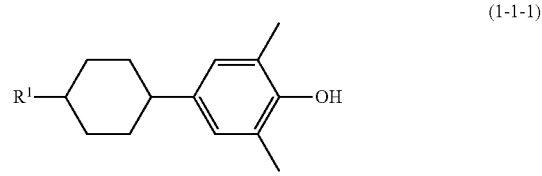

(1-1-1)

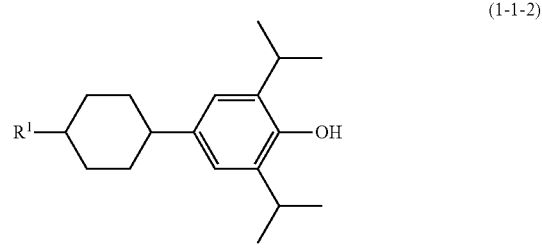

(1-1-2)

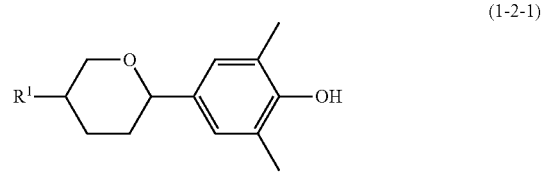

(1-2-1)

(1-2-2)
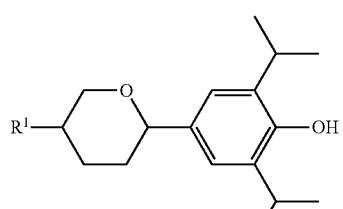
(1-3-1)
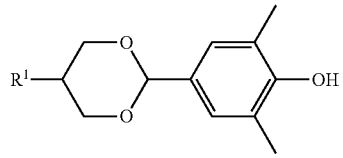
(1-3-2)
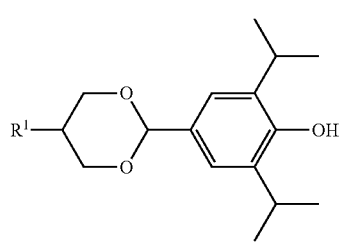
(2-1-1)
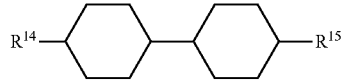
(2-2-1)
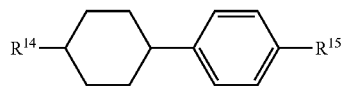
(2-3-1)
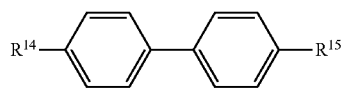
(2-4-1)
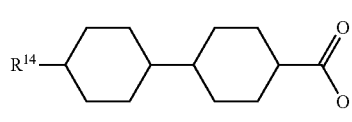
(2-5-1)
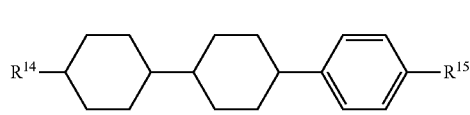
(2-6-1)
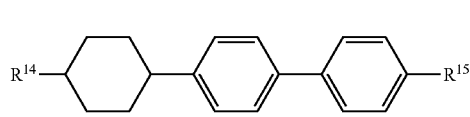
(2-7-1)
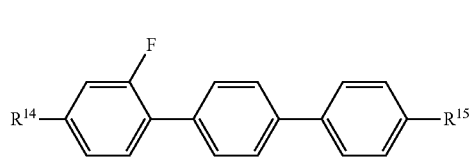
(2-8-1)
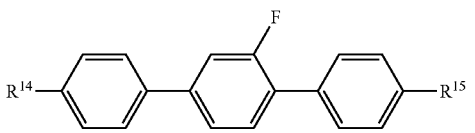
(2-9-1)
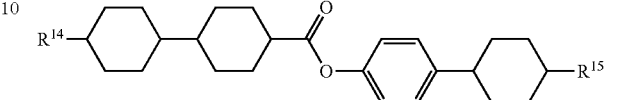
(2-10-1)
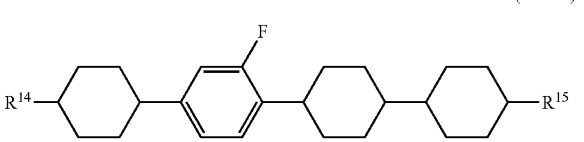
(2-11-1)
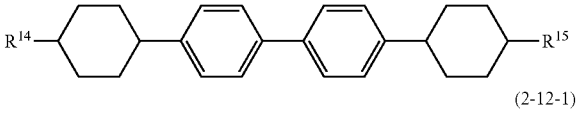
(2-12-1)
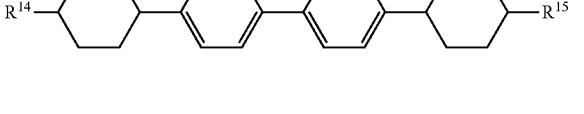
(2-13-1)
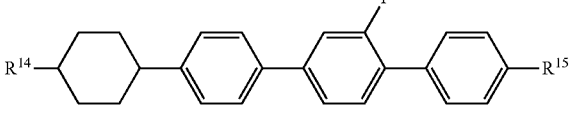
(3-1-1)
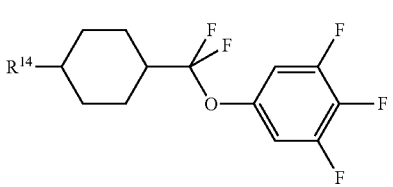
(3-2-1)
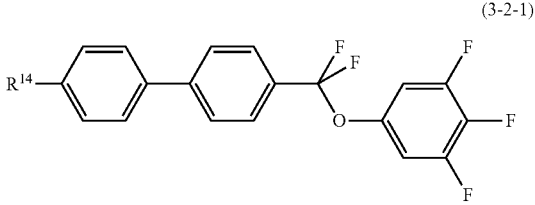
(3-3-1)
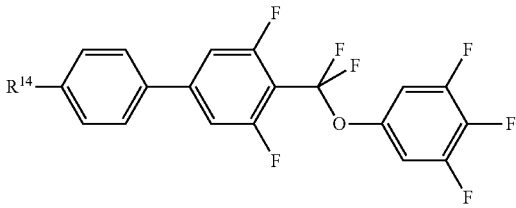

(3-3-2) 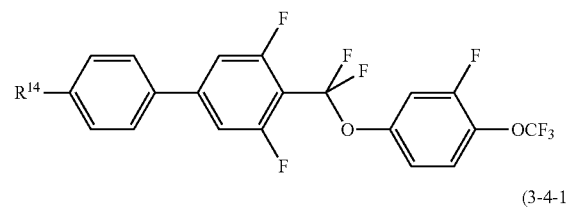
(3-4-1) 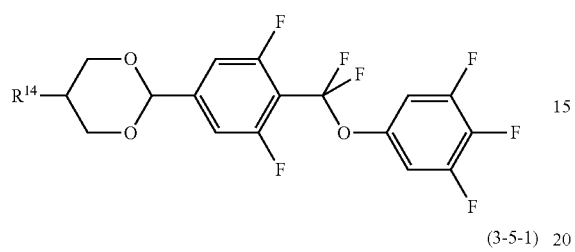
(3-5-1) 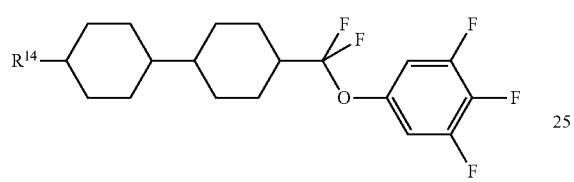
(3-5-2) 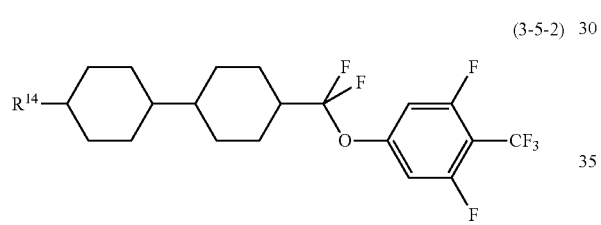
(3-6-1) 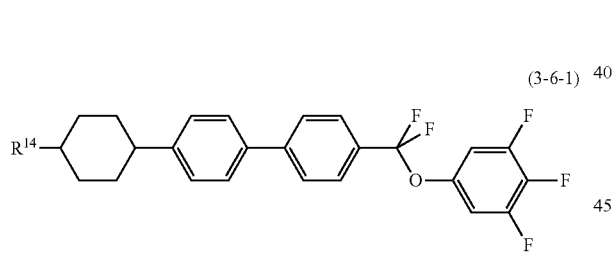
(3-6-2) 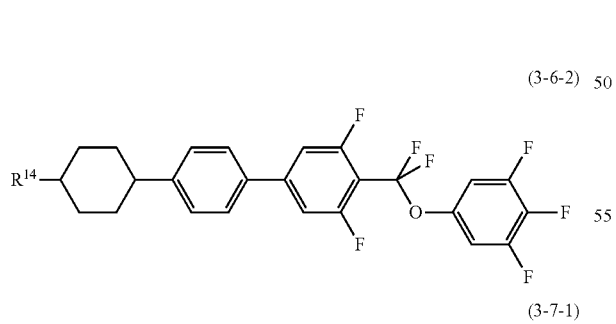
(3-7-1) 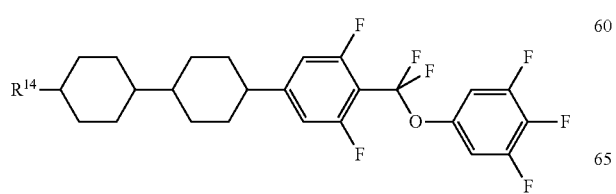
(3-8-1) 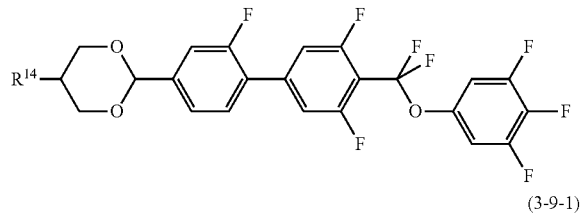
(3-9-1) 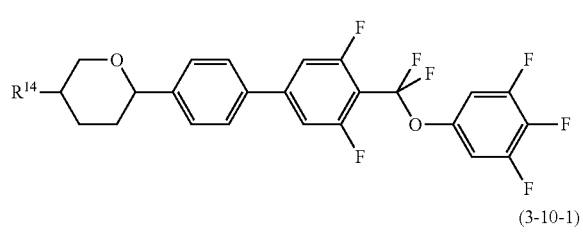
(3-10-1) 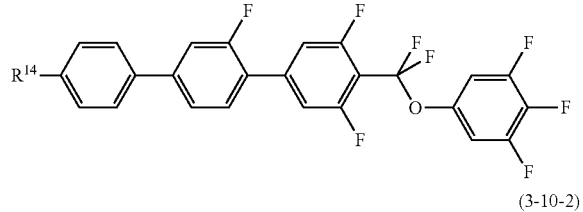
(3-10-2) 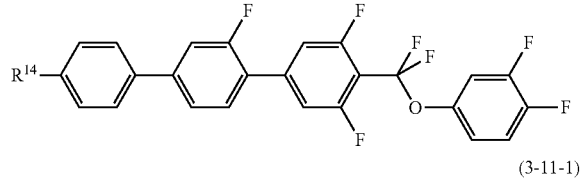
(3-11-1) 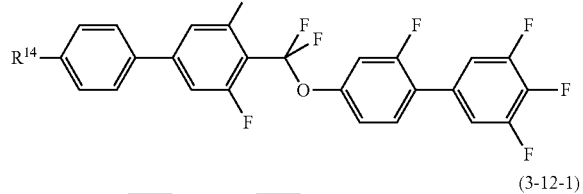
(3-12-1) 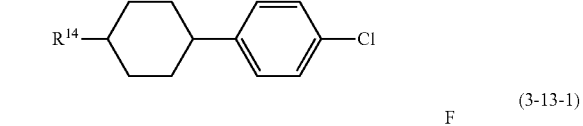
(3-13-1) 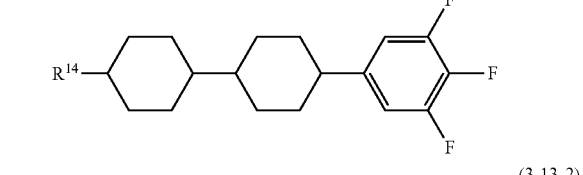
(3-13-2) 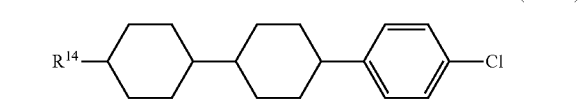
(3-14-1) 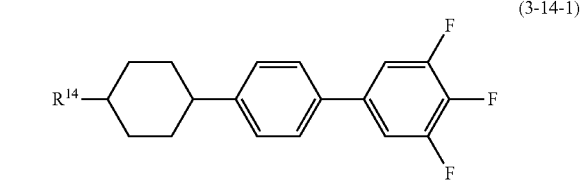

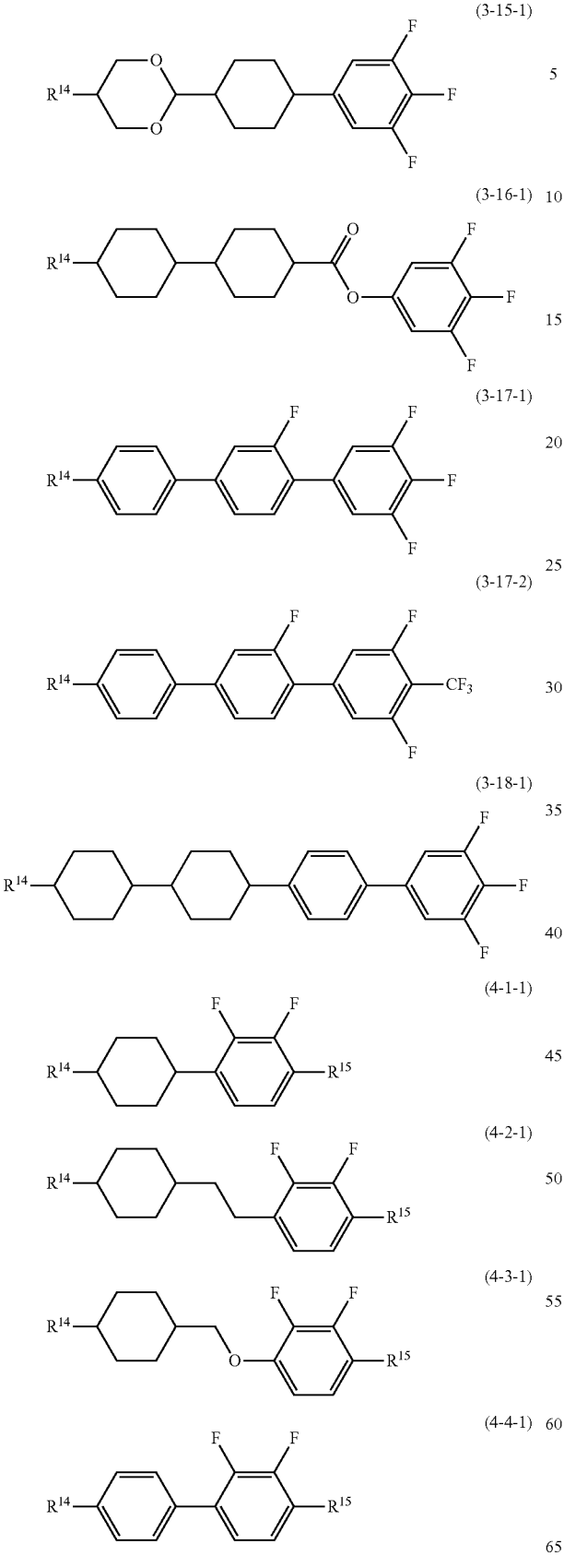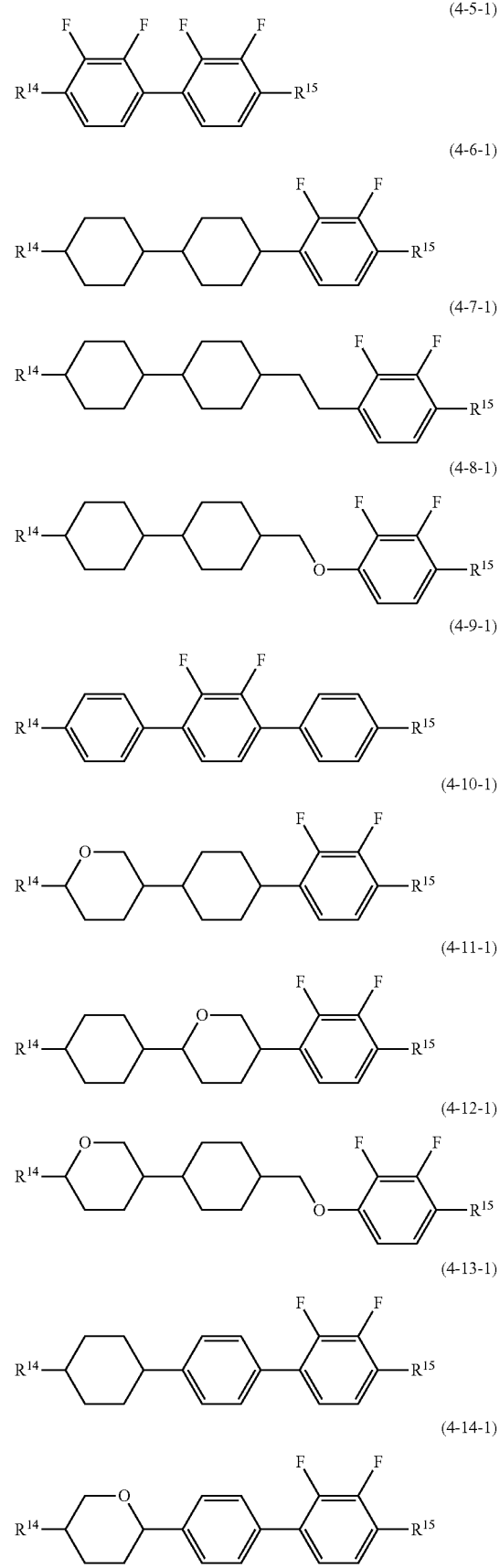

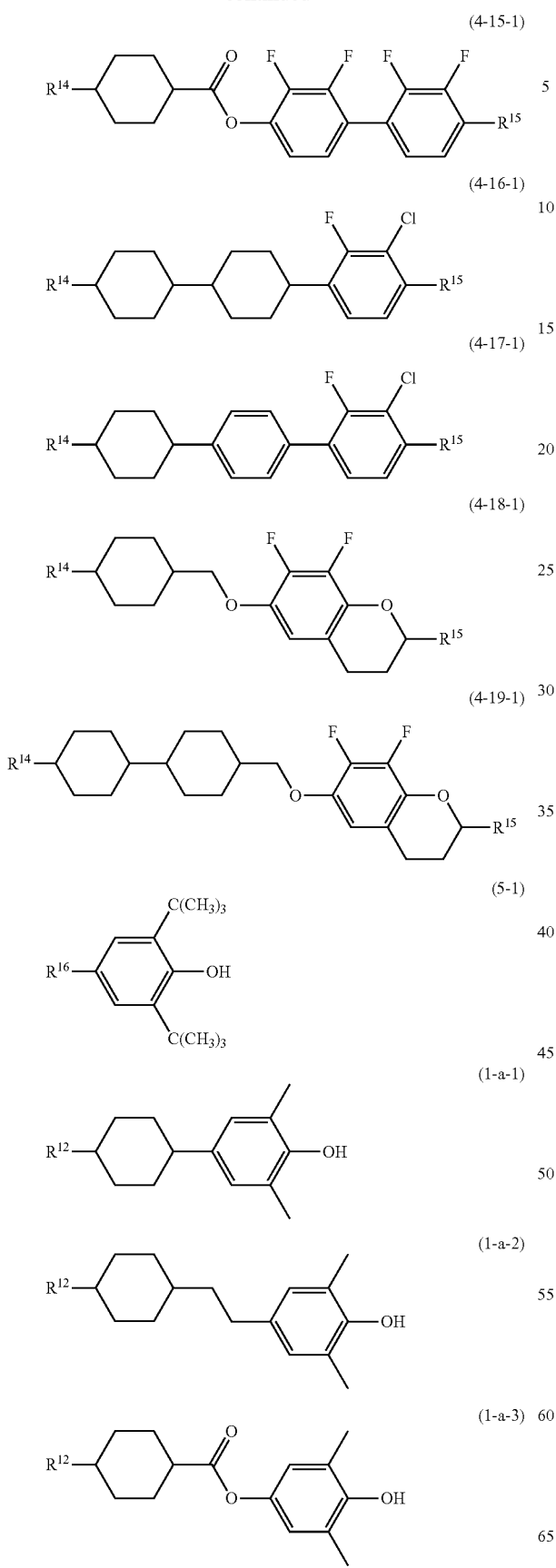
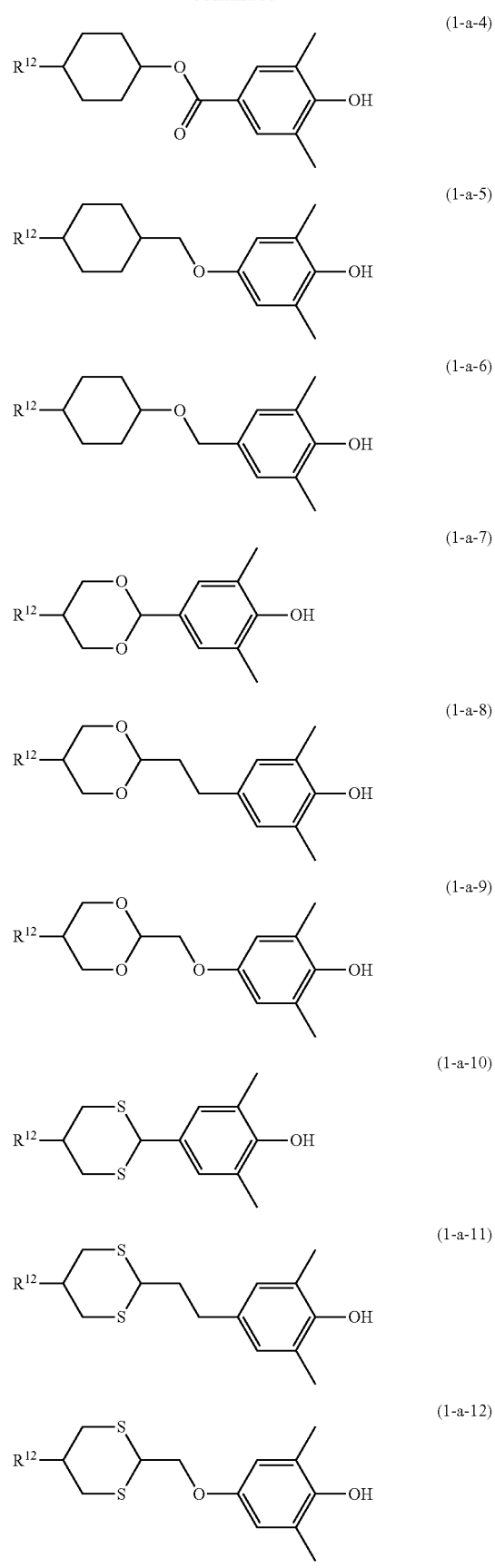

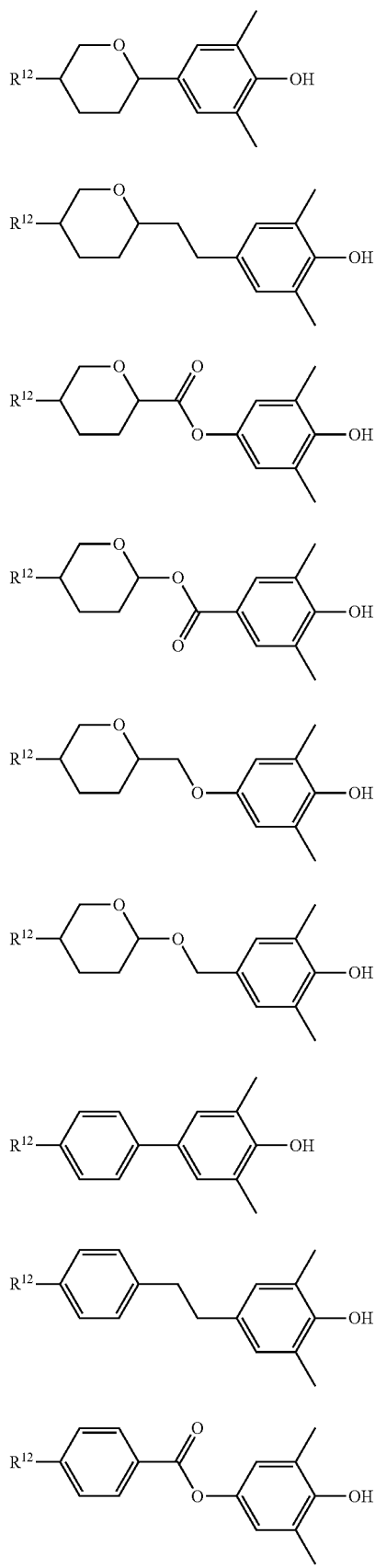
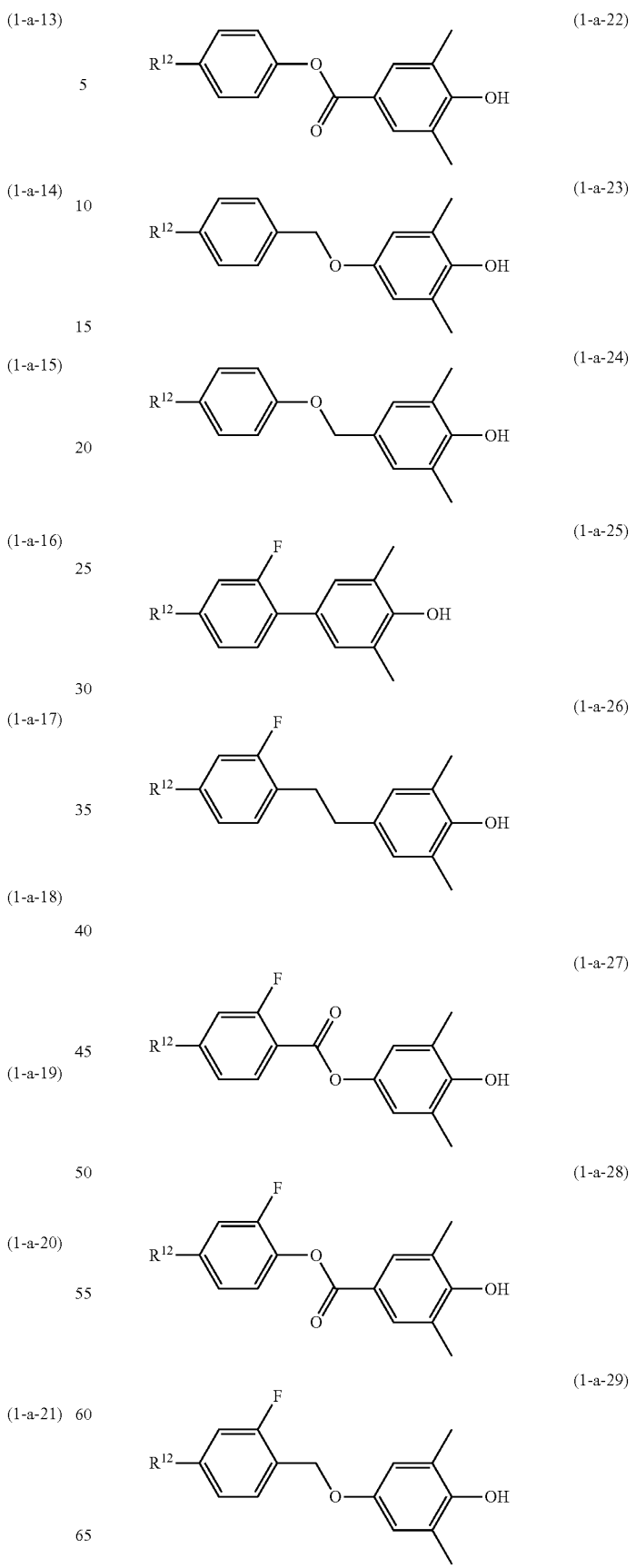

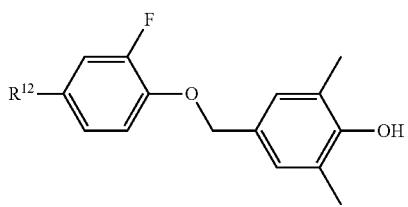
(1-a-30)
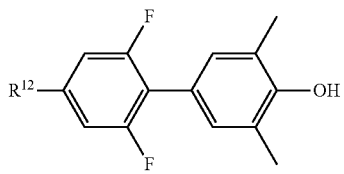
(1-a-31)
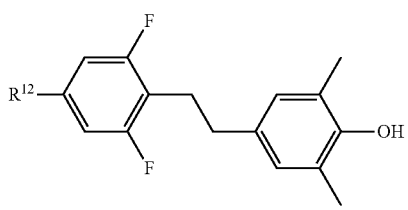
(1-a-32)
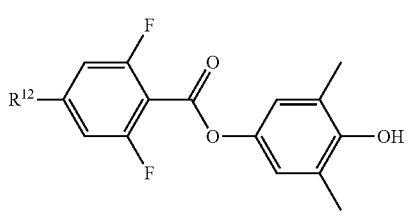
(1-a-33)
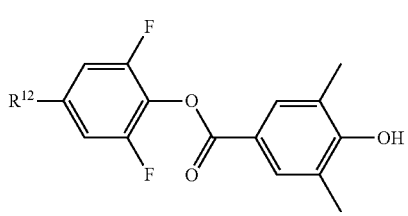
(1-a-34)
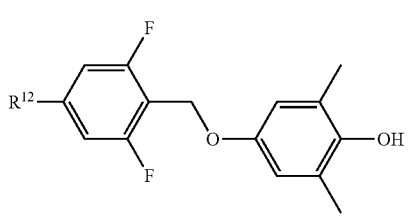
(1-a-35)
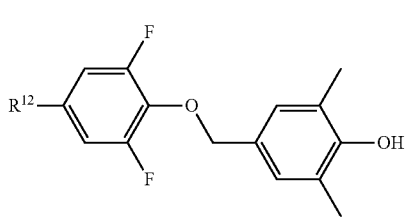
(1-a-36)
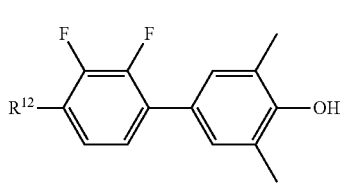
(1-a-37)
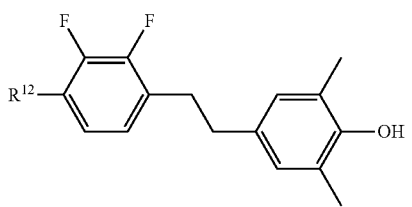
(1-a-38)
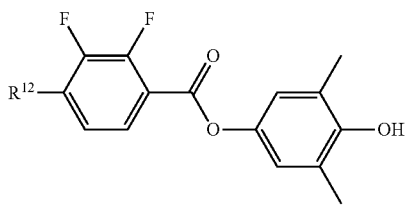
(1-a-39)
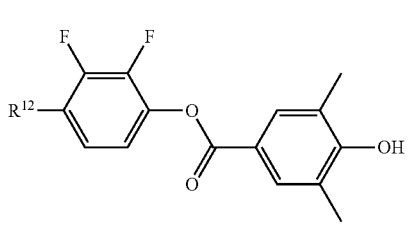
(1-a-40)
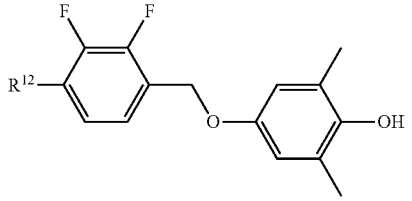
(1-a-41)
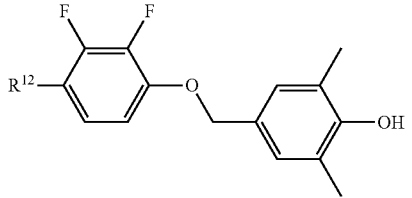
(1-a-42)
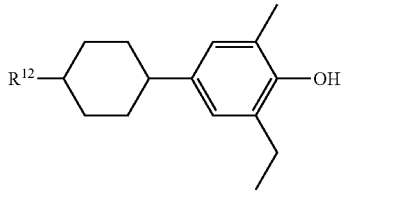
(1-a-43)
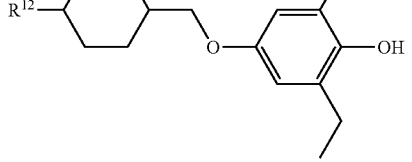
(1-a-44)

-continued
(1-a-45)
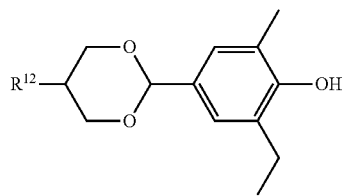
(1-a-46)
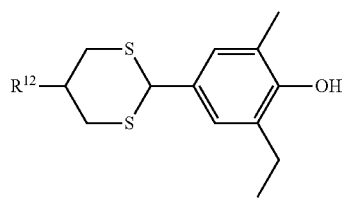
(1-a-47)
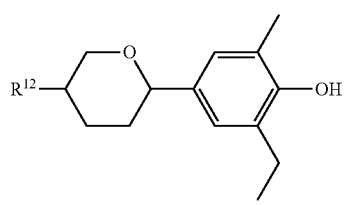
(1-a-48)
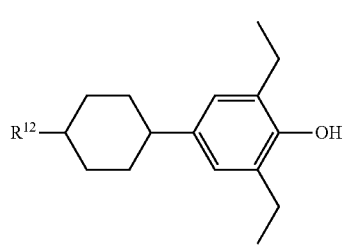
(1-a-49)
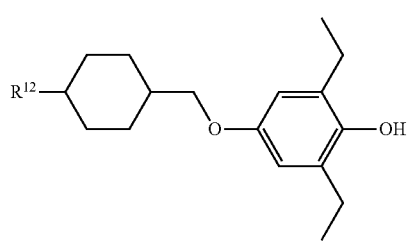
(1-a-50)
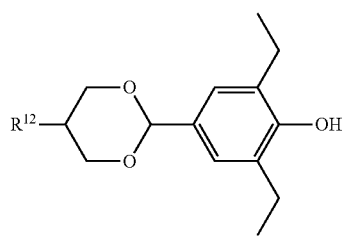
(1-a-51)
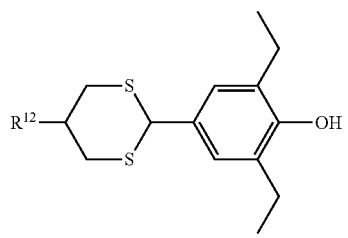
(1-a-52)
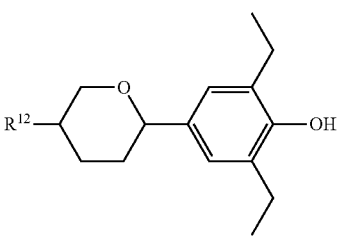
(1-a-53)
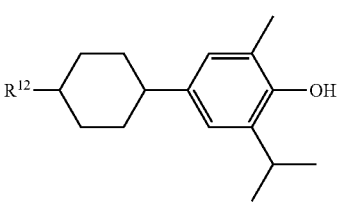
(1-a-54)
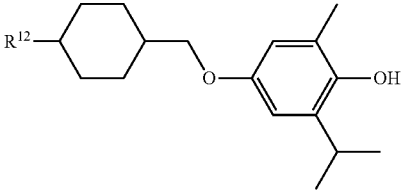
(1-a-55)
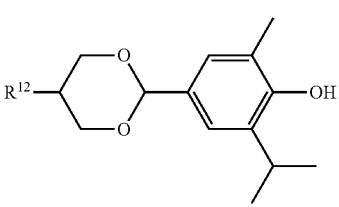
(1-a-56)
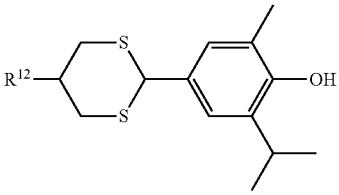
(1-a-57)
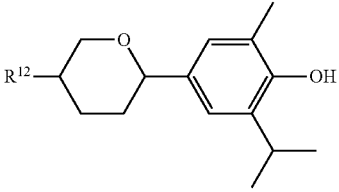
(1-a-58)
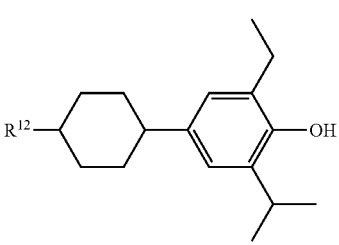

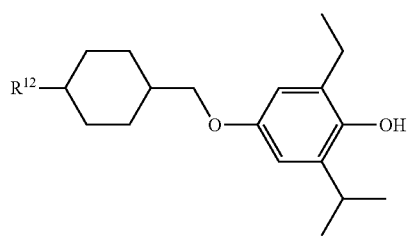
(1-a-59)
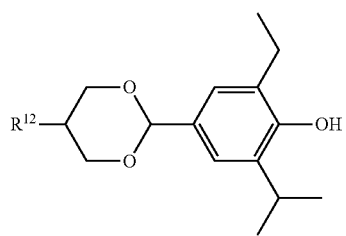
(1-a-60)
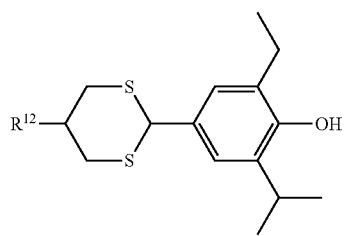
(1-a-61)
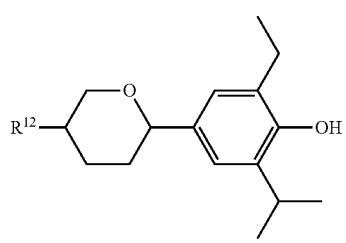
(1-a-62)
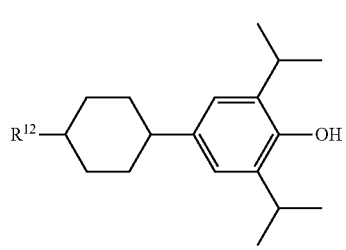
(1-a-63)
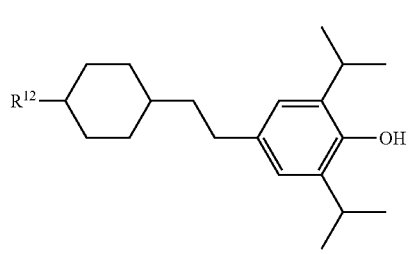
(1-a-64)
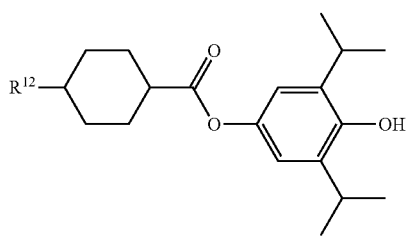
(1-a-65)
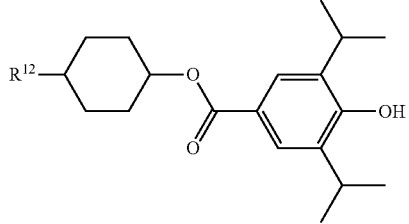
(1-a-66)
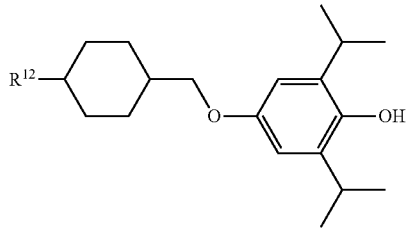
(1-a-67)
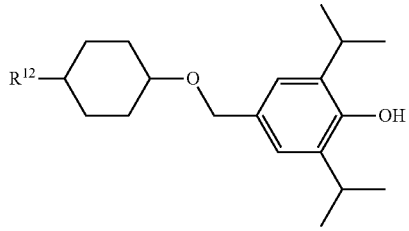
(1-a-68)
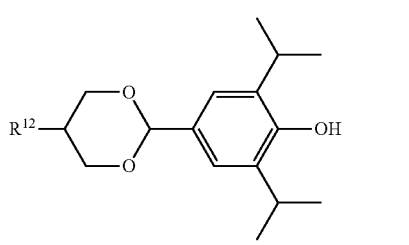
(1-a-69)
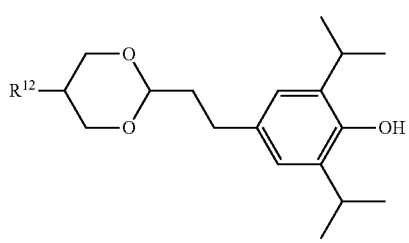
(1-a-70)

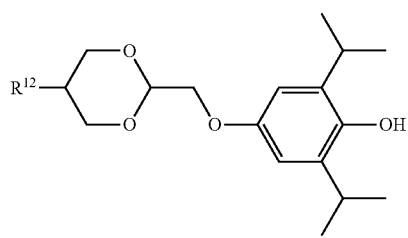
(1-a-71)
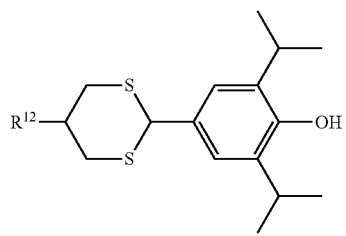
(1-a-72)
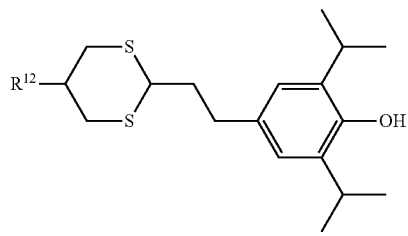
(1-a-73)
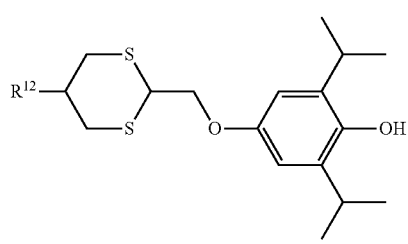
(1-a-74)
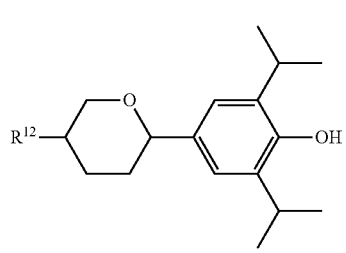
(1-a-75)
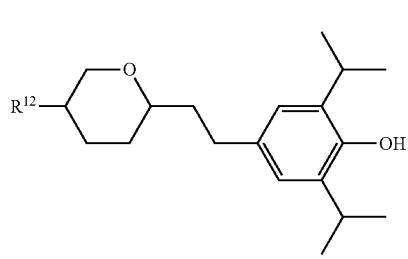
(1-a-76)
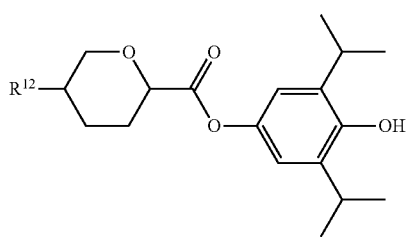
(1-a-77)
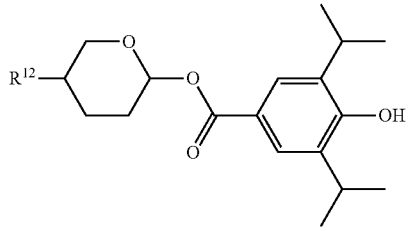
(1-a-78)
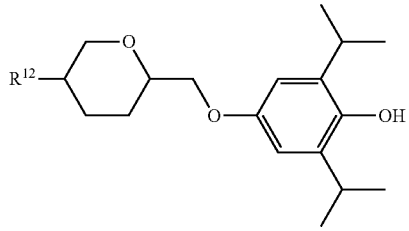
(1-a-79)
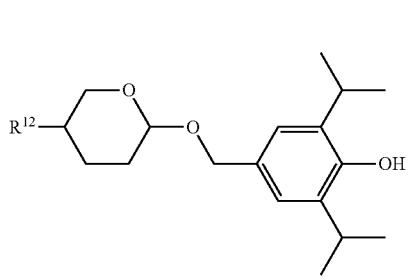
(1-a-80)
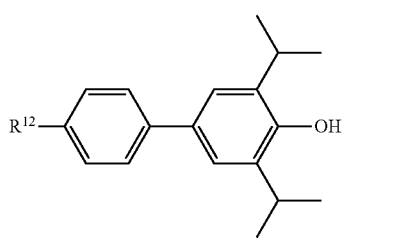
(1-a-81)
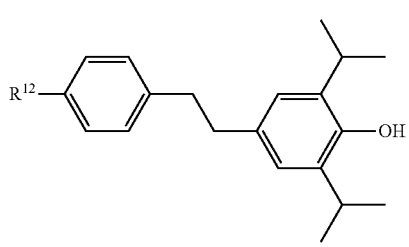
(1-a-82)

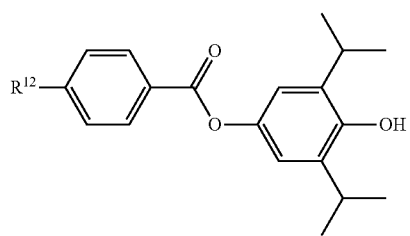 (1-a-83)
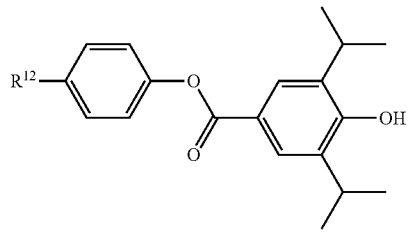 (1-a-84)
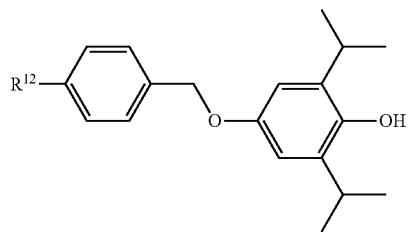 (1-a-85)
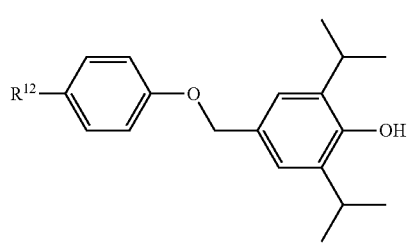 (1-a-86)
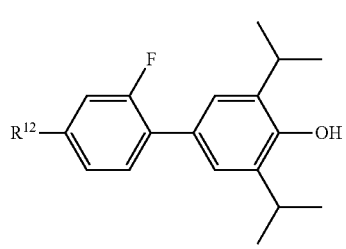 (1-a-87)
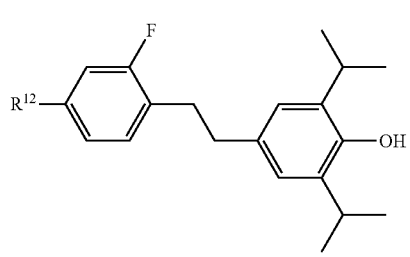 (1-a-88)
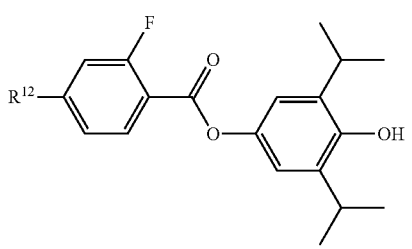 (1-a-89)
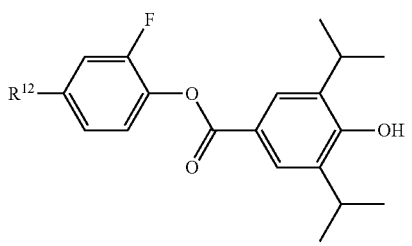 (1-a-90)
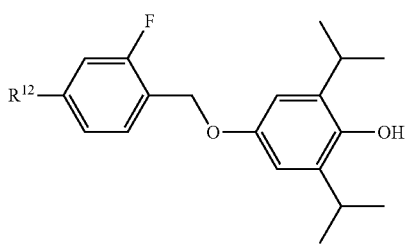 (1-a-91)
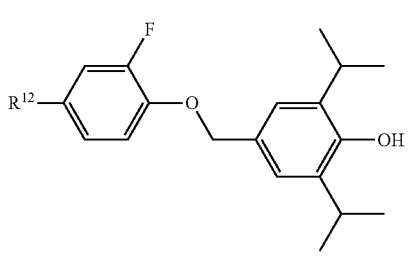 (1-a-92)
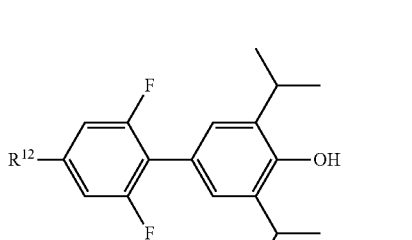 (1-a-93)
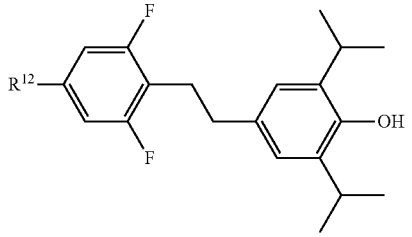 (1-a-94)

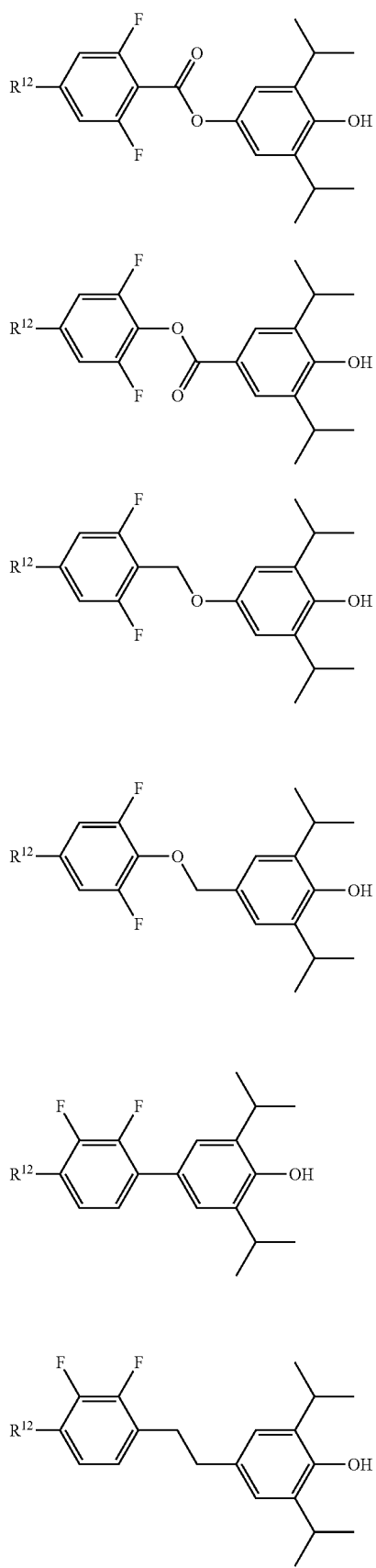
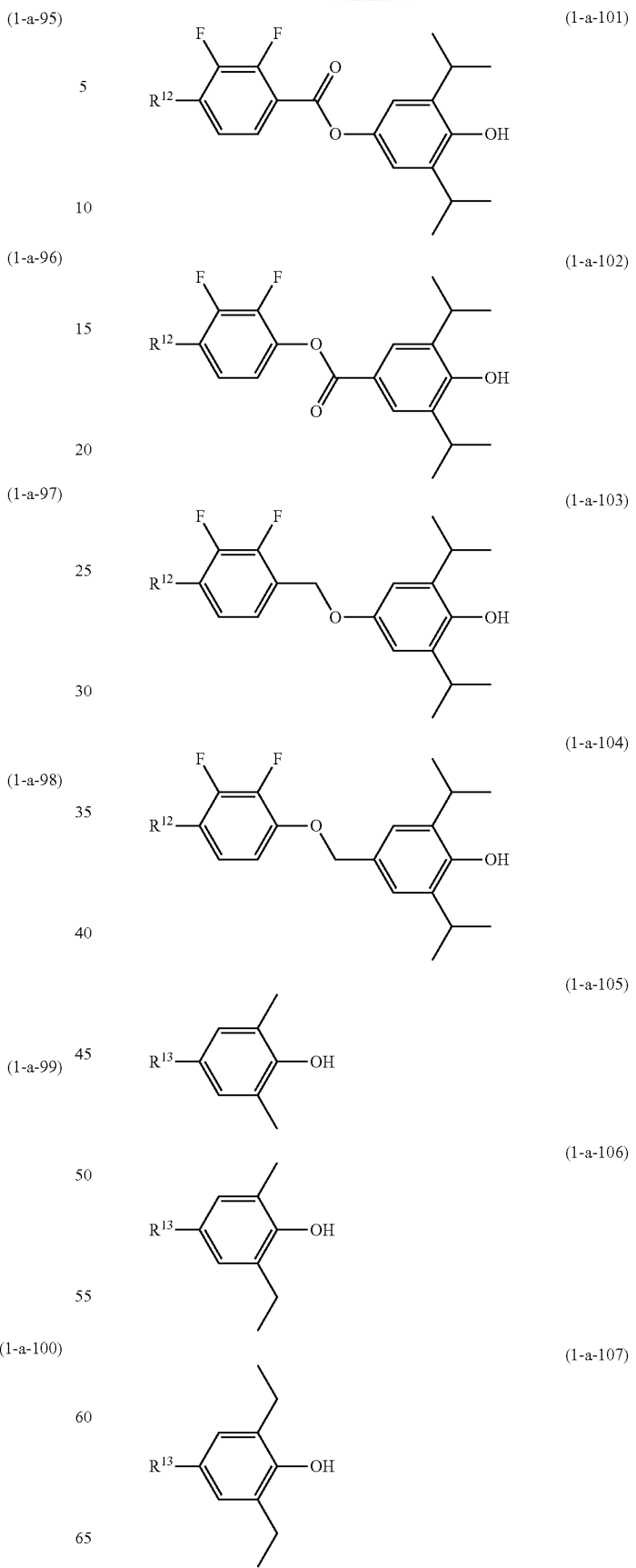

(1-a-108)

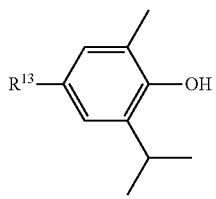

(1-a-109)

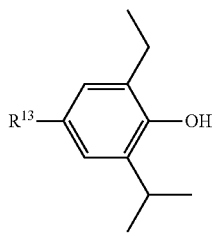

(1-a-110)

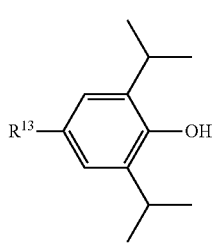

Sixth, the additive that may be mixed with the composition will be explained. Such an additive includes the optically active compound, the antioxidant, the ultraviolet light absorber, the dye, the antifoaming agent, the polymerizable compound and the polymerization initiator. The optically active compound is mixed with the composition for the purpose of inducing a helical structure in liquid crystals to give a twist angle. Examples of such a compound include compound (6-1) to compound (6-5). A preferred ratio of the optically active compound is approximately 5% by weight or less. A further preferred ratio is in the range of approximately 0.01% by weight to approximately 2% by weight.

(6-1)

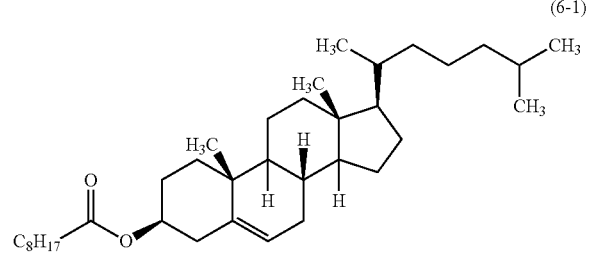

(6-2)

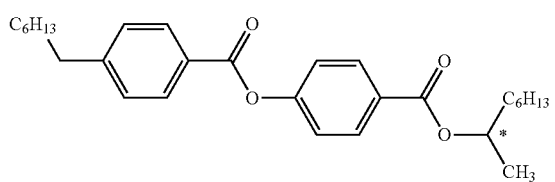

(6-3)

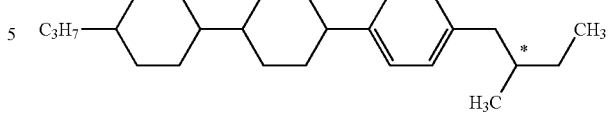

(6-4)

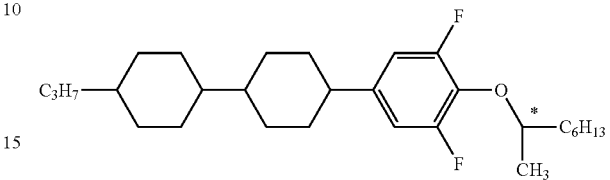

(6-5)

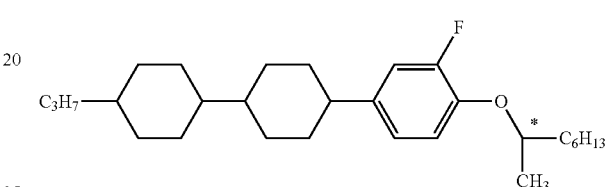

Preferred examples of the ultraviolet light absorber include a benzophenone derivative, a benzoate derivative and a triazole derivative. A light stabilizer such as an amine having steric hindrance is also preferred. A preferred ratio of the light absorber or the stabilizer is approximately 50 ppm or more for achieving the effect thereof, and approximately 10,000 ppm or less for avoiding a decrease in the maximum temperature or avoiding an increase in the minimum temperature. A further preferred ratio is in the range of approximately 100 ppm to approximately 10,000 ppm.

A dichroic dye such as an azo dye or an anthraquinone dye is mixed with the composition to be adapted for a device having a guest host (GH) mode. A preferred ratio of the dye is in the range of approximately 0.01% by weight to approximately 10% by weight based on the liquid crystal composition. The antifoaming agent such as dimethyl silicone oil or methyl phenyl silicone oil is mixed with the composition for preventing foam formation. A preferred ratio of the antifoaming agent is approximately 1 ppm or more for achieving the effect thereof, and approximately 1,000 ppm or less for avoiding a poor display, based on the liquid crystal composition. A further preferred ratio is in the range of approximately 1 ppm to approximately 500 ppm.

The polymerizable compound is mixed with the composition to be adapted for a device having the polymer sustained alignment (PSA) mode. Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate derivative or a methacrylate derivative. Examples of such a compound include compound (7-1) to compound (7-9) A preferred ratio of the polymerizable compound is approximately 0.05% by weight or more for achieving the effect thereof, and approximately 10% by weight or less for avoiding a poor display. A further preferred ratio is in the range of approximately 0.1% by weight to approximately 2% by weight.

(7-1) 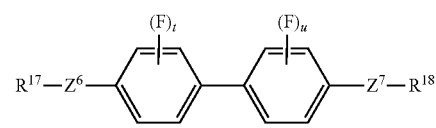

(7-2) 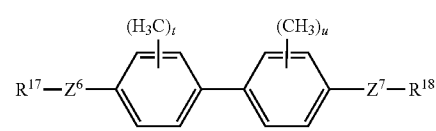

(7-3) 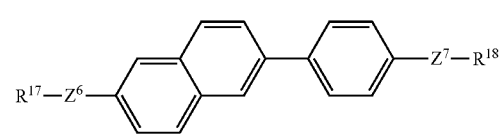

(7-4) 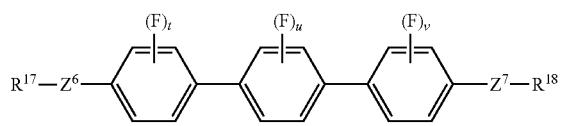

(7-5) 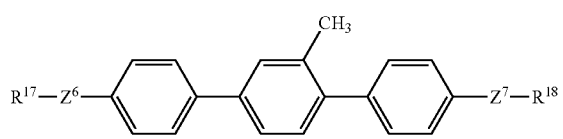

(7-6) 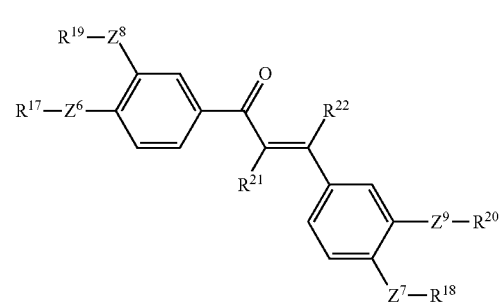

(7-7) 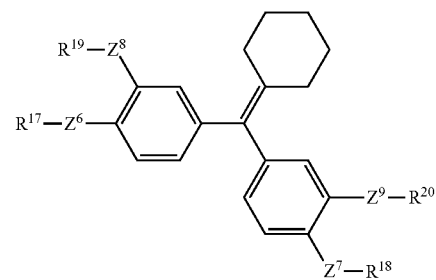

(7-8) 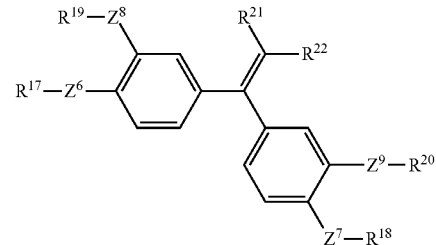

(7-9) 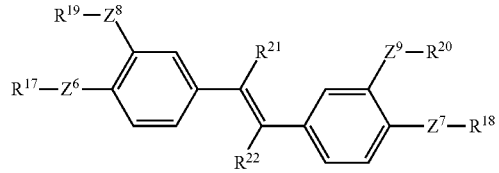

wherein, $R^{17}$, $R^{18}$, $R^{19}$ and $R^{20}$ are independently acryloyl or methacryloyl, $R^{21}$ and $R^{22}$ are independently hydrogen, halogen or alkyl having 1 to 10 carbons, $Z^6$, $Z^7$, $Z^8$ and $Z^9$ are independently a single bond or alkylene having 1 to 12 carbons, at least one of —$CH_2$— may be replaced by —O— or —CH=CH—, and t, u and v are 0, 1 or 2.

The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to those skilled in the art and are described in literatures. For example, Irgacure 651 (registered trade name; BASF), Irgacure 184 (registered trade name; BASF) or Darocure 1173 (registered trade name; BASF), each being a photoinitiator, is suitable for radical polymerization. A preferred ratio of the photopolymerization initiator is in the range of approximately 0.1% by weight to approximately 5% by weight based on the polymerizable compound, and a particularly preferred ratio is in the range of approximately 1% by weight to approximately 3% by weight.

Preferred examples of the antioxidant that may be added to the composition include compound (8-1) to compound (8-6) where x is an integer from 1 to 9. In compound (8-1) to compound (8-6), preferred x is 1, 3, 5, 7 or 9. Further preferred x is 3. A preferred ratio of the antioxidant is approximately 50 ppm or more for achieving the effect thereof, and approximately 600 ppm or less for avoiding a decrease in the maximum temperature or avoiding an increase in the minimum temperature, based on the composition. A further preferred ratio is in the range of approximately 100 ppm to approximately 300 ppm.

(8-1) 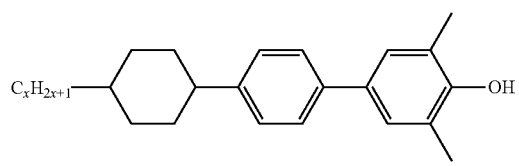

(8-2) 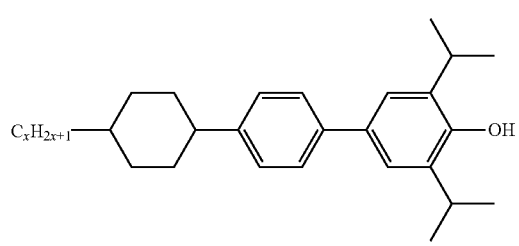

-continued
(8-3)
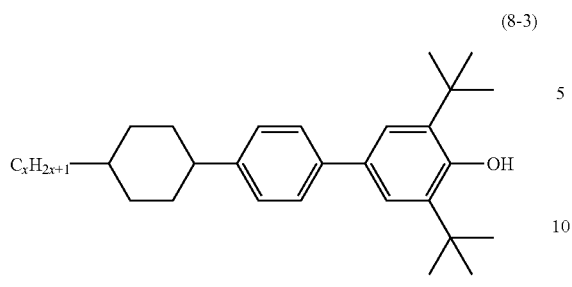
(8-4)
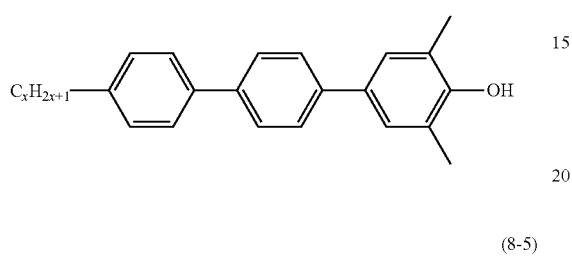
(8-5)
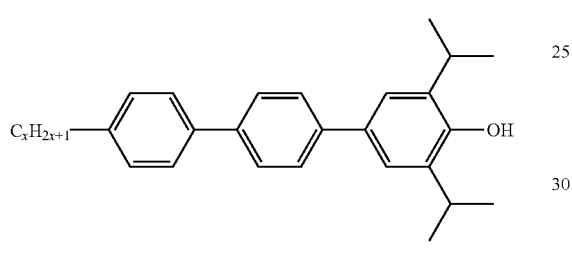
(8-6)
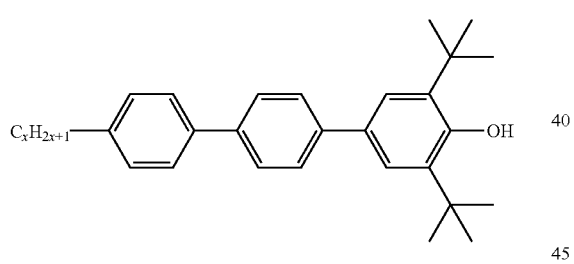
Seventh, the methods for synthesizing the component compounds will be explained. Compound (1) can be prepared by suitably combining techniques in synthetic organic chemistry.
For example, compound (1-1) can be prepared according to reaction formula (A).
-continued
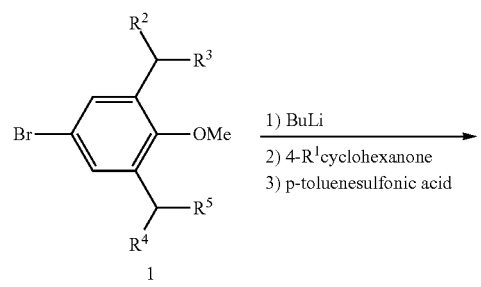
1
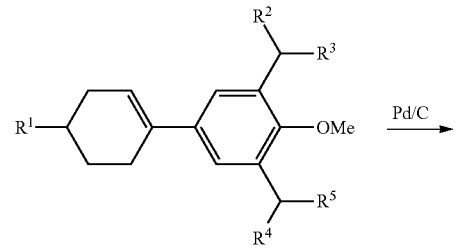
3
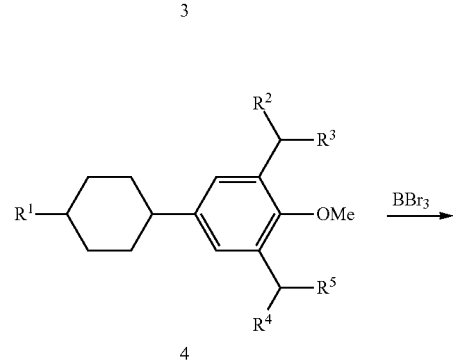
4
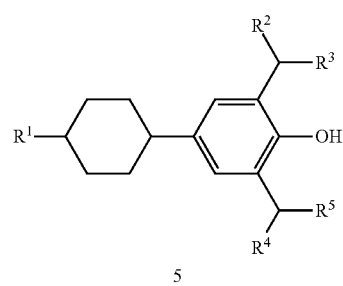
5
Compound (1-2) can be prepared according to reaction formula (B).
(A)
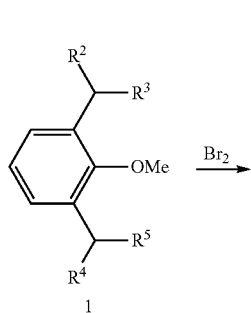
(B)
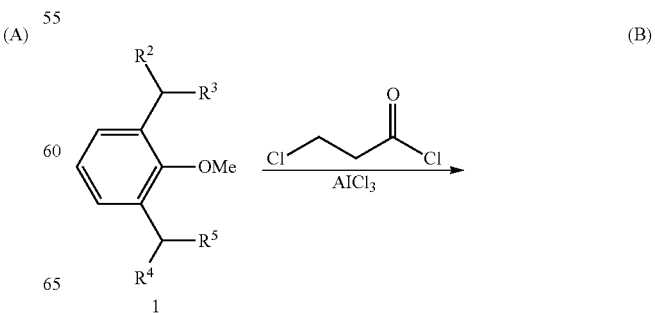

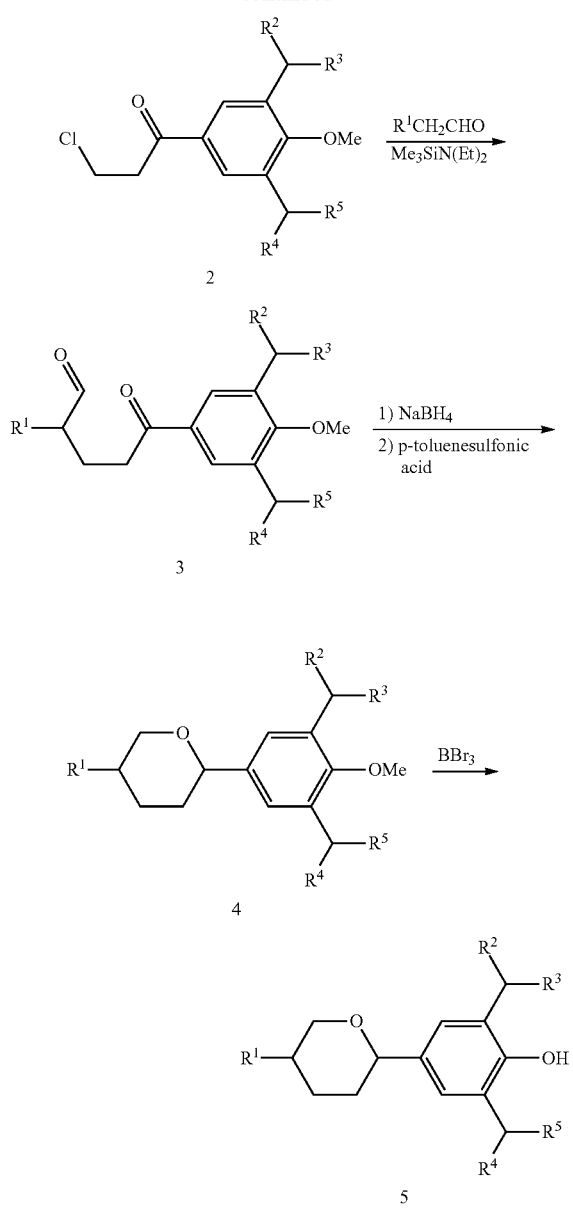

Compound (1-3), and compound (1) in which ring A is 1,3-dithiane-2,5-diyl, $Z^1$ is a single bond and n is 1 can be prepared according to reaction formula (C).

(C)

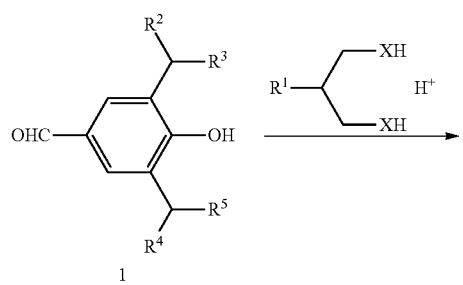

Compound (1) in which ring A is 1,4-phenylene, $Z^1$ is a single bond and n is 1 can be prepared according to reaction formula (D).

(D)

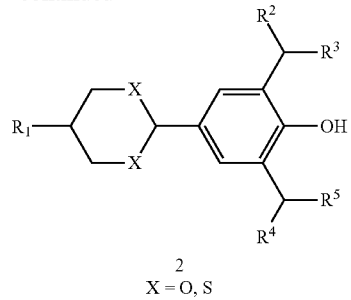

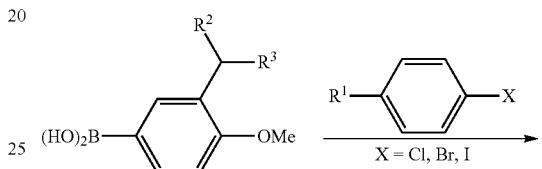

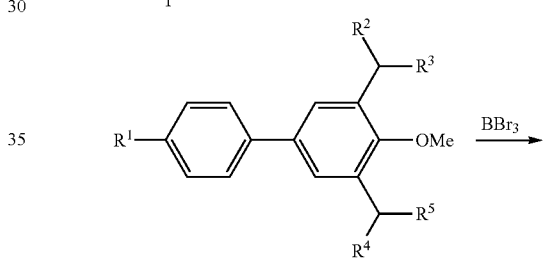

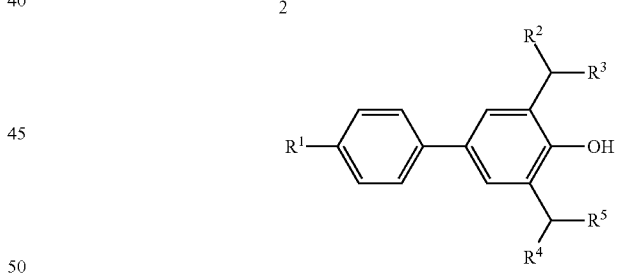

Compound (2) to compound (5) can be prepared according to known methods. Examples of synthetic methods will be shown. Compound (2-1-1) and compound (2-5-1) are prepared by the method described in JP S59-176221 A. Compound (3-3-1), compound (3-6-2), compound (3-7-1) and compound (3-10-1) are prepared by the method described in JP H10-251186 A. Compound (3-14-1) and compound (3-16-1) are prepared by the method described in JP H2-233626 A. Compound (4-1-1) is prepared by the method described in JP 2000-053602 A. The antioxidant is commercially available. Compound (5-1) in which $R^{16}$ is alkyl having 1 carbon is available from Sigma-Aldrich Corporation. Compound (5-1) in which $R^{16}$ is alkyl having 7 carbons, and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be explained. The composition of the invention mainly has a minimum temperature of approximately −10° C. or lower, a maximum temperature of approximately 70° C. or higher, and an optical anisotropy in the range of approximately 0.07 to approximately 0.20. A device including the composition has a large voltage holding ratio. The composition is suitable for use in the AM device. The composition is particularly suitable for use in a transmissive AM device. A composition having an optical anisotropy in the range of approximately 0.08 to approximately 0.25, and also a composition having an optical anisotropy in the range of approximately 0.10 to approximately 0.30 may be prepared by controlling the ratio of the component compounds or by mixing with any other liquid crystal compound. The composition can be used as the composition having the nematic phase and as the optically active composition by adding the optically active compound.

The composition can be used for the AM device. The composition can also be used for a PM device. The composition can be used for an AM device and a PM device both having a mode such as PC, TN, STN, ECB, OCB, IPS, FFS, VA, PSA or FPA. Use for an AM device having the TN mode, the OCB mode, the IPS mode or the FFS mode is particularly preferred. In an AM device having the IPS mode or the FFS mode, alignment of liquid crystal molecules in a state of no voltage application may be parallel or perpendicular to a panel substrate. The device may be of a reflective type, a transmissive type or a transflective type. Use for a transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, and for a polymer dispersed (PD) device in which a three-dimensional network-polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereinafter, the invention will be explained in detail by way of Examples, but the invention is not limited by the Examples.

A compound obtained by synthesis was identified by means of proton nuclear magnetic resonance spectroscopy ($^1$H-NMR), high performance liquid chromatography (HPLC), ultraviolet-visible spectrophotometry (UV/Vis) or the like. A melting point of the compound was determined by differential scanning calorimetry (DSC). First, each analytical method will be explained.

$^1$H-NMR analysis: As a measuring apparatus, DRX-500 (made by Bruker BioSpin Corporation) was used. A sample prepared in Examples and so forth was dissolved into a deuterated solvent such as $CDCl_3$ in which the sample was soluble, and measurement was carried out under the conditions of room temperature, 500 MHz, 24 times of accumulation and so forth. In the explanation of nuclear magnetic resonance spectra obtained, s, d, t, q and m stand for a singlet, a doublet, a triplet, a quartet, and amultiplet, respectively. Moreover, tetramethylsilane (TMS) was used as an internal standard for a zero point of chemical shifts (δ values).

HPLC analysis: As a measuring apparatus, Prominence (LC-20AD; SPD-20A) made by Shimadzu Corporation was used. As a column, YMC-Pack ODS-A (length 150 mm, bore 4.6 mm, particle diameter 5 μm) made by YMC Co., Ltd. was used. As an effluent, acetonitrile/water (volume ratio: 80/20) was used and a flow rate was adjusted to 1 mL/min. As a detector, an UV detector, a RI detector and a CORONA detector or the like was suitably used. When the UV detector was used, a detection wavelength was set at 254 nanometers.

A sample was dissolved into acetonitrile to prepare a solution of 0.1% by weight, and 1 microliter of the solution obtained was introduced into a sample injector.

As a recorder, C-R7Aplus made by Shimadzu Corporation was used. The chromatogram obtained shows a retention time of a peak and a value of each peak area corresponding to each component compound.

A ratio of peak areas in the chromatogram obtained from HPLC corresponds to a ratio of component compounds. In general, the weight percent of each component compound in an analytical sample is not completely identical with the percentage of each peak area in the analytical sample. When the columns described above are used in the invention, however, the weight percent of each component compound in the analytical sample corresponds substantially to the percentage of each peak area in the analytical sample because a correction coefficient is essentially 1 (one). The reason is that no significant difference exists among the correction coefficients of the component compounds. In order to more accurately determine a composition ratio of the liquid crystal compounds in the liquid crystal composition by the chromatogram, an internal standard method by the chromatogram is applied. Each component (test-component) of the liquid crystal compounds and a liquid crystal compound as a standard (standard reference material) as weighed accurately in a fixed amount are simultaneously analyzed by means of HPLC, and relative intensity is calculated in advance relative to a ratio of a peak area of the test-component to a peak area of the standard reference material. When corrected using the relative intensity of the peak area of each component to the peak area of the standard reference material, the composition ratio of the liquid crystal compounds in the liquid crystal composition can be more accurately determined from the chromatogram.

UV/Vis analysis: As a measuring apparatus, PharmaSpec UV-1700 made by Shimadzu Corporation was used. A detection wavelength was set to 190 nanometers to 700 nanometers.

A sample was dissolved into acetonitrile to prepare a solution of 0.01 mmol/L, and put in a quartz cell (optical path length 1 cm), and measurement was carried out.

DSC measurement: A sample was heated and then cooled at a rate of 3° C. per minute using a differential scanning calorimeter, DSC-7 System or Diamond DSC System, made by PerkinElmer, Inc. A starting point (on set) of an endothermic peak or an exothermic peak caused by a phase change of the sample was determined by extrapolation, and thus a melting point was determined.

Example 1

Compound (1-a-1) was prepared according to the synthetic scheme shown below.

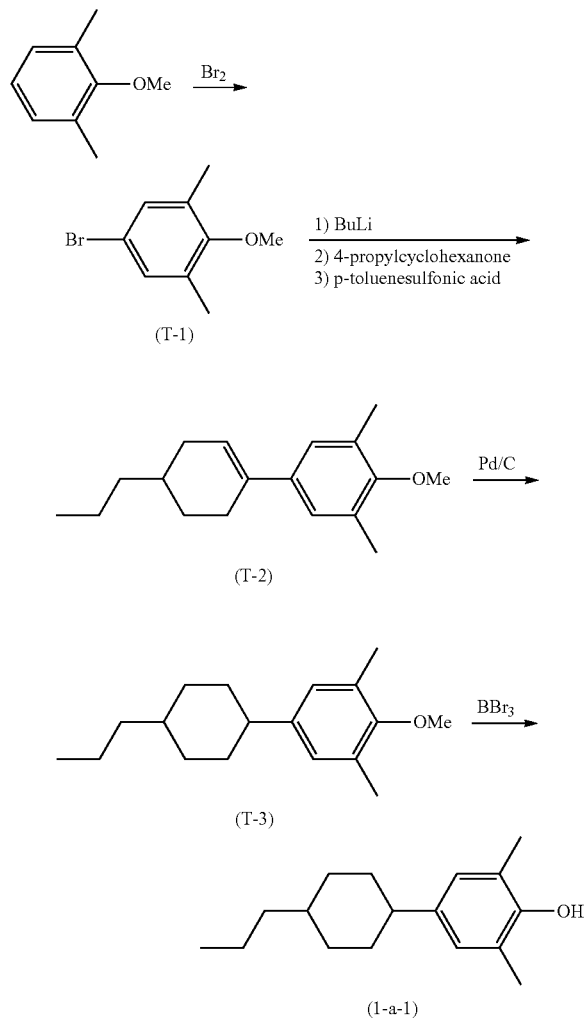

First Step: Synthesis of Compound (T-1)

Then, 2,6-dimethyl-4-bromoanisole (200 g) was dissolved into methylene chloride (1 L), and the resultant mixture was cooled at −30° C. under a nitrogen atmosphere. Bromine (240 g) was added dropwise while keeping a temperature of −30° C., and then the resultant mixture was stirred for 2 hours. After reaction completion, a sodium sulfite aqueous solution was added thereto, and an aqueous layer was extracted with methylene chloride (using 200 mL, twice). Combined organic layers were washed with a saturated aqueous solution of sodium chloride (300 mL), a saturated aqueous solution of sodium hydrogencarbonate (300 mL) and water (300 mL), and then dried over anhydrous magnesium sulfate and concentrated under reduced pressure, and thus compound (T-1) was obtained as colorless oily matter (280 g)

Second Step: Synthesis of Compound (T-2)

Compound (T-1) (140 g) obtained according to the operations was dissolved into tetrahydrofuran (600 mL), and the resultant mixture was cooled at −70° C. under a nitrogen atmosphere. A butyllithium hexane solution (1.6 M, 447 mL) was added dropwise thereto while keeping a temperature of −70° C., and then the resultant mixture was stirred for minutes. A tetrahydrofuran (200 mL) solution of 4-propylcyclohexanone (100 g) was added dropwise thereto at −65° C. Then, the resultant mixture was stirred at −40° C. for 30 minutes, and then heated to room temperature. A reaction mixture was poured into 10% hydrochloric acid (400 mL), and extracted with toluene (using 300 mL, three times). Combined organic layers were washed with water (using 200 mL, twice). Then, p-toluenesulfonic acid monohydrate (2 g) was added to the organic layer, and subjected to refluxing, and generated water was removed using a Dean-Stark apparatus. The organic layer was washed with water (using 200 mL, twice), and then dried over anhydrous magnesium sulfate and concentrated under reduced pressure. The resulting product was purified by means of column chromatography, and thus compound (T-2) (150 g) was obtained.

Third Step: Synthesis of Compound (T-3)

Compound (T-2) (150 g) obtained according to the operations was dissolved into tetrahydrofuran (600 mL), and 5% palladium on carbon (10 g) was added thereto. The resultant mixture was stirred at 40° C. for 7 hours under a 0.1 MPa hydrogen atmosphere. After filtration, the resultant mixture was concentrated under reduced pressure and purified by means of column chromatography. Thereto, a hydrogen bromide acetic acid solution (20 g) and heptane (700 mL) were added to allow isomerization at 70° C. for 48 hours while irradiation with ultraviolet light. The resulting product was washed with water, and then purified by means of column chromatography, and thus compound (T-3) (124 g) was obtained.

Fourth Step: Synthesis of Compound (1-a-1)

Compound (T-3) (62 g) obtained according to the operations was dissolved into methylene chloride (300 mL), and the resultant mixture was cooled at 0° C. under a nitrogen atmosphere. Boron tribromide (72 g) was added dropwise thereto while keeping a temperature of 0° C., and the resultant mixture was stirred at 25° C. for 2 hours. A reaction mixture was poured into ice water, and extracted with methylene chloride (using 200 mL, twice). Combined organic layers were washed with water (using 100 mL, twice). The resultant organic layer was dried over anhydrous magnesium sulfate, and then concentrated under reduced pressure. The resulting product was purified by recrystallization (using heptane/ethyl acetate, three times), and thus compound (1-a-1) was obtained as colorless needles (18 g).

Example 2

Then, 2,6-diisopropylanisole was used as a raw material, operations were performed in a manner similar to the operations represented in Example 1 and in the synthetic method described therein, and thus 2,6-diisopropyl-4-(4-pentyl-trans-cyclohexyl)phenol (1-a-63) was obtained as colorless needles.

Example 3

Compound (1-a-13) was prepared according to the synthetic scheme shown below.

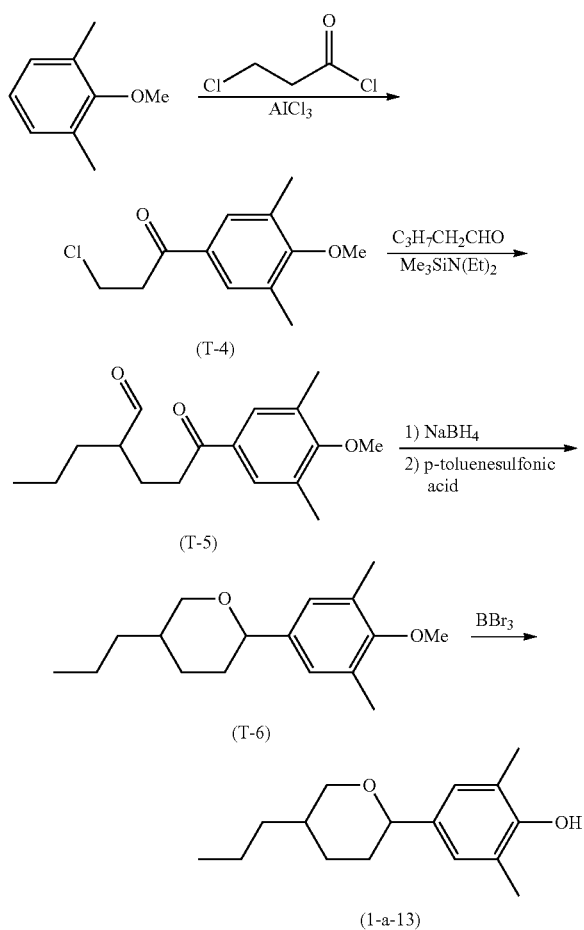

(T-4)

(T-5)

(T-6)

(1-a-13)

First Step: Synthesis of Compound (T-4)

Aluminum chloride (147 g) was suspended into methylene chloride (700 mL), and the resultant mixture was cooled at 0° C. under a nitrogen atmosphere. Then, 3-chloropropionyl chloride (152 g), and subsequently 2,6-dimethylanisole (136 g) were added dropwise thereto while keeping a temperature of 0° C., and the resultant mixture was stirred for 2 hours. A reaction mixture was poured into ice water, and an aqueous layer was extracted with methylene chloride (using 200 mL, twice). Combined organic layers were washed with a saturated aqueous solution of sodium chloride (200 mL), a saturated aqueous solution of sodium hydrogencarbonate (200 mL) and water (200 mL), and then dried over anhydrous magnesium sulfate, concentrated under reduced pressure, and thus compound (T-4) (290 g) was obtained.

Second Step: Synthesis of Compound (T-5)

Compound (T-4) (50 g), valeraldehyde (23 g) and N,N'-diethyltrimethyl silylamine (38.5 g) were dissolved into acetonitrile (500 mL), and the resultant mixture was stirred at 80° C. for 4 hours under a nitrogen atmosphere, and concentrated under reduced pressure. Then, methyl tert-butyl ether (500 mL) and water (200 mL) were added thereto, and an aqueous layer was extracted with methyl tert-butyl ether (using 100 mL, twice). Combined organic layers were washed with a saturated aqueous solution of sodium chloride (100 mL) and water (100 mL), and then dried over anhydrous magnesium sulfate, concentrated under reduced pressure, and thus compound (T-5) (85 g) was obtained.

Third Step: Synthesis of Compound (T-6)

Sodium borohydride (24 g) was suspended into ethanol (700 mL), and the resulting suspension was cooled at 15° C. Compound (T-5) (85 g) was added thereto, and then the resultant mixture was stirred at 20° C. for 2 hours. Then, 15% hydrochloric acid (10 mL) was added thereto, and the resultant mixture was extracted with toluene (using 300 mL, twice). Combined organic layers were washed with water (using 100 mL, twice), and then dried over anhydrous magnesium sulfate. Then, p-toluenesulfonic acid monohydrate (10 g) was added thereto, and subjected to refluxing, and generated water was removed using a Dean-Stark apparatus. The resultant organic layer was washed with water (using 100 mL, twice), and then concentrated under reduced pressure. The resulting product was purified by means of column chromatography, and thus compound (T-6) (45 g) was obtained.

Fourth Step: Synthesis of Compound (1-a-13)

Compound (T-6) (45 g) was dissolved into methylene chloride (150 mL), and the resultant mixture was cooled at 0° C. under a nitrogen atmosphere. Boron tribromide (53 g) was added dropwise thereto while keeping a temperature of 0° C., and the resultant mixture was stirred at 25° C. for 2 hours. Ice water was added thereto, and then an aqueous layer was extracted with methylene chloride (using 100 mL, twice). Combined organic layers were washed with a saturated aqueous solution of sodium chloride (100 mL) and water (100 mL), and then dried over anhydrous magnesium sulfate, concentrated under reduced pressure, and thus crude crystals were obtained. The resulting crystals were purified by recrystallization from hexane/ethyl acetate, and thus compound (1-a-13) was obtained as colorless needle crystals (13 g).

In order to evaluate characteristics of a composition and a compound to be contained in the composition, the composition and the compound each was made a measurement object. When the measurement object was a composition, the composition was measured as a sample as was, and values obtained were described. When the measurement object was a compound, a sample for measurement was prepared by mixing the compound (15% by weight) into a base liquid crystal (85% by weight). Values of characteristics of the compound were calculated using values obtained by measurement, according to an extrapolation method: (extrapolated value)={(measured value of a sample)-0.85×(measured value of base liquid crystal)}/0.15. When a smectic phase (or crystals) precipitated at the ratio thereof at 25° C., a ratio of the compound to the base liquid crystal was changed step by step in the order of (10% by weight:90% by weight), (5% by weight:95% by weight) and (1% by weight:99% by weight). Values of a maximum temperature, optical anisotropy, viscosity and dielectric anisotropy with regard to the compound were determined according to the extrapolation method.

Components of the base liquid crystal when the dielectric anisotropy of the measurement object was zero or positive were as described below. A ratio of each component is expressed in terms of % by weight.

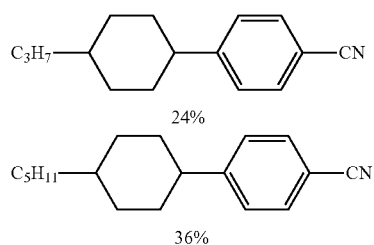

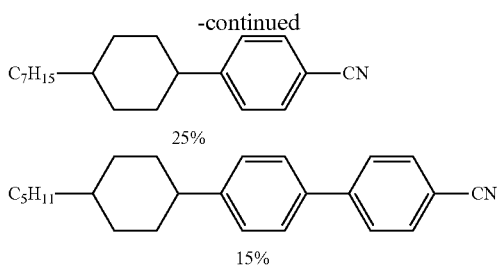

25%

15%

Components of the base liquid crystal when the dielectric anisotropy of the measurement object was zero or negative were as described below. A ratio of each component is expressed in terms of % by weight.

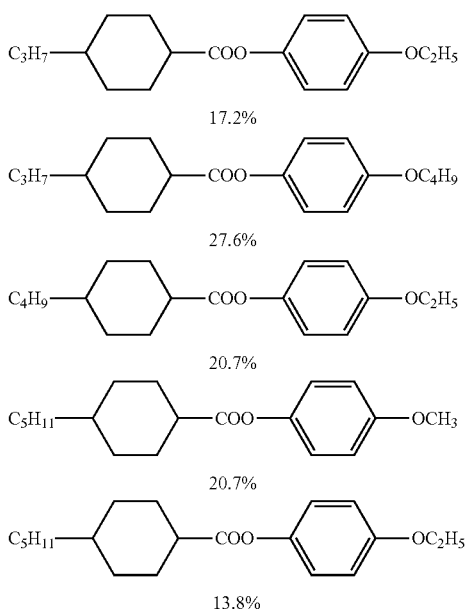

17.2%

27.6%

20.7%

20.7%

13.8%

Characteristics were measured according to the methods described below. Most of the methods were applied as described in the Standard of the Japan Electronics and Information Technology Industries Association, hereafter abbreviated as JEITA) (JEITA ED-2521B) as discussed and established in JEITA, or as modified thereon.

Maximum temperature of a nematic phase (NI; ° C.): A sample was placed on a hot plate in a melting point apparatus equipped with a polarizing microscope and was heated at a rate of 1° C. per minute. Temperature at which part of the sample began to change from a nematic phase to an isotropic liquid was measured. A higher limit of a temperature range of the nematic phase may be abbreviated as "maximum temperature."

Minimum temperature of a nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when a sample maintained the nematic phase at −20° C. and changed to crystals or a smectic phase at −30° C., T, was expressed as $T_c$<−20° C. A lower limit of the temperature range of the nematic phase may be abbreviated as "minimum temperature."

Viscosity (bulk viscosity; η; measured at 20° C.; mPa·s): A cone-plate (E type) rotational viscometer was used for measurement.

Viscosity (rotational viscosity; γ1; measured at 25° C.; mPa·s): Measurement was carried out according to the method described in M. Imai et al., Molecular Crystals and Liquid Crystals, Vol. 259, p. 37 (1995).

A sample having a positive dielectric anisotropy was put in a TN device in which a twist angle was 0 degrees and a distance (cell gap) between two glass substrates was 5 micrometers. Voltage was stepwise applied to the device in the range of 16 V to 19.5 V at an increment of 0.5 V. After a period of 0.2 second with no application, voltage was applied repeatedly under the conditions of only one of rectangular waves (rectangular pulse; 0.2 second) and no application (2 seconds).

A sample having a negative dielectric anisotropy was put in a VA device in which a twist angle was 0 degrees and a distance (cell gap) between two glass substrates was 5 micrometers. Voltage was stepwise applied to the device in the range of 39 V to 50 V at an increment of 1 V. After a period of 0.2 second with no application, voltage was applied repeatedly under the conditions of only one of rectangular waves (rectangular pulse; 0.2 second) and no application (2 seconds).

A peak current and a peak time of a transient current generated by the application were measured. A value of rotational viscosity was obtained from the measured values and a calculation equation (8) described on page 40 of the paper presented by M. Imai et al. A value of dielectric anisotropy required for the calculation was determined by using the device used for measuring the rotational viscosity and according to a method described below.

Optical anisotropy (refractive index anisotropy; Δn; measured at 25° C.): Measurement was carried out by means of Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

Dielectric anisotropy (Δ∈; measured at 25° C.): A value of dielectric anisotropy was calculated from an equation: Δ∈=∈∥−∈⊥. Dielectric constants (∈∥ and ∈⊥) were measured as described below.

A sample having a positive dielectric anisotropy was put in a TN device in which a distance (cell gap) between two glass substrates was 9 micrometers, and a twist angle was 80 degrees. Sine waves (10 V, 1 kHz) were applied to the device, and after 2 seconds, a dielectric constant (∈∥) in the major axis direction of liquid crystal molecules was measured. Sine waves (0.5 V, 1 kHz) were applied to the device, and after 2 seconds, a dielectric constant (∈⊥) in the minor axis direction of the liquid crystal molecules was measured.

A sample having a negative dielectric anisotropy was measured as described below.

1) Measurement of dielectric constant (∈∥): An ethanol (20 mL) solution of octadecyl triethoxysilane (0.16 mL) was applied onto a well-washed glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant ($\in\parallel$) in the major axis direction of liquid crystal molecules was measured.

2) Measurement of dielectric constant ($\in\perp$): A polyimide solution was applied onto a well-washed glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant ($\in\perp$) in the minor axis direction of the liquid crystal molecules was measured.

Threshold voltage (Vth; measured at 25° C.; V): An LCD-5100 luminance meter made by Otsuka Electronics Co., Ltd. was used for measurement. A light source was a halogen lamp.

A sample having a positive dielectric anisotropy was put in a normally white mode TN device in which a distance (cell gap) between two glass substrates was approximately 0.45/Δn (μm) and a twist angle was 80 degrees. Voltage (32 Hz, rectangular waves) to be applied to the device was increased stepwise from 0 V to 10 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage is voltage at 90% transmittance.

A sample having a negative dielectric anisotropy was put in a normally black mode VA device in which a distance (cell gap) between two glass substrates was 4 micrometers and a rubbing direction was anti-parallel, and the device was sealed with an ultraviolet-curable adhesive. Voltage (60 Hz, rectangular waves) to be applied to the device was increased stepwise from 0 V to 20 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage is voltage at 10% transmittance.

Voltage holding ratio (VHR-a; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 1 V) was applied to the TN device and the device was charged. A decaying voltage was measured for 166.7 milliseconds with a high-speed voltmeter, and area A between a voltage curve and a horizontal axis in a unit cycle was obtained. Area B is an area without decay. A voltage holding ratio is a percentage of area A to area B.

Voltage holding ratio (VHR-b; measured at 60° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 1 V) was applied to the TN device and the device was charged. A decaying voltage was measured for 166.7 milliseconds with a high-speed voltmeter, and area A between a voltage curve and a horizontal axis in a unit cycle was obtained. Area B is an area without decay. A voltage holding ratio is a percentage of area A to area B.

Voltage holding ratio (VHR-c; measured at 60° C.; %): Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and then the device was irradiated with ultraviolet light for 5 minutes. A light source was an ultra high-pressure mercury lamp USH-500D (made by Ushio, Inc.), and a distance between the device and the light source was 20 centimeters. In measurement of VHR-c, a decaying voltage was measured for 166.7 milliseconds. A composition having a large VHR-c has a large stability to ultraviolet light. A composition having s small difference between VHR-b and VHR-c has a large stability to ultraviolet light.

Voltage holding ratio (VHR-d; measured at 60° C.; %): A TN device into which a sample was injected was heated in a constant-temperature bath at 120° C. for 240 hours, and then stability to heat was evaluated by measuring a voltage holding ratio. In measurement of VHR-d, a decaying voltage was measured for 166.7 milliseconds. A composition having a large VHR-d has a large stability to heat.

Response time (τ; measured at 25° C.; ms): An LCD-5100 luminance meter made by Otsuka Electronics Co., Ltd. was used for measurement. A light source was a halogen lamp. A low-pass filter was set at 5 kHz.

A sample having a positive dielectric anisotropy was put in a normally white mode TN device in which a distance (cell gap) between two glass substrates was 5.0 micrometers and a twist angle was 80 degrees. Rectangular waves (60 Hz, 5 V, 0.5 second) were applied to the device. On the occasion, the device was irradiated with light from a direction perpendicular to the device, and the amount of light transmitted through the device was measured. The maximum amount of light corresponds to 100% transmittance, and the minimum amount of light corresponds to 0% transmittance. Rise time (τr; millisecond) is a period of time required for a change from 90% transmittance to 10% transmittance. Fall time (τf; millisecond) is a period of time required for a change from 10% transmittance to 90% transmittance. A response time is a sum of the thus determined rise time and fall time.

A sample having a negative dielectric anisotropy was put in a normally black mode VA device in which a distance (cell gap) between two glass substrates was 4 micrometers and a rubbing direction was anti-parallel, and the device was sealed with an ultraviolet-curable adhesive. Rectangular waves (60 Hz, 10 V, 0.5 second) were applied to the device. On the occasion, the device was irradiated with light from a direction perpendicular to the device, and the amount of light passing through the device was measured. The maximum amount of light corresponds to 100% transmittance, and the minimum amount of light corresponds to 0% transmittance. A response time is a period of time required for a change from 90% transmittance to 10% transmittance (fall time; millisecond).

Elastic constant (K; measured at 25° C.; pN): With regard to a composition having a positive dielectric anisotropy, HP4284A LCR Meter made by Yokogawa-Hewlett-Packard Co. was used for measurement. A sample was put in a horizontal alignment cell in which a distance (cell gap) between two glass substrates was 20 micrometers. Voltage was applied to the cell in the range of 0 V to 20 V, and electrostatic capacity and applied voltage were measured. Measured values of the electrostatic capacity (C) and the applied voltage (V) were fitted to equation (2. 98) and equation (2. 101) on page 75 of "Liquid Crystal Device Handbook" (Ekisho Debaisu Handobukku in Japanese) (The Nikkan Kogyo Shimbun, Ltd.), and values of K11 and K33 were obtained from equation (2. 99). Next, K22 was calculated using the previously determined values of K11 and K33 in equation (3. 18) on page 171 of the same Handbook. An elastic constant is a mean value of the thus determined K11, K22 and K33.

Elastic constant (K11: spray elastic constant, K33: bend elastic constant; measured at 25° C.; pN): With regard to a composition having a negative dielectric anisotropy, Elastic Constant Measurement System Model EC-1 (made by TOYO Corporation) was used for measurement. A sample was put in a vertical alignment cell in which a distance (cell gap) between two glass substrates was 20 micrometers. A voltage from 20 V to 0 V was applied to the device, and electrostatic capacity and applied voltage were measured. Measured values of the electrostatic capacity (C) and the applied voltage (V) were fitted to equation (2. 98) and equation (2. 101) on page 75 of "Liquid Crystal Device Handbook" (Ekisho Debaisu Handobukku in Japanese) (The Nikkan Kogyo Shimbun, Ltd.) and values of elastic constants were obtained from equation (2. 100).

Specific resistance (p; measured at 25° C.; Ωcm): Into a vessel equipped with electrodes, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of a vessel)}/{(direct current)×(dielectric constant of vacuum)}.

Helical pitch (P; measured at room temperature; μm): A helical pitch was measured according to a wedge method (Handbook of Liquid Crystals (Ekisho Binran in Japanese), page 196, (issued in 2000, Maruzen Co., Ltd.)). A sample was injected into a wedge cell and left to stand at room temperature for 2 hours, and then a gap (d2−d1) between disclination lines was observed by means of a polarizing microscope (trade name: MM40/60 Series, Nikon Corporation). A helical pitch (P) was calculated according to the following equation in which an angle of the wedge cell was expressed as θ:

$$P=2\times(d2-d1)\times\tan\theta.$$

Gas chromatographic analysis: GC-2014 Gas Chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R7A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane and so forth may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds contained in a composition may be calculated by the method as described below. The liquid crystal compounds can be detected by means of a gas chromatograph. A ratio of peak areas in a gas chromatogram corresponds to a ratio (in the number of moles) of the liquid crystal compounds. When the capillary column described above was used, a correction coefficient of each of the liquid crystal compounds may be regarded as 1 (one). Accordingly, a ratio (% by weight) of the liquid crystal compounds was calculated from the ratio of the peak areas.

The invention will be explained in detail by way of Examples. The invention is not limited by the Examples described below. The compounds described in Comparative Examples and Examples were expressed using symbols according to definitions in Table 3 below. In Table 3, a configuration of 1,4-cyclohexylene is trans. A parenthesized number next to a symbolized compound corresponds to the number of the compound. A symbol (-) means any other liquid crystal compound. A ratio (percentage) of the liquid crystal compounds is expressed in terms of weight percent (% by weight) based on the total weight of the liquid crystal composition. The liquid crystal composition includes an impurity. Values of characteristics of the composition were summarized in the last part.

TABLE 3

Method for Description of Compounds using Symbols
R—(A$_1$)—Z$_1$— ... —Z$_n$—(A$_n$)—R'

1) Left-terminal Group F Symbol

| | |
|---|---|
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |

2) Right-terminal Group Symbol

| | |
|---|---|
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |
| —C$_m$H$_{2m}$—CH=CH—C$_n$H$_{2n+1}$ | -mVn |
| —CH=CF$_2$ | —VFF |
| —F | —F |
| —Cl | —CL |
| —OCF$_3$ | —OCF3 |
| —CF$_3$ | —CF3 |
| —CF=CH—CF$_3$ | —FVCF3 |
| —CF=CF—CF$_3$ | —FVFCF3 |

3) Bonding Group —Z$_n$— Symbol

| | |
|---|---|
| —C$_n$H$_{2n}$— | n |
| —COO— | E |
| —CH=CH— | V |
| —CH$_2$O— | 1O |
| —OCH$_2$— | O1 |
| —CF$_2$O— | X |
| —C≡C— | T |

4) Ring Structure —A$_n$— Symbol

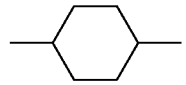

H

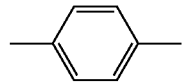

B

TABLE 3-continued

Method for Description of Compounds using Symbols
R—(A₁)—Z₁—...—Zₙ—(Aₙ)—R'

| Structure | Symbol |
|---|---|
| 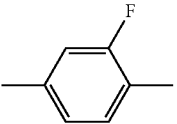 | B(F) |
| 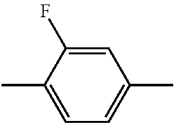 | B(2F) |
| 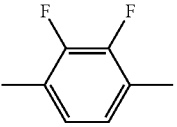 | B(2F,3F) |
| 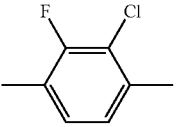 | B(2F,3CL) |
| 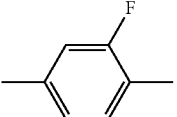 | B(F,F) |
| 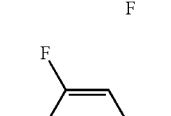 | B(2F,5F) |
| 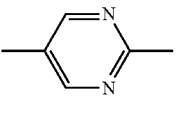 | Py |
| 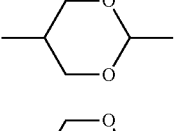 | G |
| 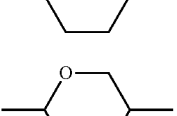 | dh |
| 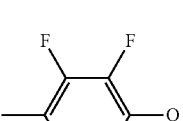 | Dh |
| 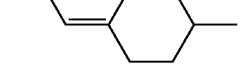 | Cro(7F,8F) |

TABLE 3-continued

Method for Description of Compounds using Symbols
R—(A₁)—Z₁—...—Zₙ—(Aₙ)—R'

5) Examples of Description

Example 1  3-HHB(2F,3F)-O2

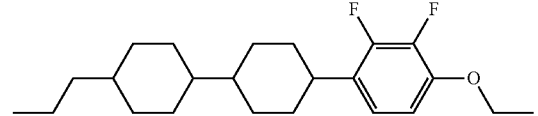

Example 2  3-BB(F)B(F,F)XB(F,F)-F

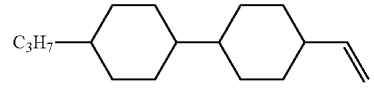

Example M1

A sample in which 0.05 part by weight of compound (1-1-1) was added based on 100 parts by weight of liquid crystal composition A was prepared, and a liquid crystal display device was prepared. Components and ratios of liquid crystal composition A are as described below.
(Liquid Crystal Composition A)

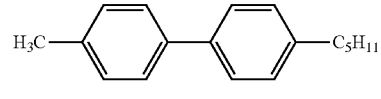

28 wt %

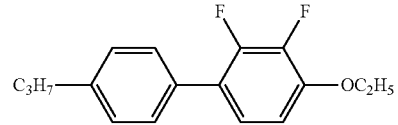

11 wt %

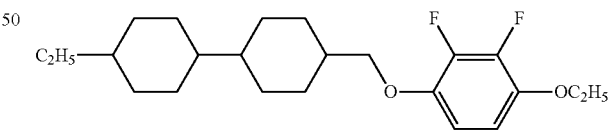

13 wt %

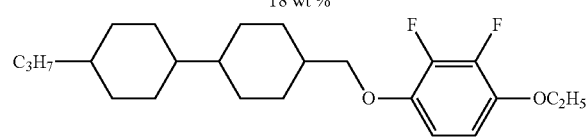

18 wt %

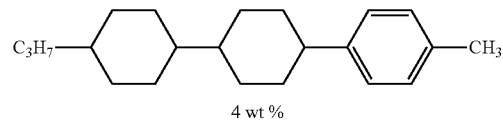

16 wt %

$C_3H_7$—⬡—⬡—⬢—$CH_3$ 4 wt %

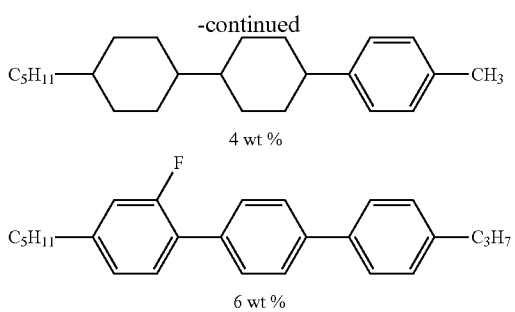

4 wt %

6 wt %

A voltage holding ratio of the liquid crystal display device described in Example M1 was measured. The measurement results are represented in Table 4.

Example M2

A sample in which 0.05 part by weight of compound (1-1-2) was added based on 100 parts by weight of liquid crystal composition A was prepared, a liquid crystal display device was prepared, and a voltage holding ratio was measured. The measurement results are represented in Table 4.

Example M3

A sample in which 0.05 part by weight of compound (1-2-1) was added based on 100 parts by weight of liquid crystal composition A was prepared, a liquid crystal display device was prepared, and a voltage holding ratio was measured. The measurement results are represented in Table 4.

Comparative Example M1

A sample in which 0.05 part by weight of compound (S-1) described in JP H9-124529 A was added based on 100 parts by weight of liquid crystal composition A was prepared, a liquid crystal display device was prepared, and a voltage holding ratio was measured. The measurement results are represented in Table 4.

Comparative Example M2

A sample using liquid crystal composition A was prepared, a liquid crystal display device was prepared, and a voltage holding ratio was measured. The measurement results are represented in Table 4.

TABLE 4

| | Formula Number | Structural Formula | Number of parts added | VHR-b (%) | VHR-c (%) |
|---|---|---|---|---|---|
| Example M1 | (1-1-1) | | 0.05 | 90.4 | 44.8 |
| Example M2 | (1-1-2) | | 0.05 | 89.7 | 44.9 |
| Example M3 | (1-2-1) | | 0.05 | 88.7 | 51.2 |
| Comparative Example M1 | (S-1) | | 0.05 | 90.5 | 35.1 |
| Comparative Example M2 | — | — | — | 90.5 | 26.4 |

Comparison of Voltage Holding Ratios

Table 4 represents that the compositions in Example M1 to Example M3 have a larger VHR-c in comparison with VHR-c in Comparative Example M1 and Comparative Example M2 and have a small difference between VHR-b and VHR-c, and therefore have a higher stability to ultraviolet light. Therefore, the liquid crystal composition according to the invention has superb characteristics.

Example M4

| | | |
|---|---|---|
| 3-HH-V | (2-1-1) | 46% |
| V-HHB-1 | (2-5-1) | 10% |
| 1-BB(F)B-2V | (2-8-1) | 7% |
| 2-BB(F)B-2V | (2-8-1) | 9% |
| 3-BB(F,F)XB(F,F)-F | (3-3-1) | 6% |
| 3-GB(F,F)XB(F,F)-F | (3-4-1) | 5% |
| 3-BB(F)B(F,F)XB(F,F)-F | (3-10-1) | 3% |
| 4-BB(F)B(F,F)XB(F,F)-F | (3-10-1) | 6% |
| 3-BB(F)B(F,F)XB(F)-F | (3-10-2) | 3% |
| 3-HBB-F | (3-14) | 5% |

To 100 parts by weight of the composition described above, 0.05 part by weight of compound (1-1-1) below, and

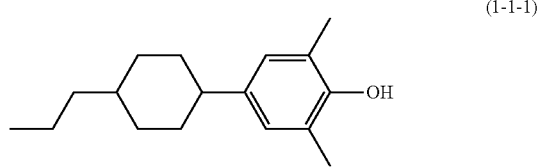 [SMILES: CCCC1CCC(c2cc(C)c(O)c(C)c2)CC1]

(1-1-1)

0.05 part by weight of compound (1-1-2) below were added.

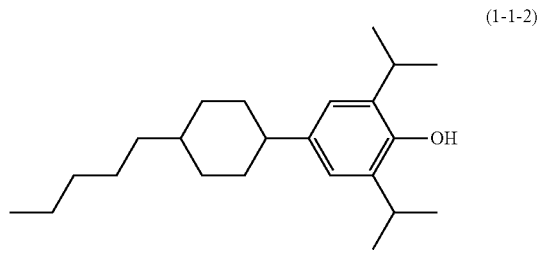 [SMILES: CCCCCC1CCC(c2cc(C(C)C)c(O)c(C(C)C)c2)CC1]

(1-1-2)

NI=77.3° C.; Tc<−20° C.; η=13.7 mPa·s; Δn=0.118; Δ∈=4.6; Vth=2.05 V.

Example M5

| | | |
|---|---|---|
| 3-HH-V | (2-1-1) | 20% |
| 3-HB-O2 | (2-2-1) | 5% |
| V-HHB-1 | (2-5-1) | 7% |
| 2-BB(F)B-3 | (2-8-1) | 3% |
| 5-HBBH-3 | (2-11-1) | 5% |
| 5-HB(F)BH-3 | (2-12-1) | 3% |
| 5-HBB(F)B-2 | (2-13-1) | 4% |
| 5-HXB(F,F)-F | (3-1-1) | 5% |
| 3-BBXB(F,F)-F | (3-2-1) | 5% |
| 3-BB(F,F)XB(F,F)-F | (3-3-1) | 8% |
| 3-HHXB(F,F)-F | (3-5-1) | 8% |
| 4-HBB(F,F)XB(F,F)-F | (3-6-2) | 3% |
| 4-BB(F)B(F,F)XB(F,F)-F | (3-10-1) | 8% |
| 5-BB(F)B(F,F)XB(F,F)-F | (3-10-1) | 3% |
| 3-HBB(F,F)-F | (3-14-1) | 6% |
| 3-BB(F)B(F,F)-CF3 | (3-17-2) | 4% |
| 3-HHBB(F,F)-F | (3-18-1) | 3% |

To 100 parts by weight of the composition described above, 0.05 part by weight of compound (1-1-2) below was added.

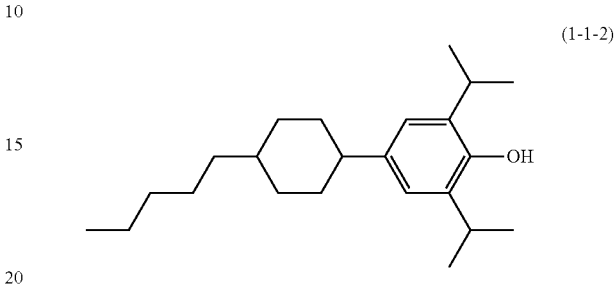

(1-1-2)

NI=88.4° C.; Tc<−20° C.; η=16.3 mPa·s; Δn=0.117; Δ∈=8.4; Vth=1.82 V.

Example M6

| | | |
|---|---|---|
| 2-HH-3 | (2-1-1) | 20% |
| 3-HH-4 | (2-1-1) | 7% |
| 3-HHB-1 | (2-5-1) | 5% |
| 2-BB(F)B-5 | (2-8-1) | 3% |
| 5-HBB(F)B-2 | (2-13-1) | 6% |
| 5-HBB(F)B-3 | (2-13-1) | 6% |
| 3-BBXB(F,F)-F | (3-2-1) | 7% |
| 3-BB(F,F)XB(F,F)-F | (3-3-1) | 7% |
| 3-dhBB(F,F)XB(F,F)-F | (3-9-1) | 3% |
| 4-BB(F)B(F,F)XB(F,F)-F | (3-10-1) | 5% |
| 3-HB-CL | (3-12-1) | 10% |
| 3-HHB-CL | (3-13-2) | 3% |
| 5-HHB-CL | (3-13-2) | 4% |
| 3-HBB(F,F)-F | (3-14-1) | 8% |
| 3-HHBB(F,F)-F | (3-18-1) | 3% |
| 4-HHBB(F,F)-F | (3-18-1) | 3% |

To 100 parts by weight of the composition described above, 0.1 part by weight of compound (1-1-1) below was added.

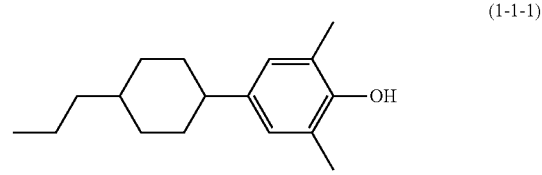 [SMILES: CCCC1CCC(c2cc(C)c(O)c(C)c2)CC1]

(1-1-1)

NI=95.5° C.; Tc<−20° C.; η=16.5 mPa·s; Δn=0.123; Δ∈=6.3; Vth=2.14 V.

Example M7

| | | |
|---|---|---|
| 2-HH-5 | (2-1-1) | 6% |
| 3-HH-4 | (2-1-1) | 10% |
| 7-HB-1 | (2-2-1) | 5% |
| 5-HBB-2 | (2-6-1) | 5% |
| 3-HHEBH-3 | (2-9-1) | 5% |
| 3-BB(F,F)XB(F,F)-F | (3-3-1) | 16% |

-continued

| | | |
|---|---|---|
| 3-HHXB(F,F)-CF3 | (3-5-2) | 5% |
| 3-HB-CL | (3-12-1) | 8% |
| 2-HHB(F,F)-F | (3-13-1) | 10% |
| 3-HHB-CL | (3-13-2) | 3% |
| 3-HHB-F | (3-13) | 4% |
| 3-HBB-F | (3-14) | 3% |
| 3-HBB(F)-F | (3-14) | 10% |
| 5-HBB(F)-F | (3-14) | 10% |

To 100 parts by weight of the composition described above, 0.05 part by weight of compound (1-2-1) below was added.

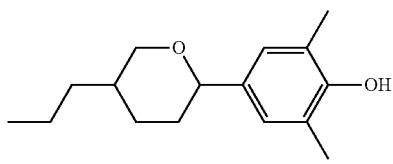

(1-2-1)

NI=75.5° C.; Tc<−20° C.; η=19.0 mPa·s; Δn=0.098; Δ∈=6.8; Vth=1.76 V.

Example M8

| | | |
|---|---|---|
| 3-HH-V | (2-1-1) | 35% |
| 3-HH-V1 | (2-1-1) | 10% |
| 4-HH-V1 | (2-1-1) | 3% |
| 1V2-HHB-1 | (2-5-1) | 6% |
| 3-BB(F)B-5 | (2-8-1) | 3% |
| 1-BB(F)B-2V | (2-8-1) | 6% |
| 2-BB(F)B-2V | (2-8-1) | 7% |
| 3-BB(F,F)XB(F,F)-F | (3-3-1) | 13% |
| 3-BB(F,F)XB(F)-OCF3 | (3-3-2) | 3% |
| 4-HHB(F,F)XB(F,F)-F | (3-7-1) | 5% |
| 3-BB(F)B(F,F)XB(F,F)-F | (3-10-1) | 3% |
| 4-BB(F)B(F,F)XB(F,F)-F | (3-10-1) | 6% |

To 100 parts by weight of the composition described above, 0.05 part by weight of compound (1-3-1) below was added.

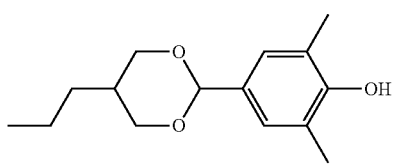

(1-3-1)

NI=74.4° C.; Tc<−20° C.; η=13.2 mPa·s; Δn=0.116; Δ∈=5.5; Vth=1.92 V.

Example M9

| | | |
|---|---|---|
| 3-HH-V | (2-1-1) | 18% |
| 5-HB-O2 | (2-2-1) | 5% |
| V2-BB-1 | (2-3-1) | 5% |
| V-HHB-1 | (2-5-1) | 14% |
| V2-HHB-1 | (2-5-1) | 5% |
| 5-B(F)BB-2 | (2-7-1) | 5% |
| 5-HBB(F)B-2 | (2-13-1) | 4% |
| 3-BB(F,F)XB(F,F)-F | (3-3-1) | 10% |
| 3-BB(F,F)XB(F)-OCF3 | (3-3-2) | 5% |
| 3-HHXB(F,F)-F | (3-5-1) | 7% |
| 4-BB(F)B(F,F)XB(F,F)-F | (3-10-1) | 5% |
| 4-BB(F,F)XB(F)B(F,F)-F | (3-11-1) | 5% |
| 3-HBB(F,F)-F | (3-14-1) | 3% |
| 3-GHB(F,F)-F | (3-15-1) | 5% |
| 3-HHBB(F,F)-F | (3-18-1) | 4% |

To 100 parts by weight of the composition described above, 0.05 part by weight of compound (1-2-1) below, and

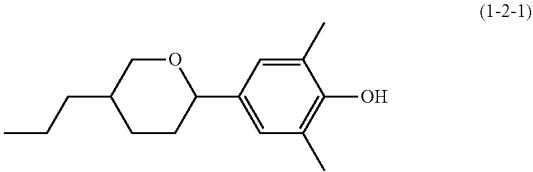

(1-2-1)

0.05 part by weight of compound (1-3-1) below were added.

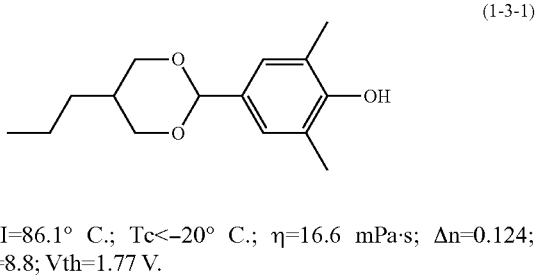

(1-3-1)

NI=86.1° C.; Tc<−20° C.; η=16.6 mPa·s; Δn=0.124; Δ∈=8.8; Vth=1.77 V.

Example M10

| | | |
|---|---|---|
| 3-HH-V | (2-1-1) | 33% |
| 1V2-BB-1 | (2-3-1) | 4% |
| 3-HHB-O1 | (2-5-1) | 4% |
| 2-BB(F)B-3 | (2-8-1) | 7% |
| 2-BB(F)B-5 | (2-8-1) | 6% |
| 3-BBXB(F,F)-F | (3-2-1) | 5% |
| 3-BB(F)B(F,F)XB(F)-F | (3-10-2) | 6% |
| 3-HBB(F)-F | (3-14) | 10% |
| 3-HHEB(F,F)-F | (3-16-1) | 10% |
| 4-HHEB(F,F)-F | (3-16-1) | 4% |
| 3-BB(F)B(F,F)-F | (3-17-1) | 6% |
| 1O1-HBBH-3 | (—) | 5% |

To 100 parts by weight of the composition described above, 0.1 part by weight of compound (1-1-1) below, and

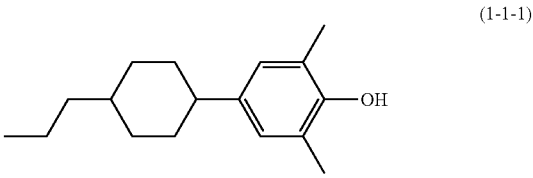

(1-1-1)

0.05 part by weight of compound (5-1) below were added.

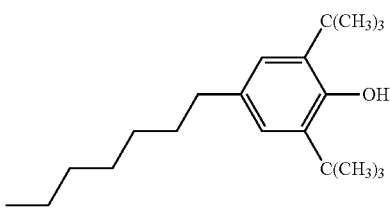

(5-1)

NI=89.5° C.; Tc<−20° C.; η=13.0 mPa·s; Δn=0.125; Δ∈=4.5; Vth=2.38 V.

Example M11

| | | |
|---|---|---|
| 3-HH-V | (2-1-1) | 37% |
| 3-HH-VFF | (2-1) | 6% |
| 3-HHEH-3 | (2-4-1) | 3% |
| 3-HHB-O1 | (2-5-1) | 3% |
| 2-BB(F)B-3 | (2-8-1) | 5% |
| 3-HB(F)HH-5 | (2-10-1) | 5% |
| 3-GB(F,F)XB(F,F)-F | (3-4-1) | 3% |
| 3-HBBXB(F,F)-F | (3-6-1) | 5% |
| 4-GB(F)B(F,F)XB(F,F)-F | (3-8-1) | 7% |
| 3-BB(F)B(F,F)XB(F)-F | (3-10-2) | 10% |
| 3-HHB(F)-F | (3-13) | 5% |
| 3-BB(F)B(F,F)-F | (3-17-1) | 8% |
| 3-HHBB(F,F)-F | (3-18-1) | 3% |

To 100 parts by weight of the composition described above, 0.1 part by weight of compound (1-2-1) below, and

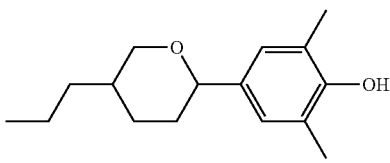

(1-2-1)

0.05 part by weight of compound (5-1) below were added.

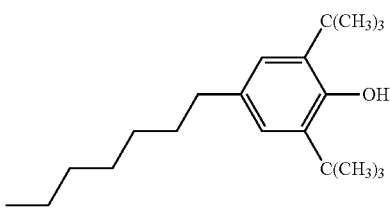

(5-1)

NI=92.4° C.; Tc<−20° C.; η=16.2 mPa·s; Δn=0.110; Δ∈=7.3; Vth=1.99 V.

Example M12

| | | |
|---|---|---|
| V-HH-3 | (2-1-1) | 28% |
| 1-BB-3 | (2-3-1) | 4% |
| 3-HHB-1 | (2-5-1) | 3% |
| 3-HHB-3 | (2-5-1) | 3% |
| 5-B(F)BB-2 | (2-7-1) | 5% |
| 5-B(F)BB-3 | (2-7-1) | 3% |

-continued

| | | |
|---|---|---|
| 3-BB(2F,3F)-O2 | (4-4-1) | 9% |
| 5-BB(2F,3F)-O2 | (4-4-1) | 5% |
| V-HHB(2F,3F)-O2 | (4-6-1) | 11% |
| 2-HH1OB(2F,3F)-O2 | (4-8-1) | 12% |
| 3-HH1OB(2F,3F)-O2 | (4-8-1) | 14% |
| 3-HDhB(2F,3F)-O2 | (4-11-1) | 3% |

To 100 parts by weight of the composition described above, 0.1 part by weight of compound (1-1-1) below was added.

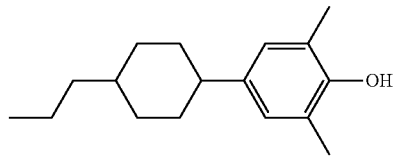

(1-1-1)

NI=83.8° C.; Tc<−20° C.; η=18.3 mPa·s; Δn=0.108; Δ∈=−3.4; Vth=2.29 V.

Example M13

| | | |
|---|---|---|
| 2-HH-3 | (2-1-1) | 25% |
| 3-HB-O2 | (2-2-1) | 7% |
| 3-HHEH-4 | (2-4-1) | 3% |
| 3-HHB-1 | (2-5-1) | 3% |
| V-HHB-1 | (2-5-1) | 4% |
| 3-HHEBH-3 | (2-9-1) | 4% |
| 3-HB(F)HH-5 | (2-10-1) | 3% |
| 3-H2B(2F,3F)-O2 | (4-2-1) | 15% |
| 5-H2B(2F,3F)-O2 | (4-2-1) | 9% |
| 3-HBB(2F,3F)-O2 | (4-13-1) | 8% |
| 4-HBB(2F,3F)-O2 | (4-13-1) | 8% |
| 3-dhBB(2F,3F)-O2 | (4-14-1) | 6% |
| 3-HH1OCro(7F,8F)-5 | (4-19-1) | 5% |

To 100 parts by weight of the composition described above, 0.1 part by weight of compound (1-2-1) below was added.

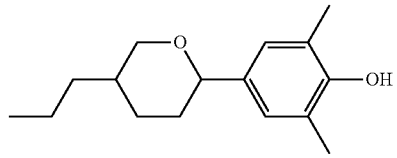

(1-2-1)

NI=83.8° C.; Tc<−20° C.; η=20.8 mPa·s; Δn=0.093; Δ∈=−3.2; Vth=2.43 V.

Example M14

| | | |
|---|---|---|
| V-HH-3 | (2-1-1) | 29% |
| VFF-HH-3 | (2-1) | 4% |
| V2-BB-1 | (2-3-1) | 5% |
| 1-BB(F)B-2V | (2-8-1) | 3% |
| 3-HB(2F,3F)-O2 | (4-1-1) | 13% |
| 3-H1OB(2F,3F)-O2 | (4-3-1) | 3% |
| 3-HHB(2F,3F)-O2 | (4-6-1) | 10% |
| 5-HHB(2F,3F)-O2 | (4-6-1) | 8% |
| 2-BB(2F,3F)B-3 | (4-9-1) | 6% |

-continued

| | | |
|---|---|---|
| 3-HBB(2F,3F)-O2 | (4-13-1) | 10% |
| 4-HBB(2F,3F)-O2 | (4-13-1) | 4% |
| 5-HBB(2F,3F)-O2 | (4-13-1) | 5% |

To 100 parts by weight of the composition described above, 0.1 part by weight of compound (1-3-1) below was added.

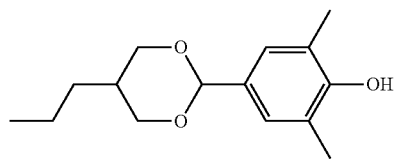

(1-3-1)

NI=83.6° C.; Tc<−20° C.; η=16.3 mPa·s; Δn=0.110; Δ∈=−3.0; Vth=2.46 V.

Example M15

| | | |
|---|---|---|
| 3-HH-4 | (2-1-1) | 5% |
| 3-HH-O1 | (2-1-1) | 3% |
| V-HH-3 | (2-1-1) | 30% |
| 3-HHB-1 | (2-5-1) | 3% |
| 3-HHB-3 | (2-5-1) | 3% |
| 2-BB(F)B-3 | (2-8-1) | 7% |
| 3-HHEBH-3 | (2-9-1) | 4% |
| 3-HHEBH-4 | (2-9-1) | 3% |
| 3-H2B(2F,3F)-O2 | (4-2-1) | 12% |
| 5-H2B(2F,3F)-O2 | (4-2-1) | 10% |
| 3-HBB(2F,3F)-O2 | (4-13-1) | 10% |
| 4-HBB(2F,3F)-O2 | (4-13-1) | 5% |
| 3-HH1OCro(7F,8F)-5 | (4-19-1) | 5% |

To 100 parts by weight of the composition described above, 0.05 part by weight of compound (1-1-1) below, and

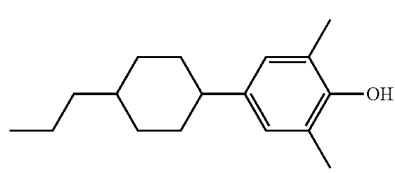

(1-1-1)

0.05 part by weight of compound (1-2-1) below were added.

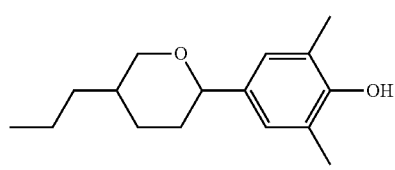

(1-2-1)

NI=80.4° C.; Tc<−20° C.; η=15.2 mPa·s; Δn=0.095; Δ∈=−2.4; Vth=2.57 V.

Example M16

| | | |
|---|---|---|
| 2-HH-3 | (2-1-1) | 24% |
| 1V-HH-3 | (2-1-1) | 6% |
| 5-HB-O2 | (2-2-1) | 5% |
| 3-HHB-1 | (2-5-1) | 3% |
| 3-HHB-2 | (2-6-1) | 3% |
| 3-HB(F)HH-5 | (2-10-1) | 3% |
| 5-HBB(F)B-2 | (2-13-1) | 4% |
| 3-HB(2F,3F)-O2 | (4-1-1) | 15% |
| 5-HB(2F,3F)-O2 | (4-1-1) | 11% |
| 2O-B(2F,3F)B(2F,3F)-O6 | (4-5) | 3% |
| 3-DhHB(2F,3F)-O2 | (4-10-1) | 3% |
| 3-HBB(2F,3F)-O2 | (4-13-1) | 10% |
| 4-HBB(2F,3F)-O2 | (4-13-1) | 5% |
| 5-HBB(2F,3F)-O2 | (4-13-1) | 5% |

To 100 parts by weight of the composition described above, 0.05 part by weight of compound (1-2-1) below, and

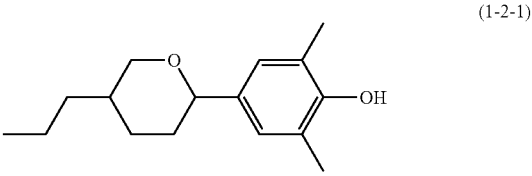

(1-2-1)

0.05 part by weight of compound (1-3-1) below were added.

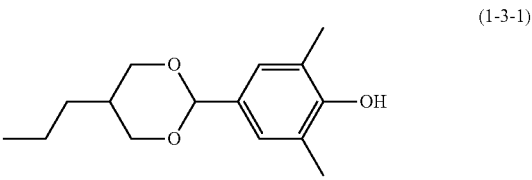 [SMILES: CCCC1COC(c2cc(C)c(O)c(C)c2)OC1]

(1-3-1)

NI=76.9° C.; Tc<−20° C.; η=17.6 mPa·s; Δn=0.100; Δ∈=−3.0; Vth=2.34 V.

Example M17

| | | |
|---|---|---|
| V-HH-3 | (2-1-1) | 32% |
| V-HH-5 | (2-1-1) | 5% |
| 5-HBBH-3 | (2-11-1) | 3% |
| 3-HB(F)BH-3 | (2-12-1) | 3% |
| V-HB(2F,3F)-O2 | (4-1-1) | 12% |
| V-HB(2F,3F)-O4 | (4-1-1) | 4% |
| 3-HH2B(2F,3F)-O2 | (4-7-1) | 3% |
| 3-DhH1OB(2F,3F)-O2 | (4-12-1) | 5% |
| 3-HBB(2F,3F)-O2 | (4-13-1) | 8% |
| 4-HBB(2F,3F)-O2 | (4-13-1) | 4% |
| 5-HBB(2F,3F)-O2 | (4-13-1) | 6% |
| 3-HEB(2F,3F)B(2F,3F)-O4 | (4-15-1) | 3% |
| 3-HHB(2F,3CL)-O2 | (4-16-1) | 3% |
| 5-HHB(2F,3CL)-O2 | (4-16-1) | 3% |
| 3-HBB(2F,3CL)-O2 | (4-17-1) | 3% |
| V-HBB(2F,3CL)-O2 | (4-17-1) | 3% |

To 100 parts by weight of the composition described above, 0.05 part by weight of compound (1-1-2) below, and

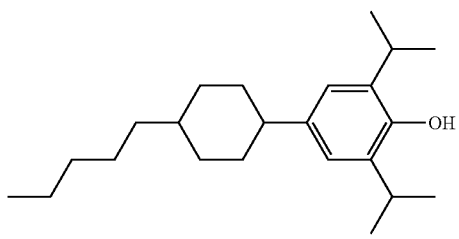
(1-1-2)

0.03 part by weight of compound (5-1) below were added.

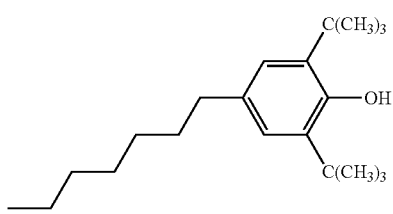
(5-1)

NI=83.6° C.; Tc<−20° C.; η=19.8 mPa·s; Δn=0.095; Δ∈=−3.1; Vth=2.44 V.

Example M18

| | | |
|---|---|---|
| V-HH-3 | (2-1-1) | 35% |
| 3-HB-O2 | (2-2-1) | 5% |
| 3-HHB-1 | (2-5-1) | 3% |
| V-HHB-1 | (2-5-1) | 5% |
| 1V-HBB-2 | (2-6-1) | 3% |
| 1-BB(F)B-2V | (2-8-1) | 3% |
| 3-HB(2F,3F)-O2 | (4-1-1) | 8% |
| 3-H1OB(2F,3F)-O2 | (4-3-1) | 3% |
| 3-HHB(2F,3F)-O2 | (4-6-1) | 6% |
| 3-HHB(2F,3F)-1 | (4-6-1) | 5% |
| 1V2-HHB(2F,3F)-O2 | (4-6-1) | 5% |
| 2-BB(2F,3F)B-3 | (4-9-1) | 3% |
| 3-HBB(2F,3F)-O2 | (4-13-1) | 10% |
| 3-H1OCro(7F,8F)-5 | (4-18-1) | 3% |
| 1O1-HBBH-5 | (—) | 3% |

To 100 parts by weight of the composition described above, 0.05 part by weight of compound (1-1-2) below was added.

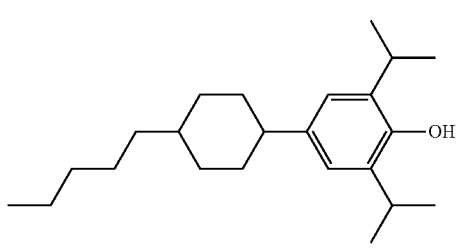
(1-1-2)

NI=88.7° C.; Tc<−20° C.; η=12.6 mPa·s; Δn=0.102; Δ∈=−2.3; Vth=2.67V.

Example M19

| | | |
|---|---|---|
| V-HH-3 | (2-1-1) | 29% |
| V2-HB-1 | (2-2-1) | 4% |
| 3-HHB-1 | (2-5-1) | 3% |
| 3-HHB-O1 | (2-5-1) | 3% |
| 5-HB(F)HH-V | (2-10-1) | 3% |
| 3-BB(2F,3F)-O2 | (4-4-1) | 10% |
| 2O-BB(2F,3F)-O2 | (4-4) | 4% |
| V-HHB(2F,3F)-O2 | (4-6-1) | 10% |
| 2-HH1OB(2F,3F)-O2 | (4-8-1) | 10% |
| 3-HH1OB(2F,3F)-O2 | (4-8-1) | 14% |
| 2-BB(2F,3F)B-3 | (4-9-1) | 5% |
| 3-HDhB(2F,3F)-O2 | (4-11-1) | 5% |

To 100 parts by weight of the composition described above, 0.05 part by weight of compound (1-1-1) below, and

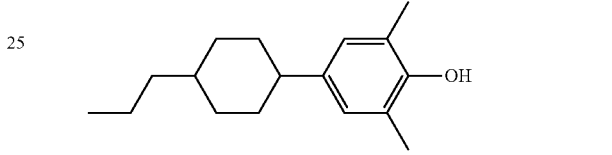
(1-1-1)

0.05 part by weight of compound (5-1) below were added.

(5-1)

NI=88.4° C.; Tc<−20° C.; η=19.1 mPa·s; Δn=0.101; Δ∈=−3.6; Vth=2.30V.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

Industrial Applicability

The invention concerns a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a large elastic constant, a high stability to ultraviolet light and a high stability to heat, or a liquid crystal composition having a suitable balance regarding at least two of the characteristics. A liquid crystal display device including such a composition is applied to constitute an AM device having a short response time, a large voltage holding ratio, a large contrast ratio, a long service life and so forth, and thus can be used for a liquid crystal projector, a liquid crystal television and so forth.

What is claimed is:

1. A liquid crystal composition that has a nematic phase and contains at least one compound selected from the group of compounds represented by formula (1) as a first component:

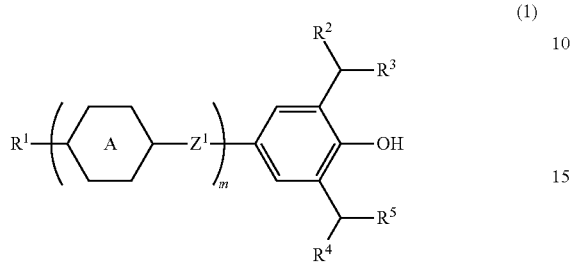
(1)

wherein, $R^1$ is alkyl having 2 to 20 carbons, and in the alkyl, at least one of —$CH_2$— is replaced by —O— or —S— or not; $R^2$, $R^3$, $R^4$ and $R^5$ are independently hydrogen or methyl;

ring A is 1,4-cyclohexylene, 1,3-dioxane-2,5-diyl, 1,3-dithiane-2,5-diyl, tetrahydropyran-2,5-diyl, or 1,4-phenylene in which at least one of hydrogen is replaced by fluorine or not; $Z^1$ is a single bond, —$CH_2CH_2$—, —CH=CH—, —C≡C—, —COO—, —OCO—, —$CH_2$O—, —O$CH_2$—, —CF=CF—, —$CH_2$S— or —S$CH_2$—; and m is 0 or 1.

2. The liquid crystal composition according to claim 1, containing at least one compound selected from the group of compounds represented by formula (1-1) to formula (1-3) as the first component:

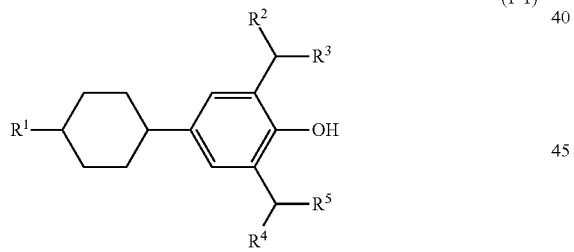
(1-1)

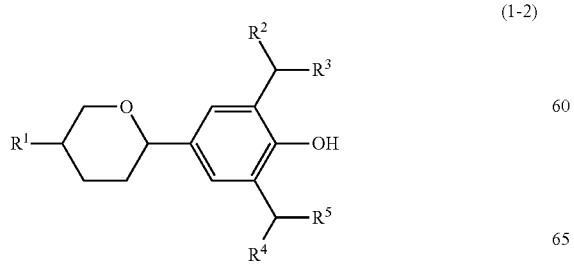
(1-2)

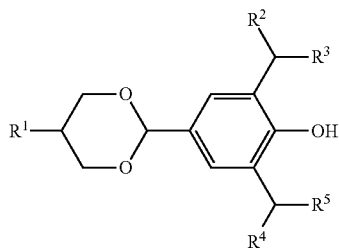
(1-3)

wherein, $R^1$ is alkyl having 2 to 20 carbons, and in the alkyl, at least one of —$CH_2$— is replaced by —O— or —S— or not; and $R^2$, $R^3$, $R^4$ and $R^5$ are independently hydrogen or methyl.

3. The liquid crystal composition according to claim 1, further containing at least one compound selected from the group of compounds represented by formula (2) as a second component:

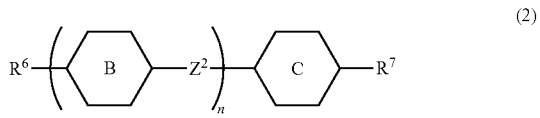
(2)

wherein, $R^6$ and $R^7$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring B and ring C are independently 1,4-cyclohexylene, 1,4-phenylene, 2-fluoro-1,4-phenylene, 3-fluoro-1,4-phenylene or 2,5-difluoro-1,4-phenylene; $Z^2$ is independently a single bond, ethylene, methyleneoxy or carbonyloxy; and n is 1, 2 or 3.

4. The liquid crystal composition according to claim 1, containing at least one compound selected from the group of compounds represented by formula (2-1) to formula (2-13) as the second component:

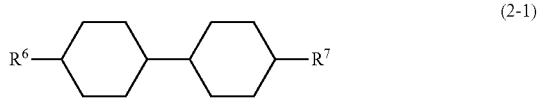
(2-1)

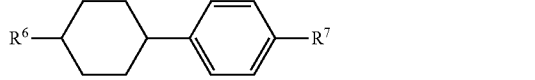
(2-2)

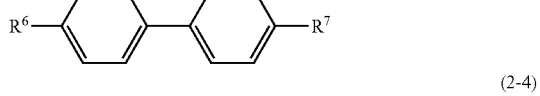
(2-3)

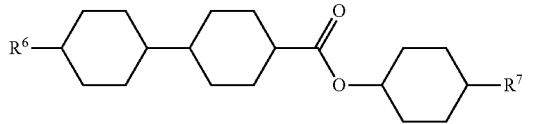
(2-4)

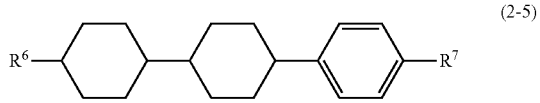
(2-5)

-continued

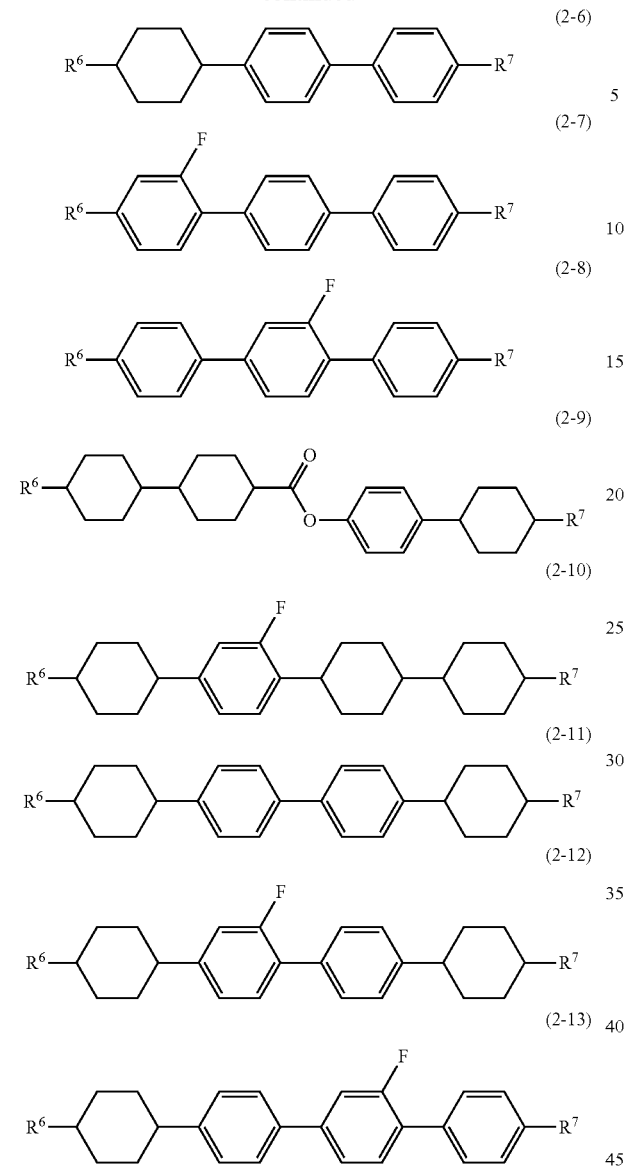

wherein, R⁶ and R⁷ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

5. The liquid crystal composition according to claim 1, further containing at least one compound selected from the group of compounds represented by formula (3) as a third component:

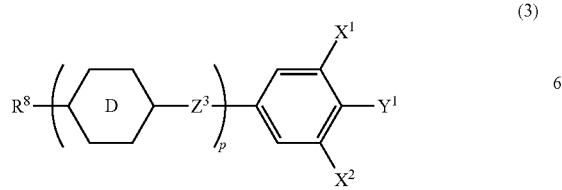

wherein, $R^8$ is alkyl having 1 to 12 carbons, alkoxy having 1 to 12 carbons or alkenyl having 2 to 12 carbons; ring D is independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 1,3-dioxane-2,5-diyl or tetrahydropyran-2,5-diyl; $X^1$ and $X^2$ are independently hydrogen or fluorine; $Y^1$ is fluorine, chlorine, trifluoromethyl or trifluoromethoxy; $Z^3$ is independently a single bond, ethylene, carbonyloxy or difluoromethyleneoxy; and p is 1, 2 or 3.

6. The liquid crystal composition according to claim 1, containing at least one compound selected from the group of compounds represented by formula (3-1) to formula (3-18) as the third component:

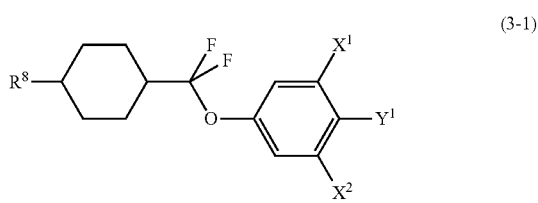

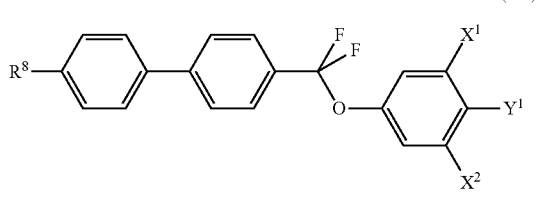

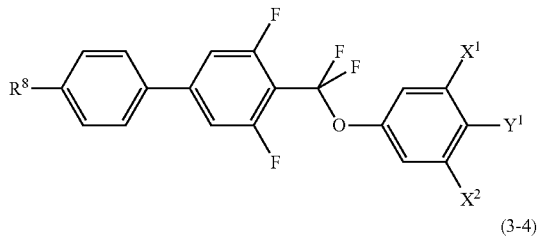

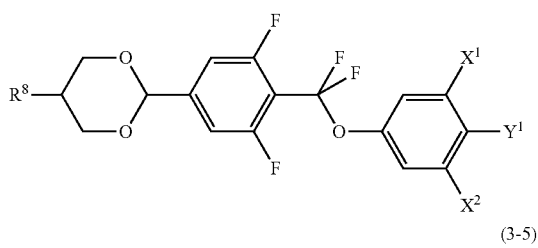

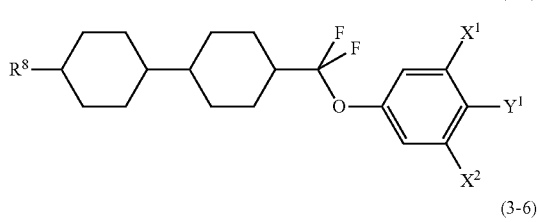

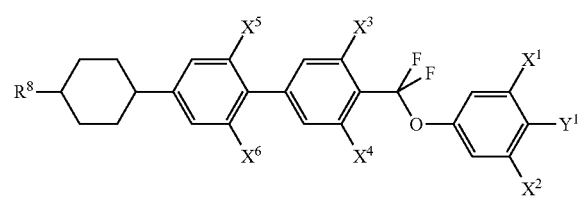

-continued

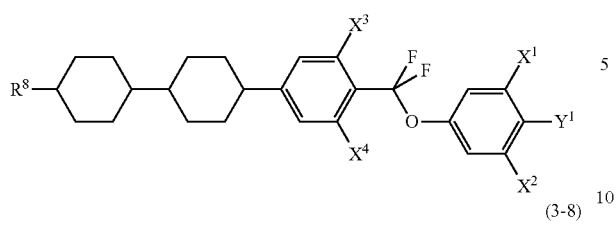
(3-7)

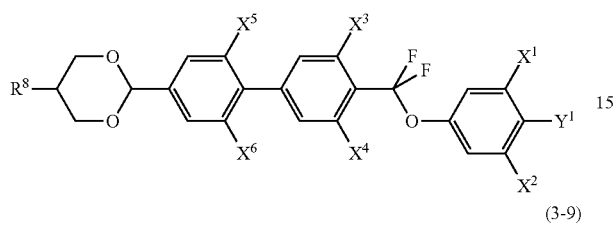
(3-8)

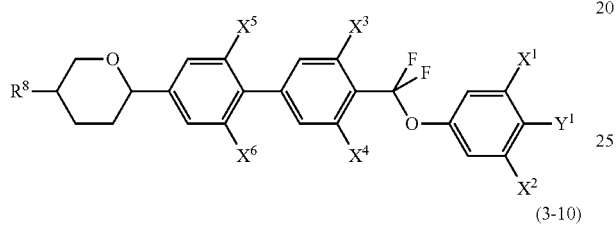
(3-9)

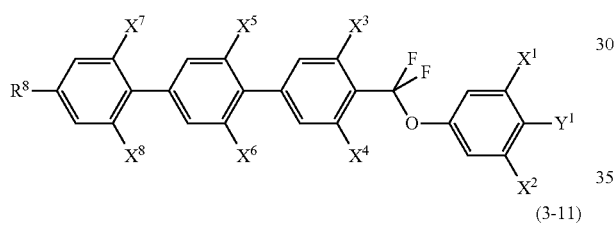
(3-10)

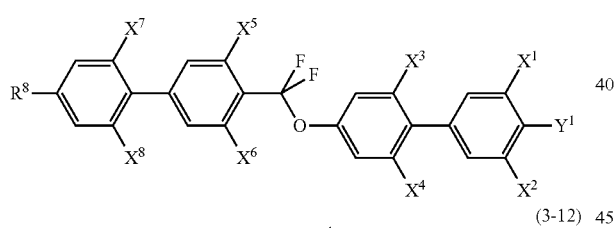
(3-11)

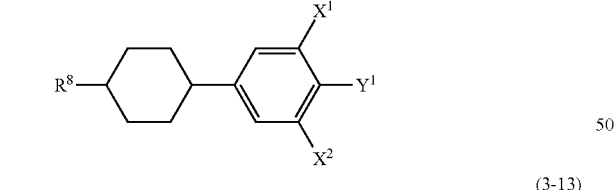
(3-12)

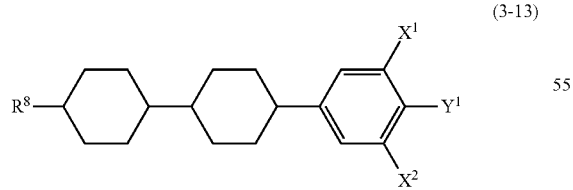
(3-13)

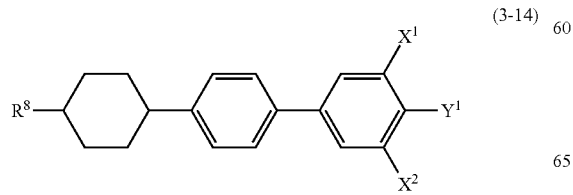
(3-14)

-continued

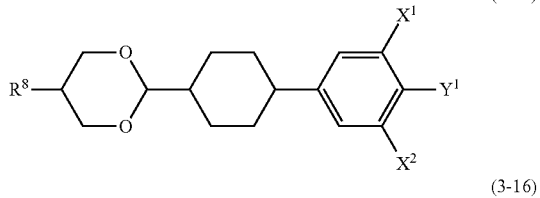
(3-15)

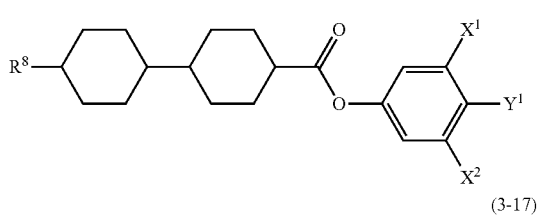
(3-16)

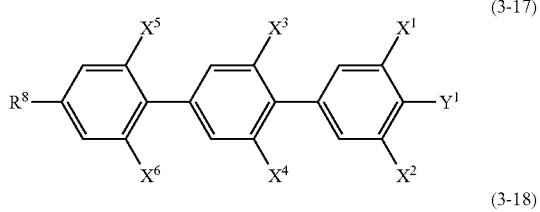
(3-17)

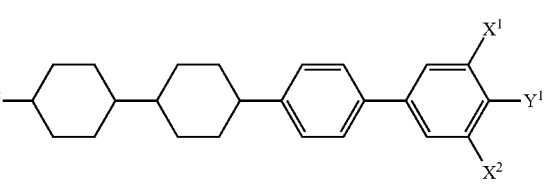
(3-18)

wherein, $R^8$ is alkyl having 1 to 12 carbons, alkoxy having 1 to 12 carbons or alkenyl having 2 to 12 carbons; $X^1$, $X^2$, $X^3$, $X^4$, $X^5$, $X^6$, $X^7$ and $X^8$ are independently hydrogen or fluorine; and $Y^1$ is fluorine, chlorine, trifluoromethyl or trifluoromethoxy.

7. The liquid crystal composition according to claim 1, further containing at least one compound selected from the group of compounds represented by formula (4) as a fourth component:

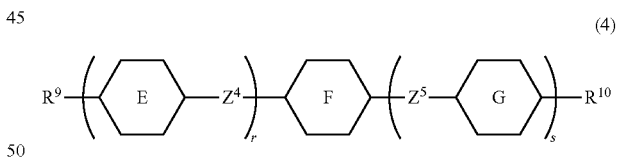
(4)

wherein, $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring E and ring G are independently 1,4-cyclohexylene, 1,4-phenylene, 1,4-phenylene in which at least one of hydrogen is replaced by fluorine or chlorine, or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, methyleneoxy or carbonyloxy; r is 1, 2 or 3; and s is 0 or 1, and a sum of r and s is 3 or less.

8. The liquid crystal composition according to claim 1, containing at least one compound selected from the group of compounds represented by formula (4-1) from formula (4-19) as the fourth component:

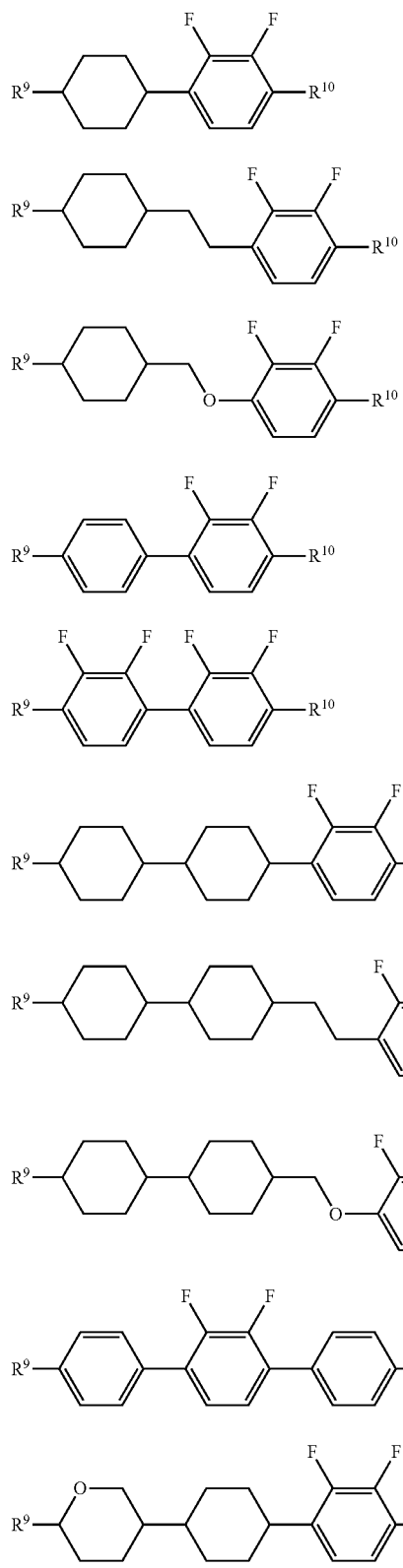

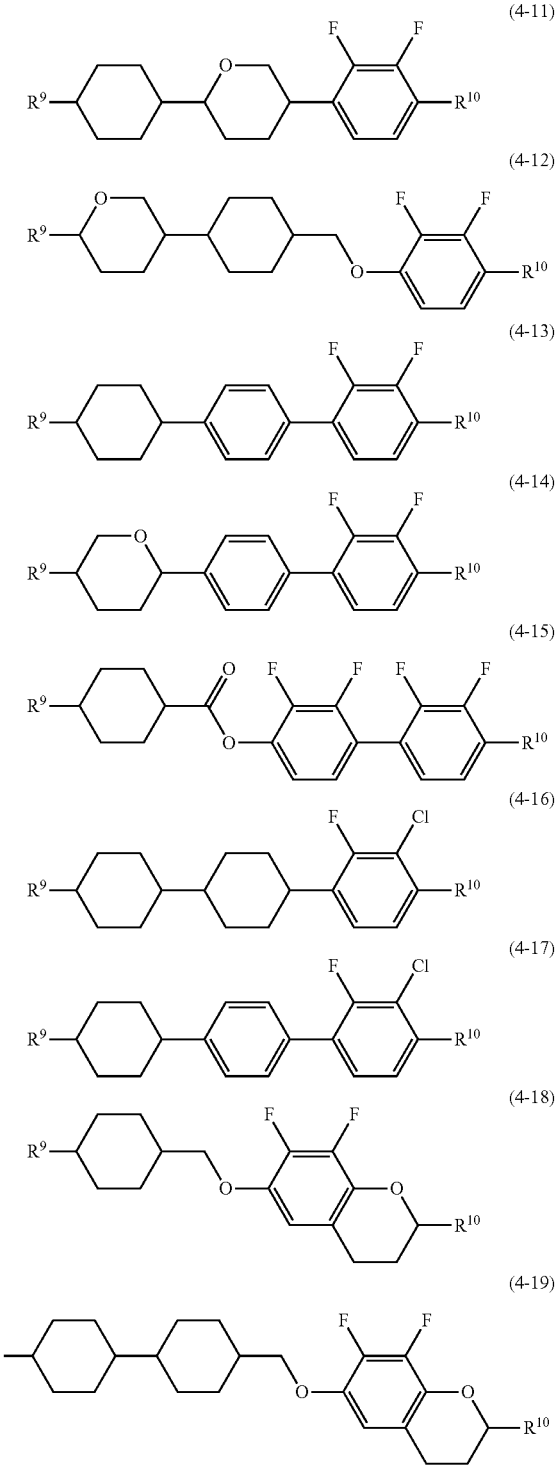

wherein, $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

9. The liquid crystal composition according to claim 1, further containing at least one compound selected from the group of compounds represented by formula (5) as a fifth component:

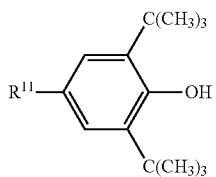

wherein, $R^{11}$ is alkyl having 1 to 9 carbons.

10. The liquid crystal composition according to claim 1, wherein a ratio of the first component is in the range of 0.005 part by weight to 1 part by weight based on 100 parts by weight of the liquid crystal composition excluding the first component and a fifth component which is at least one compound selected from the group of compounds represented by formula (5):

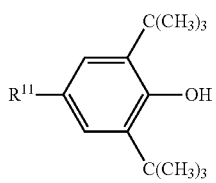

wherein, $R^{11}$ is alkyl having 1 to 9 carbons.

11. The liquid crystal composition according to claim 4, wherein a ratio of the second component is in the range of 10% by weight to 90% by weight based on the weight of the liquid crystal composition excluding the first component and a fifth component which is at least one compound selected from the group of compounds represented by formula (5):

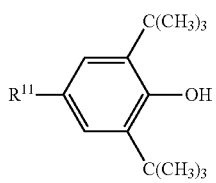

wherein, $R^{11}$ is alkyl having 1 to 9 carbons.

12. The liquid crystal composition according to claim 5, wherein a ratio of the third component is in the range of 10% by weight to 90% by weight based on the weight of the liquid crystal composition excluding the first component and a fifth component which is at least one compound selected from the group of compounds represented by formula (5):

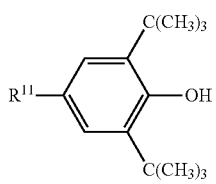

wherein, $R^{11}$ is alkyl having 1 to 9 carbons.

13. The liquid crystal composition according to claim 7, wherein a ratio of the fourth component is in the range of 10% by weight to 90% by weight based on the weight of the liquid crystal composition excluding the first component and a fifth component which is at least one compound selected from the group of compounds represented by formula (5):

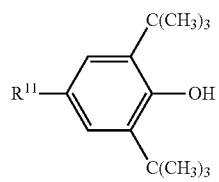

wherein, $R^{11}$ is alkyl having 1 to 9 carbons.

14. The liquid crystal composition according to claim 9, wherein a ratio of the fifth component is in the range of 0.005 part by weight to 1 part by weight based on 100 parts by weight of the liquid crystal composition excluding the first component and the fifth component.

15. A compound represented by formula (1-a):

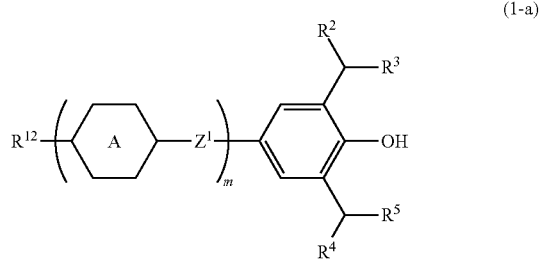

wherein, $R^{12}$ is alkyl having 2 to 20 carbons, and in the alkyl, at least one of —$CH_2$— is replaced by —O— or —S— or not; $R^2$, $R^3$, $R^4$ and $R^5$ are independently hydrogen or methyl;

ring A is 1,4-cyclohexylene, 1,3-dioxane-2,5-diyl, 1,3-dithiane-2,5-diyl, or tetrahydropyran-2,5-diyl, in which at least one of hydrogen is replaced by fluorine or not; $Z^1$ is a single bond, —$CH_2CH_2$—, —CH=CH—, —C≡C—, —COO—, —OCO—, —CH2O—, —$OCH_2$—, —CF=CF—, —$CH_2S$— or —$SCH_2$—; m is 0 or 1; $R^{12}$ when m is 0 is alkyl having 5 to 20 carbons, and in the alkyl, at least one of —$CH_2$— is replaced by —O— or —S— or not.

16. A liquid crystal composition containing the compound according to claim 15.

17. A method for using the compound according to claim 15, including providing the compound according to claim 15 as an antioxidant.

18. A liquid crystal display device including the liquid crystal composition according to claim 1.

19. The liquid crystal display device according to claim 18, wherein an operating mode in the liquid crystal display device is a TN mode, an ECB mode, an OCB mode, a VA mode, an IPS mode, a PSA mode, an FFS mode or an FPA mode, and a driving mode of the liquid crystal display is an active matrix mode.

20. A method for using the liquid crystal composition according to claim 1, including putting the liquid crystal composition according to claim 1 in a liquid crystal display device.

* * * * *